(12) United States Patent
Evans et al.

(10) Patent No.: US 11,855,312 B2
(45) Date of Patent: Dec. 26, 2023

(54) ALTERNATIVE LOW COST ELECTRODES FOR HYBRID FLOW BATTERIES

(71) Applicant: ESS TECH, INC., Wilsonville, OR (US)

(72) Inventors: Craig E. Evans, West Linn, OR (US); Sean Casey, Portland, OR (US); Yang Song, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 6 days.

(21) Appl. No.: 17/653,620

(22) Filed: Mar. 4, 2022

(65) Prior Publication Data

US 2022/0231309 A1 Jul. 21, 2022

Related U.S. Application Data

(60) Division of application No. 15/601,560, filed on May 22, 2017, now Pat. No. 11,374,236, which is a
(Continued)

(51) Int. Cl.
*H01M 8/0258* (2016.01)
*H01M 8/18* (2006.01)
(Continued)

(52) U.S. Cl.
CPC ....... *H01M 8/0258* (2013.01); *H01M 4/8803* (2013.01); *H01M 4/8817* (2013.01);
(Continued)

(58) Field of Classification Search
CPC ............. H01M 4/8803; H01M 4/8817; H01M 4/8828; H01M 8/0258; H01M 8/0239;
(Continued)

(56) References Cited

U.S. PATENT DOCUMENTS 6,475,661 B1  11/2002  Pellegri et al.
2007/0054175 A1  3/2007  Maendle et al.
(Continued)

FOREIGN PATENT DOCUMENTS

JP  2006278294 A  10/2006
WO  2011137239 A1  11/2011
(Continued)

OTHER PUBLICATIONS

Zeng, Y. et al., "Performance enhancement of iron-chromium redox flow batteries by employing interdigitated flow fields," Journal of Power Sources, vol. 327, Sep. 30, 2016, 7 pages.
(Continued)

*Primary Examiner* — Kiran Quraishi Akhtar
(74) *Attorney, Agent, or Firm* — McCoy Russell LLP

(57) ABSTRACT

A redox flow battery may include: a membrane interposed between a first electrode positioned at a first side of the membrane and a second electrode positioned at a second side of the membrane opposite to the first side; a first flow field plate comprising a plurality of positive flow field ribs, each of the plurality of positive flow field ribs contacting the first electrode at first supporting regions on the first side; and the second electrode, including an electrode spacer positioned between the membrane and a second flow field plate, the electrode spacer comprising a plurality of main ribs, each of the plurality of main ribs contacting the second flow field plate at second supporting regions on the second side, each of the second supporting regions aligned opposite to one of the plurality of first supporting regions. As such, a current density distribution at a plating surface may be reduced.

5 Claims, 30 Drawing Sheets
(11 of 30 Drawing Sheet(s) Filed in Color)

Related U.S. Application Data continuation-in-part of application No. 14/984,416, filed on Dec. 30, 2015, now Pat. No. 11,043,679.

(60) Provisional application No. 62/098,200, filed on Dec. 30, 2014.

(51) Int. Cl.
   *H01M 8/0239* (2016.01)
   *H01M 4/88* (2006.01)
   *H01M 8/20* (2006.01)
   *H01M 8/0245* (2016.01)

(52) U.S. Cl.
   CPC ....... *H01M 4/8828* (2013.01); *H01M 8/0239* (2013.01); *H01M 8/0245* (2013.01); *H01M 8/188* (2013.01); *H01M 8/20* (2013.01); *Y02E 60/50* (2013.01)

(58) Field of Classification Search
   CPC ...... H01M 8/0245; H01M 8/188; H01M 8/20; Y02E 60/50
   See application file for complete search history.

(56) References Cited

U.S. PATENT DOCUMENTS

| | | |
|---|---|---|
| 2011/0003213 A1 | 1/2011 | Burchardt et al. |
| 2011/0111296 A1 | 5/2011 | Berdichevsky et al. |
| 2011/0256435 A1 | 10/2011 | Kim et al. |
| 2013/0022846 A1 | 1/2013 | Liu et al. |
| 2013/0089769 A1 | 4/2013 | Proctor et al. |
| 2013/0157167 A1 | 6/2013 | Peters et al. |
| 2013/0266853 A1 | 10/2013 | Sano |
| 2014/0060666 A1* | 3/2014 | Evans ............... H01M 8/04186 137/260 |
| 2014/0065460 A1 | 3/2014 | Evans et al. |
| 2014/0255788 A1 | 9/2014 | Seki et al. |
| 2015/0263358 A1 | 9/2015 | Zaffou et al. |
| 2016/0010227 A1 | 1/2016 | Pant et al. |
| 2016/0190604 A1* | 6/2016 | Evans ................ H01M 4/8817 429/535 |

FOREIGN PATENT DOCUMENTS

| | | |
|---|---|---|
| WO | 2012167057 A2 | 12/2012 |
| WO | 2013018157 A1 | 2/2013 |
| WO | 2014131799 A1 | 9/2014 |

OTHER PUBLICATIONS

Zeng, Y. et al., "A hyrdrogen-ferric ion rebalance cell operating at low hydrogen concentrations for capacity restoration of iron-chromium redox flow batteries," Journal of Power Sources, vol. 352, Jun. 1, 2017, 6 pages.

ISA Korean Intellectual Property Office, International Search Report and Written Opinion Issued in Application No. PCT/US2018/032820, dated Sep. 20, 2018, WIPO, 13 pages.

United States Patent and Trademark Office, Office Action Issued in U.S. Appl. No. 14/984,416, filed Sep. 19, 2019, 16 pages.

European Patent Office, Extended European Search Report Issued in Application No. 18805497.7, dated Dec. 16, 2020, Germany, 8 pages.

* cited by examiner

| Spacer Designs | | | |
|---|---|---|---|
| Config | Image | Summary Statistics @ 45 mA/cm$^2$ | Repeat Element Current Distribution @ 45 mA/cm$^2$ |
| Rev. A | 1210 | Mean 46.1<br>Min 0.0<br>Max 54.6<br>IQR 9.7<br>MAD 4.6<br>ASR 0.9 | 1212 1216<br>1214 |
| Rev. B | 1220 | Mean 46.8<br>Min 7.1<br>Max 62.5<br>IQR 25.2<br>MAD 9.5<br>ASR 1.0 | 1222<br>1226<br>1224 |
| Rev. C | 1230 | Mean 52.3<br>Min 6.5<br>Max 153.8<br>IQR 25.9<br>MAD 8.8<br>ASR 1.0 | 1232<br>1236<br>1234 |
| Rev. D | 1240 | Mean 50.1<br>Min 7.2<br>Max 77.6<br>IQR 25.9<br>MAD 7.1<br>ASR 1.0 | 1242 1246<br>1244 |
| Rev. F | 1250 | Mean 46.4<br>Min 0.0<br>Max 61.8<br>IQR 24.5<br>MAD 8.9<br>ASR 1.0 | 1252<br>1256<br>1255 |

FIG. 13

| | | | | |
|---|---|---|---|---|
| Rev. G | (1310) | Mean | 53.8 | (1314) |
| | | Min | 43.3 | |
| | | Max | 56.6 | |
| | | IQR | 1.8 | |
| | | MAD | 0.2 | |
| | | ASR | 0.9 | |
| Rev. H | (1320) | Mean | 42.6 | (1324) |
| | | Min | 0.0 | |
| | | Max | 57.4 | |
| | | IQR | 11.9 | |
| | | MAD | 1.3 | |
| | | ASR | 0.9 | |
| Rev. I | (1330) | Mean | 50.3 | (1334) |
| | | Min | 47.0 | |
| | | Max | 51.4 | |
| | | IQR | 1.1 | |
| | | MAD | 0.1 | |
| | | ASR | 0.8 | |
| Rev. J | (1340) | Mean | 49.5 | (1344) |
| | | Min | 41.2 | |
| | | Max | 51.7 | |
| | | IQR | 1.8 | |
| | | MAD | 0.2 | |
| | | ASR | 0.8 | |
| Rev. k (ON3365) | (1350) | Mean | 50.8 | (1354) |
| | | Min | 36.8 | |
| | | Max | 52.2 | |
| | | IQR | 0.6 | |
| | | MAD | 0.1 | |
| | | ASR | 0.8 | |

DETAIL A

FIG. 17B
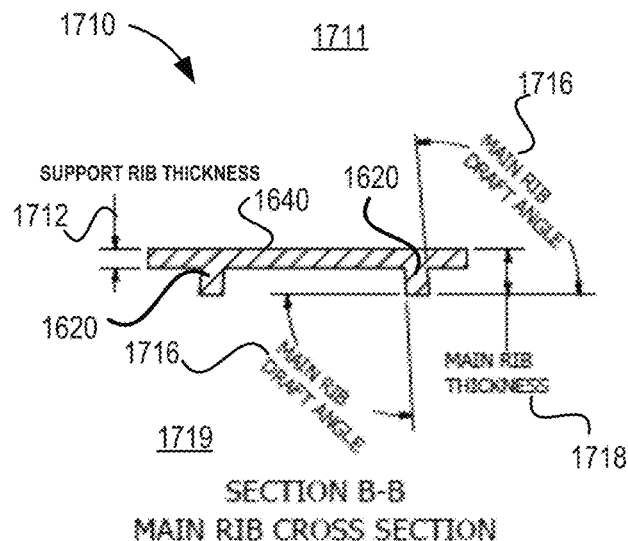
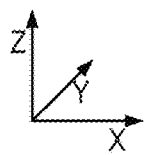
SECTION B-B
MAIN RIB CROSS SECTION
FIG. 17C
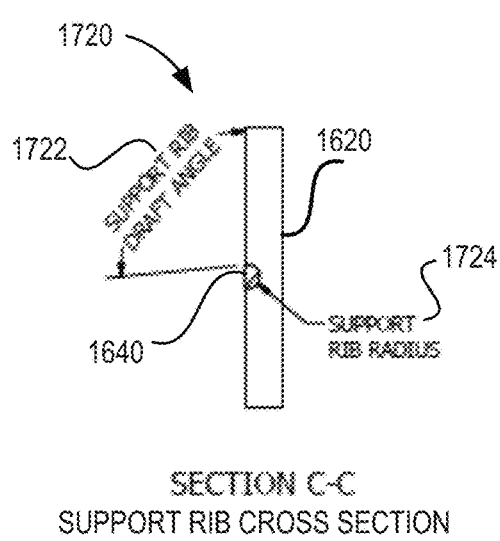
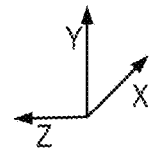
SECTION C-C
SUPPORT RIB CROSS SECTION
FIG. 17D
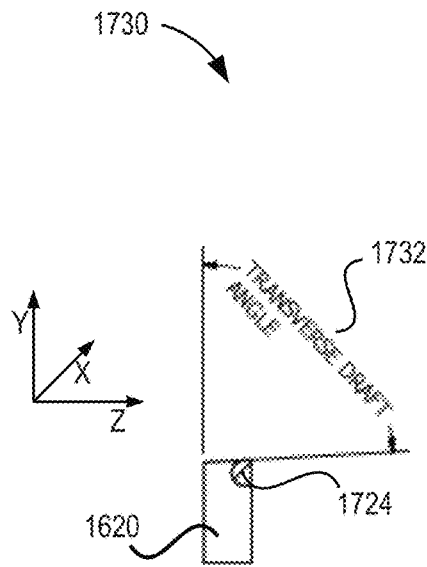
SECTION D-D
CROSS-SECTION OF
EDGEMOST SUPPORT RIBS
FIG. 17E
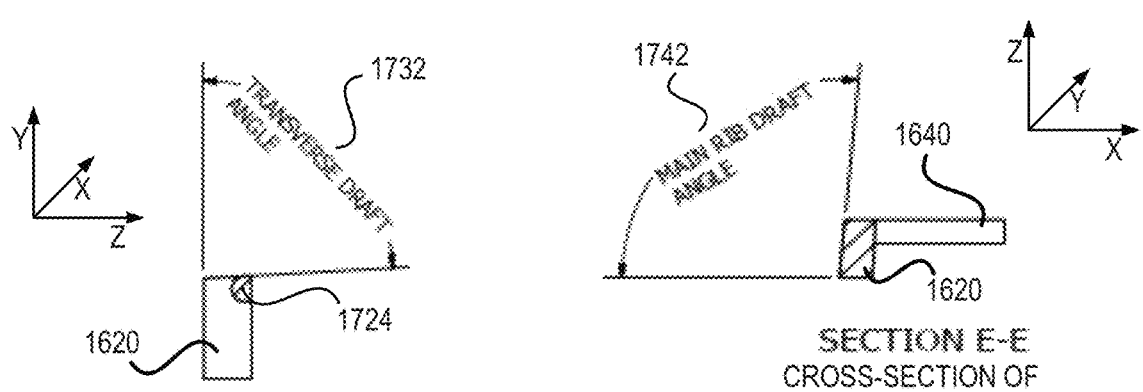
SECTION E-E
CROSS-SECTION OF
EDGEMOST MAIN RIBS

FIG. 23C
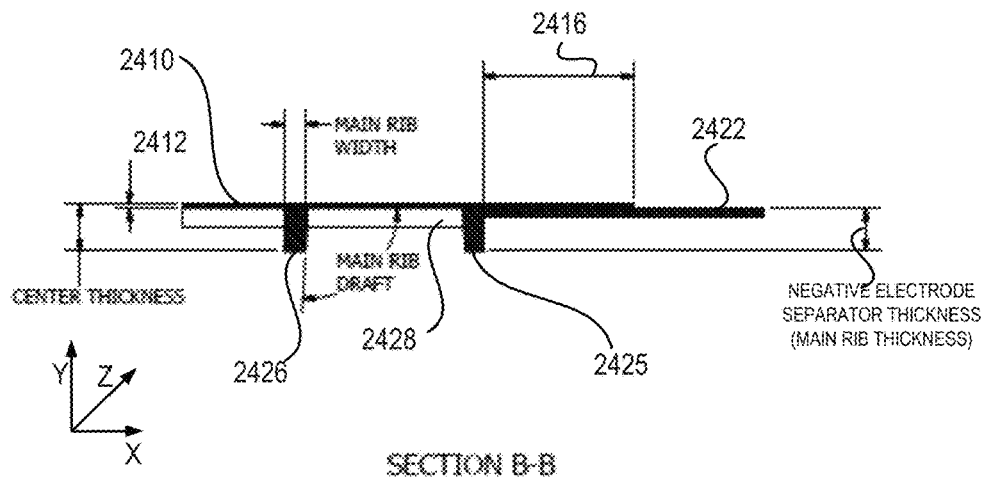
FIG. 23D
FIG. 23E
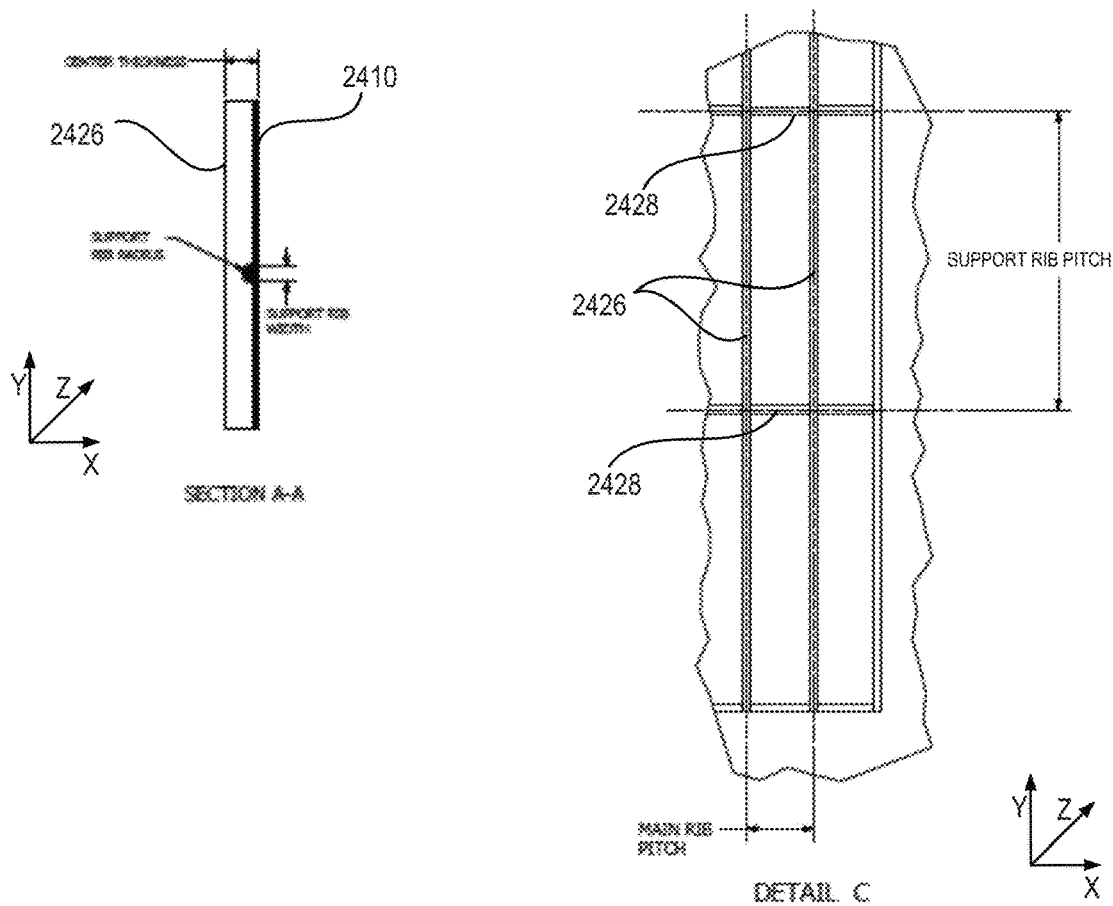

SECTION A-A

DETAIL B

SECTION C-C

ALTERNATIVE LOW COST ELECTRODES FOR HYBRID FLOW BATTERIES

CROSS-REFERENCE TO RELATED APPLICATIONS

The present application is a divisional of U.S. patent application Ser. No. 15/601,560, entitled "ALTERNATIVE LOW COST ELECTRODES FOR HYBRID FLOW BATTERIES," and filed on May 22, 2017. The U.S. patent application Ser. No. 15/601,560 is a continuation-in-part of U.S. patent application Ser. No. 14/984,416, entitled "ALTERNATIVE LOW COST ELECTRODES FOR HYBRID FLOW BATTERIES", filed Dec. 30, 2015. U.S. patent application Ser. No. 14/984,416 claims priority to U.S. Provisional Patent Application No. 62/098,200, entitled "CARBON COATED PLASTIC ELECTRODES FOR HYBRID BATTERIES", filed on Dec. 30, 2014. The entire contents of the above-referenced applications are hereby incorporated by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

FIELD

The current disclosure is directed towards hybrid flow battery systems and methods of assembling hybrid flow battery systems.

BACKGROUND/SUMMARY

A reduction-oxidation (redox) flow battery is an electrochemical storage device which stores energy in a chemical form. The stored chemical energy is converted to an electrical form via spontaneous reverse redox reactions. To restore the dispensed chemical energy, an electrical current is applied to induce the reverse redox reaction. Hybrid flow batteries deposit one or more of the electro-active materials as a solid layer on an electrode. Hybrid flow batteries include a chemical that forms a solid precipitate plate on a substrate at a point throughout the charge reaction which may also be dissolved throughout the discharge reaction. During the charge reaction, the chemical may solidify on the surface of the substrate forming a plate near the electrode surface. The chemical is regularly a metallic compound. In hybrid flow battery systems, the energy stored by the redox battery may be limited by the amount of metal plated during charge and may accordingly be determined by the efficiency of the plating system as well as the available volume and surface area to plate.

The positive and negative electrodes in redox flow batteries take part in the electrochemical reactions for storing and releasing chemical energy. Thus, the electrodes may be considered an important component in batteries, as the electrode affects battery performance, capacity, efficiency and the overall cost.

One example of a hybrid redox flow battery is an all-iron redox flow battery (IFB). The IFB uses iron as an electrolyte for reactions including a negative electrode where plating occurs, herein also referred to as the plating electrode, and a positive electrode where a redox reaction occurs, herein also referred to as the redox electrode. The performance of an IFB battery can be broken down to its plating electrode performance (negative electrode), redox electrode performance (positive electrode), and ohmic resistance loss. On the plating electrode, the ferrous (Fe2+) ion gains electrons and plates as solid iron on the substrates during charge, as shown in equation (1) below, and the solid iron dissolves as ferrous ions and releases two electrons during discharge. The equilibrium potential for the iron plating reaction is −0.44V. On the redox electrode, the redox reaction between ferrous and ferric (Fe3+) ions occurs during charge and discharge. On the positive electrode, two Fe2+ ions lose two electrons to form Fe3+ ions during charge, as shown in equation (2) below and two Fe3+ ions gain two electrons to form Fe2+ during discharge. The equilibrium potential between ferrous and ferric ions is +0.77V. Thus, the reaction in an IFB redox flow battery is reversible.

Fe2++2e−↔Fe0 (Negative Electrode)  (1)

2 Fe2+↔2Fe3++2e− (Positive Electrode)  (2)

On the negative electrode of an IFB, the ferrous iron reduction reaction competes with two side reactions: the reduction of hydrogen protons H+(reaction (3)), wherein two hydrogen protons each accept a single electron to form hydrogen gas, H2, and the corrosion of deposited iron metal to produce ferrous ion Fe2+(reaction (4)), respectively:

$H^+ + e^- \leftrightarrow \tfrac{1}{2} H_2$ (Hydrogen proton reduction)  (3)

$Fe^0 + 2H^+ \leftrightarrow Fe^{2+} + H_2$ (Iron corrosion)  (4)

These two side reactions may reduce the overall battery efficiency, because electrons transferred to the negative electrode may be consumed by hydrogen production rather than by iron plating. Furthermore, these side reactions may result in imbalanced electrolytes, which may in turn, result in battery capacity loss over time.

The Fe2+/Fe3+ redox reaction at the positive electrode is fast kinetically. The IFB battery performance may therefore be limited by its negative electrode performance, which is a result of the plating kinetics, plating resistance, and plating mass transport losses. Further, the IFB battery capacity is driven by how much solid iron the negative electrode can store. In addition, the IFB battery efficiency is related to the extent of side reactions such as side reactions (3) and (4) on the plating electrode. Therefore, it may be desirable to select a plating electrode whose properties are optimized for battery performance and efficiency at a minimal cost.

Currently, titanium (Ti) based mesh materials are used as the negative (plating) electrode and carbon (C) based porous materials, such as carbon paper and carbon felt, are used as the positive electrode. Both negative and positive electrodes are configured with an interdigitated electrolyte flow field (IDFF). The Ti material is stable in the negative half-cell environment and the mesh increases the overall surface area and volume for plating. The current electrode materials are stable during charging cycles wherein a high potential may be applied to the electrode. However, these plating and redox electrode materials are expensive and increase the overall battery cost. Ti material also exhibits catalytic effects for hydrogen evolution reactions; therefore the use of Ti material may result in a larger extent of side reaction, e.g. the hydrogen proton reduction (3). Furthermore, existing non-Ti based woven mesh electrodes can be too costly and provide inadequate plating density for the desired batter charge capacity. Further still, operating redox flow battery systems at higher plating density increases electrolyte flow and gas bubble evolution rates, which cannot be practically accommodated with conventional flow battery electrode configurations, and can embrittle electrode plating and degrade the electrodes. Further still, conventional flow battery electrode configurations can have higher current density distribution variances, which can cause premature shorting of the redox flow battery system.

The inventors herein have found that the above issues can be at least partially addressed by a redox flow battery, comprising: a membrane interposed between a first electrode positioned at a first side of the membrane and a second electrode positioned at a second side of the membrane opposite to the first side; a first flow field plate comprising a plurality of positive flow field ribs, each of the plurality of positive flow field ribs contacting the first electrode at first supporting regions on the first side; and the second electrode, including an electrode spacer positioned between the membrane and a second flow field plate, the electrode spacer comprising a plurality of main ribs, each of the plurality of main ribs contacting the second flow field plate at second supporting regions on the second side, each of the second supporting regions aligned opposite to one of the plurality of first supporting regions.

In another embodiment, a method of assembling a redox flow battery may comprise: on a plating side of a membrane, sandwiching a plating electrolyte flow field and a plating electrode spacer between the membrane and a plating flow field plate, the plating electrode spacer comprising a plurality of main ribs; on a redox side of the membrane, sandwiching a redox electrolyte flow field between a redox electrode and a redox flow field plate, the redox electrode comprising a plurality of positive flow field ribs; and aligning each of the plurality of main ribs with the plurality of positive flow field ribs, wherein upon compressing the plating flow field plate and the redox flow field plate towards the membrane, the main ribs are opposingly supported by the positive flow field ribs across the membrane without substantially changing a dimension of the plating electrolyte flow field.

In another embodiment, a redox flow battery may comprise: a negative electrode spacer interposed between a negative side of a membrane and a negative flow field plate, and a positive electrode interposed between a positive side of a membrane and a positive flow field plate wherein, the negative electrode spacer includes a plurality of main ribs, the positive electrode includes a plurality of positive flow field ribs opposingly aligned across the membrane from the plurality of main ribs, and the negative flow field plate includes a continuously smooth plating surface facing the membrane, the plating surface and the membrane sandwiching a non-interdigitated negative electrolyte flow field therebetween.

In this way, a novel redox flow battery system including a larger electrode gap can be provided, thereby affording higher plating current densities and battery charging capacities, and accommodating higher electrolyte flow and gas bubble evolution rates. Furthermore, current density distribution variance, ohmic losses, battery shorting, and manufacturing costs, and operating costs can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 12-13 illustrate tables showing current density distribution variances for various electrode configurations.

FIGS. 17B-E illustrate magnified partial cross-sectional views of the example electrode configuration of FIG. 16.

FIGS. 23C and 23D illustrate cross-sectional views of the electrode configuration of FIG. 24A taken at sections B-B and A-A, respectively.

FIG. 23E illustrates a detail view of region C of the electrode configuration of FIG. 23A.

DETAILED DESCRIPTION

The present disclosure relates to materials and methods for a novel coated plastic mesh electrode for use in a redox flow battery system which improves or maintains performance in comparison to current electrode materials while reducing overall cost. Redox flow battery systems, an example illustrated in FIG. 1, may include an all-iron hybrid redox flow battery (IFB), a Zn—Br2+ flow battery, or a Zn—NiOOH (MnO2) battery, and may comprise the disclosed redox flow battery system. In one example, for an IFB system, the iron plating kinetics are seen to be initially slow on non-iron based substrates, as illustrated in FIG. 2. Thus, the disclosed coated plastic mesh electrode, illustrated in FIGS. 3A and 3B, improves or maintains performance after an initial plating cycle. A comparison of the plating electrode performance between a baseline Ti mesh and coated meshes are illustrated in FIG. 4. The use of a coated plastic mesh electrode reduces the amount of electrode active material, and therefore the cost of the expensive conductive materials. The negative electrode pressure of a plastic mesh with a hydrophilic coating and the pressure of a plastic mesh with no coating are compared in the graph provided in FIG. 5. Evidence of negative plating characteristics of non-coated plastic meshes is provided in FIG. 6. The disclosed electrode has an optimized thickness and opening of the plastic mesh and carbon coating, as illustrated in FIG. 7, which reduces electrode resistivity, thereby improving performance as compared to current redox flow electrodes, illustrated in FIGS. 9 and 10.

Figure 11:
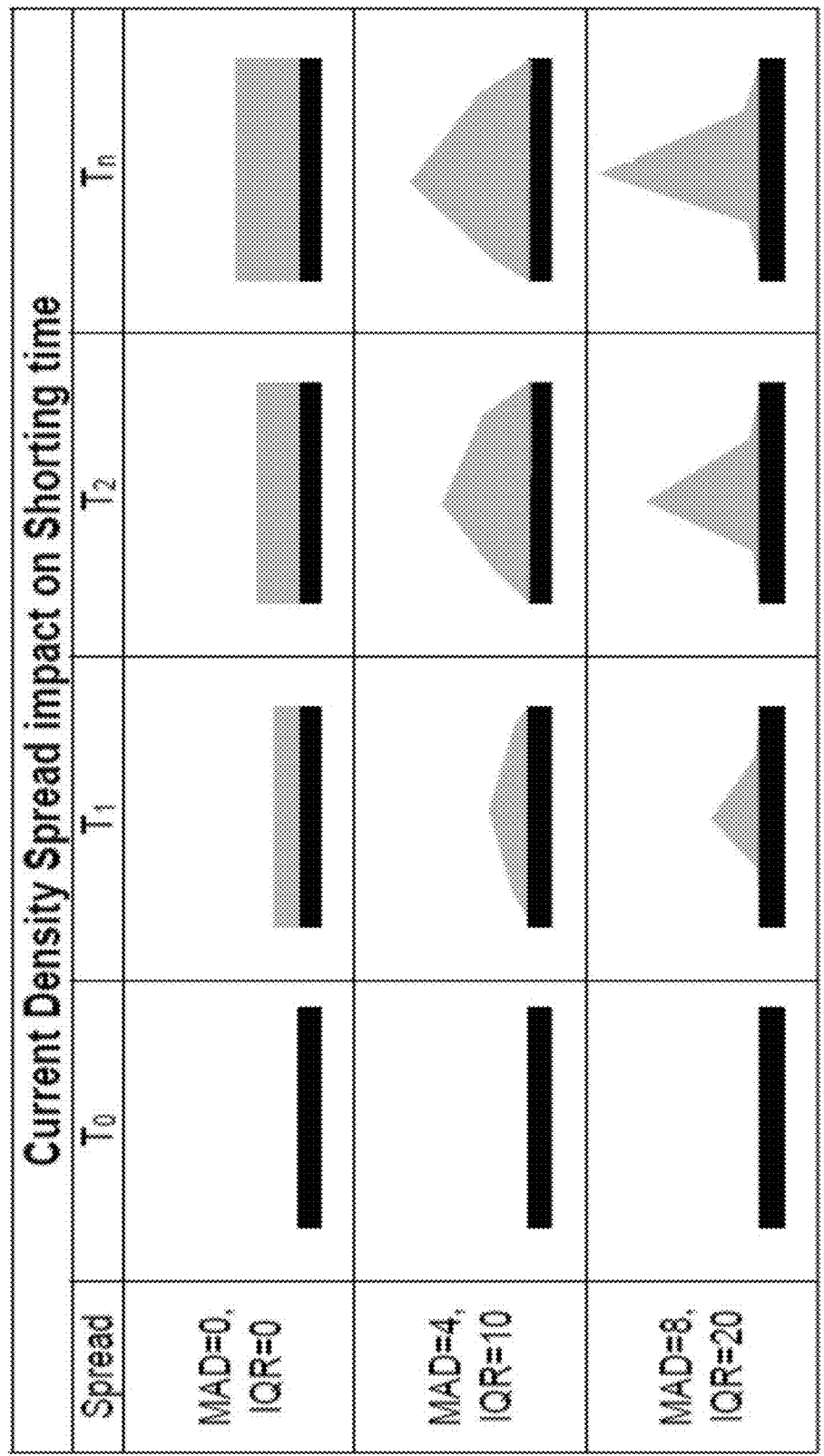
FIG. 11 illustrates a table showing current density distribution variance and battery shorting time.
Figure 14:
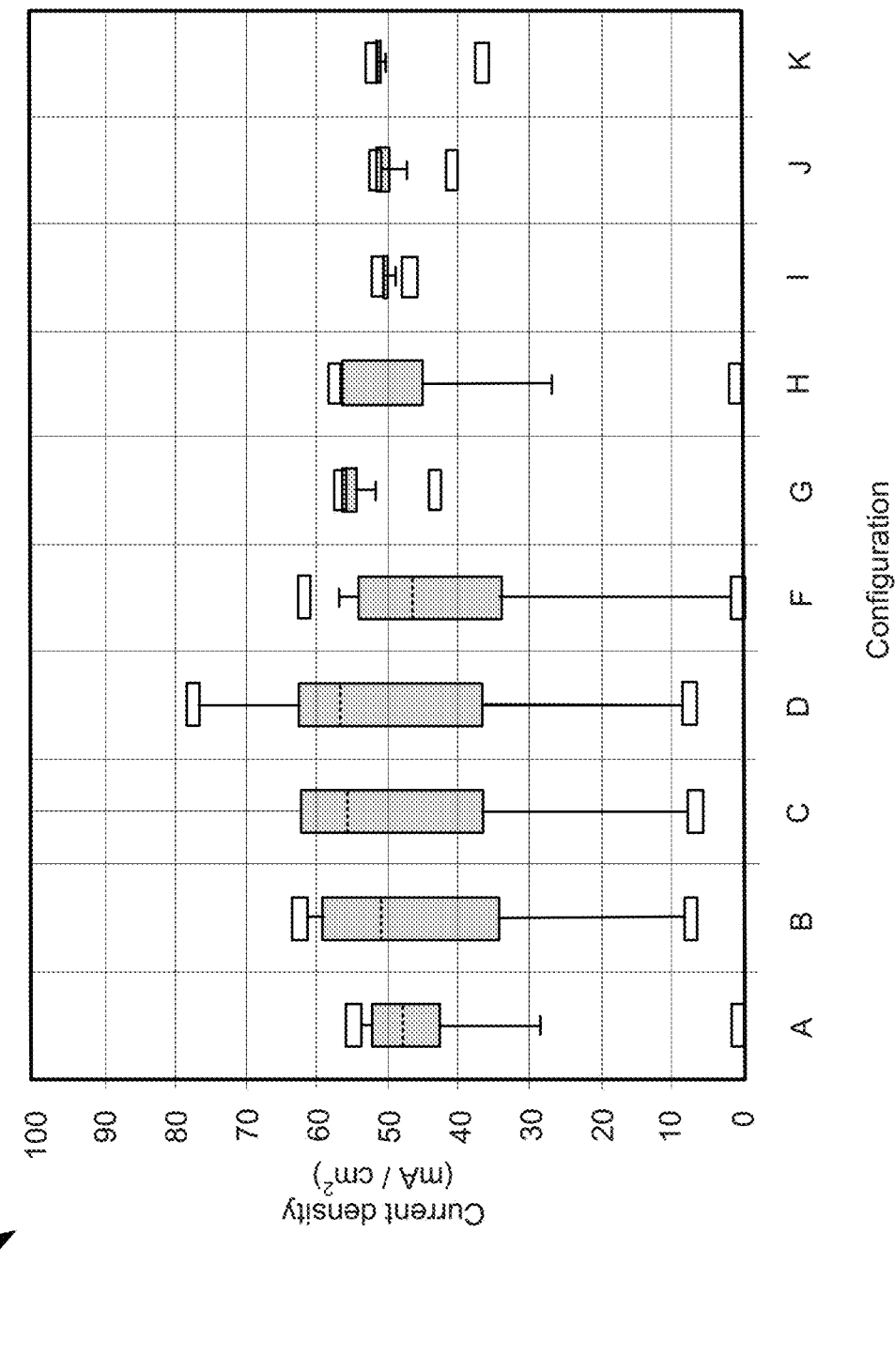
FIGS. 14-15 show current density distribution and battery validation data plots of various electrode configurations of FIGS. 12-13.

Electrode configurations that exhibit higher current density distribution variances can accelerate shorting of the battery cell, as illustrated in FIG. 11. FIGS. 12-13 compare various example electrode configurations, having associated current density distribution variances shown in FIG. 14, and battery validation test data shown in FIG. 15. Enlarged views of the various electrode configurations of FIGS. 12-13 are shown in FIGS. 22A-D and FIGS. 22F-K. FIGS. 16, and 17A-E, illustrate various views of an example electrode configuration having lower current distribution density variations, and FIG. 19 describes a method of assembling a redox flow battery including the electrode configuration of FIGS. 16 and 17A-E. FIGS. 18A and 18B illustrate an example of an electrode configuration for a redox flow battery including an interdigitated flow field (IDFF). FIGS. 20A and 20B illustrate example electrode configurations for a redox flow battery having a supported and an unsupported electrode stack assembly. Two alternative representations of electrode configurations are shown in FIGS. 23A-F and FIGS. 24A-D, respectively.

Figure 1:
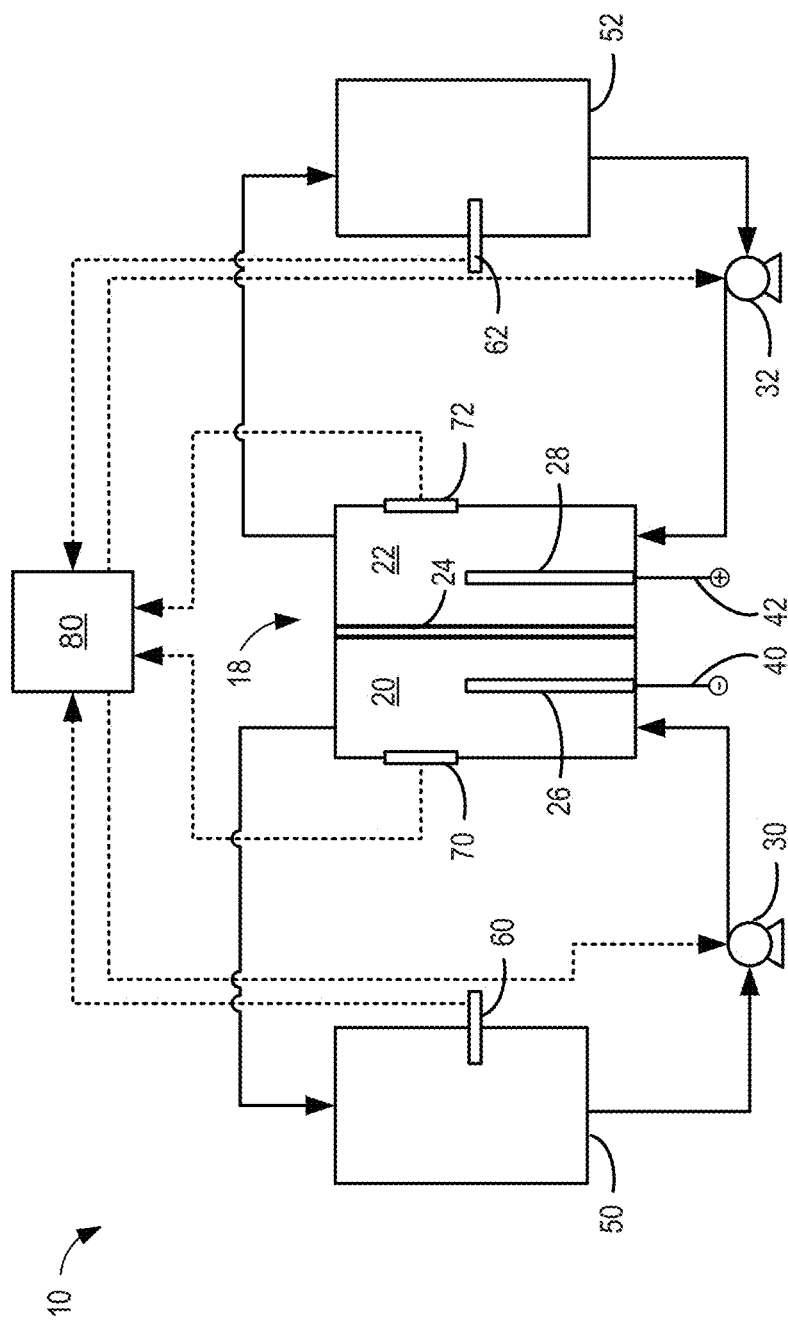
FIG. 1 shows a schematic of an example redox flow battery system.
Figure 2:
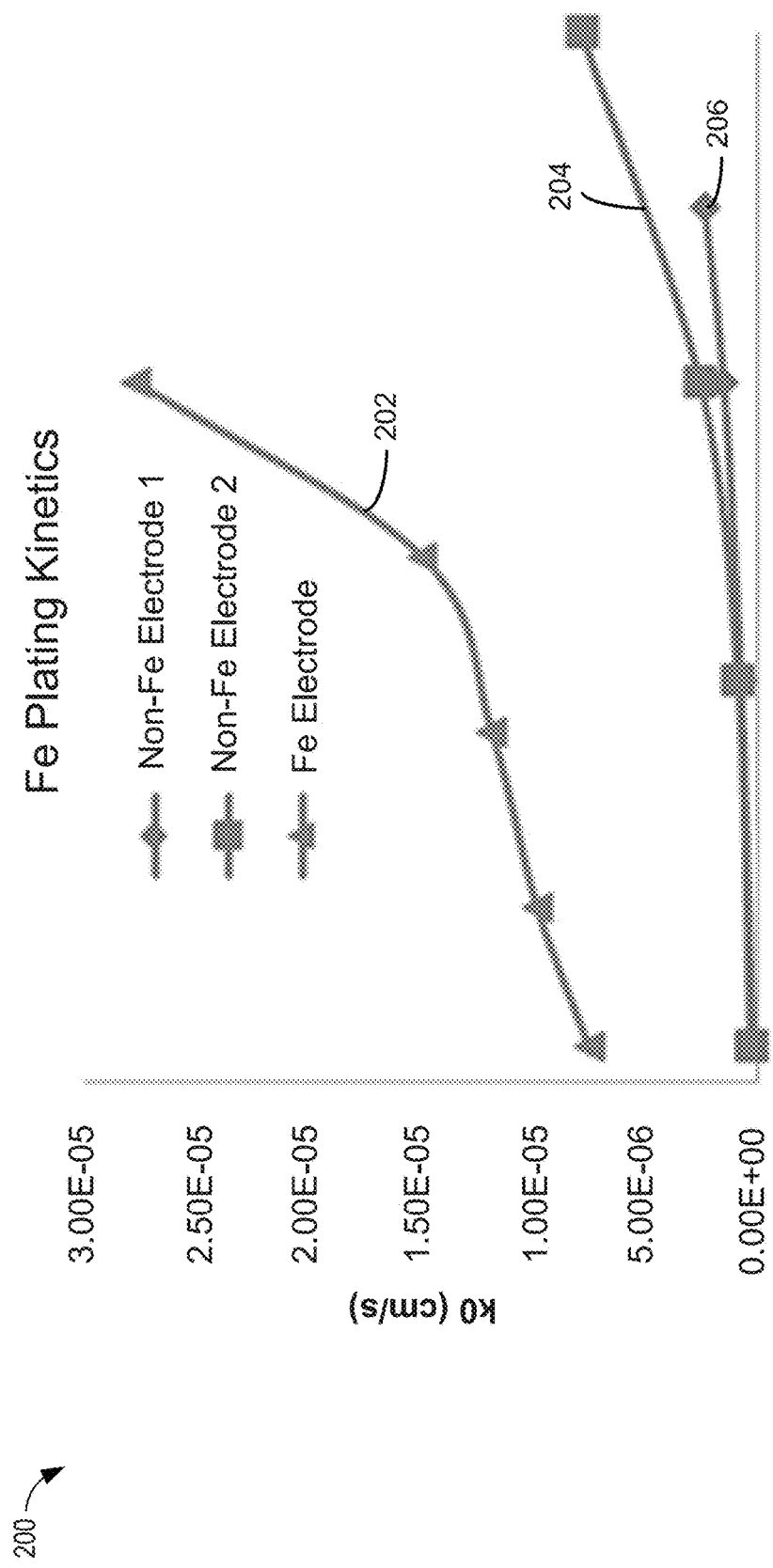
FIG. 2 illustrates Fe plating kinetics on various electrodes.

Turning to FIG. 1, an example schematic of a redox flow battery system 10 is provided wherein a single redox battery cell 18 is illustrated. The single redox battery cell generally includes a negative electrode compartment 20, a positive electrode compartment 22, and a separator 24. The separator 24 is positioned between the negative and positive electrode compartments. In some examples, multiple redox battery cells 18 may be combined in series and/or in parallel to create a higher voltage and/or current in the redox flow battery system.

The negative electrode compartment 20 may comprise a negative electrode 26 and a first electrolyte, also referred to as a negative electrode electrolyte, containing electro-active materials. Similarly, the positive electrode compartment 22 may comprise a positive electrode 28 and a second electrolyte, also referred to as a positive electrode electrolyte, containing electro-active materials.

The separator 24 may comprise an electrically insulating ionic conducting barrier. The separator functions to prevent bulk mixing of the first electrolyte in the negative electrode compartment 20 with the second electrolyte in the positive electrode compartment 22 while still allowing conductance of specific ions there through. In one example, separator 24 may comprise an ion-exchange membrane. In another example, separator 24 may comprise a micro-porous membrane.

The electrolytes may typically be stored in tanks external to the redox battery cell 18. The electrolyte may be pumped via pumps 30 and 32 through the negative electrode compartment 20 and the positive electrode compartment 22 respectively. In the example illustrated in FIG. 1, the first electrolyte is stored at a first electrolyte source 50, which may further comprise an external first electrolyte tank (not shown) and the second electrolyte is stored at a second electrolyte source 52, which may further comprise an external second electrolyte tank (not shown).

During battery charge, a current is applied to the negative battery terminal 40 and the positive battery terminal 42. During charge, the positive electrode electrolyte is oxidized, loses one or more electrons, at the positive electrode 28, and the negative electrode electrolyte is reduced, and gains one or more electrons, at the negative electrode 26.

During battery discharge, the reverse redox reactions to the charge reactions occur at the electrodes. Thus, during discharge, the positive electrode electrolyte is reduced at the positive electrode 28 and the negative electrode electrolyte is oxidized at the negative electrode 26. In one example, the positive electrode and the negative electrode may be the carbon coated plastic mesh electrode described below.

The electrochemical redox reaction in the negative electrode compartment 20 and the positive electrode compartment 22 maintain an electrical potential difference across the redox flow battery system and can induce a current through a conductor while the reactions are sustained. The amount of energy, the capacity, stored by a redox flow battery system may be limited by the amount of electro-active material in the electrolytes for discharge. The amount of electro-active material is based on the total volume of the electrolytes and the solubility of the electro-active materials. Furthermore, the amount of energy stored by the redox flow battery system may be limited by the amount of solid iron the negative electrode can store.

During operation of the redox flow battery system, sensors and probes may be used to monitor and control chemical properties of the electrolyte, such as electrolyte pH, concentration, state of charge, and the like. For example, the redox flow battery system may comprise sensors 60 and 62, which may be positioned to monitor the electrolyte conditions at the first electrolyte source 50 and the second electrolyte source 52 respectively. As another example, the redox flow battery system may comprise sensors 70 and 72, which may be positioned to monitor the conditions at the negative electrode compartment 20 and the positive electrode compartment 22 respectively.

The redox flow battery system may further comprise other sensors positioned at other locations throughout the redox flow battery system to monitor the electrolyte chemical properties and other properties. For example, the redox flow battery system may comprise one or more sensors disposed within an external acid tank, wherein acid may be supplied via an external pump to the redox flow battery system in order to reduce precipitate formation in the electrolytes. The one or more sensors may monitor the acid volume or the pH within the external acid tank. Additional external tanks and sensors may be included for supplying other additives to the redox flow battery system.

The redox flow battery system may be controlled at least partially by a control system including controller 80. The controller 80 may receive sensor information from the various sensors positioned within the redox flow battery system. For example, the controller 80 may actuate pumps 30 and 32 to control the electrolytes' flow through the redox battery cell 18. Thus, the controller 80 may be responsive to one or more of the sensors and/or probes positioned throughout the redox flow battery system.

Hybrid flow batteries are a redox flow battery which may be characterized by the deposit of one or more of the electro-active materials as a solid layer on an electrode. In hybrid flow battery systems, the charge capacity (the amount of energy stored) of the redox battery may be limited by the amount of metal plated during battery charge and may accordingly depend on the efficiency of the plating system as well as the available volume and surface area available for plating.

In the hybrid flow battery system, the negative electrode 26 may be referred to as the plating electrode and the positive electrode 28 may be referred to as the redox electrode. The negative electrode electrolyte within the negative electrode compartment 20 (herein also referred to as the plating side) of the battery may be referred to as the plating electrolyte and the positive electrode electrolyte within the positive electrode compartment 22 (herein also referred to as the redox side) of the battery may be referred to as the redox electrolyte.

As mentioned previously, one example of a hybrid flow battery is an IFB, which uses iron as an electrolyte for plating and redox reactions. The key components present in the IFB are similar to the hybrid flow battery described in FIG. 1, wherein the IFB comprises a benign electrolyte, including iron salts. The benign electrolyte is not too acidic (pH<0) or too alkaline (pH>14) and may have a pH near neutral, for example: IFB negative electrolyte operates between pH of 3-4. As used herein, the phrase pH around neutral provides for a pH range wherein the plastic mesh material used for the disclosed electrode does not degrade in the electrolyte at the potentials applied during charging and discharging of the redox flow battery. The IFB includes a plating electrode, where iron is deposited during charge and de-plated during discharge, a redox electrode, where the ferrous and ferric ions redox reaction occurs, a separator, which prevents electrolytes from mixing and provides an ionic pathway, and electrolytes, where the energy of the IFB is stored. The capacity of an IFB battery may be driven by the amount of electrolytes stored in the external tanks as well as the amount of iron plated on the negative electrode.

The electrochemical redox reactions for an IFB battery are summarized in equations (1) and (2) wherein the forward reactions (left to right) indicate electrochemical reactions during battery charge and the reverse reactions (right to left) indicate electrochemical reaction during battery discharge.

$$Fe^{2+}+2e^- \leftrightarrow Fe^0 \text{ (Negative Electrode)} \quad (1)$$

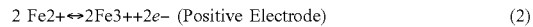

$$2\ Fe^{2+} \leftrightarrow 2Fe^{3+}+2e^- \text{ (Positive Electrode)} \quad (2)$$

On the plating side of the IFB, the plating electrolyte provides a sufficient amount of Fe2+ so that during charge, the Fe2+ gains two electrons from the negative electrode to form Fe0, which plates onto a substrate. During discharge, the plated Fe0 loses two electrons, ionizing into Fe2+ and dissolving back into the plating electrolyte. The equilibrium potential of the negative electrode reaction is −0.44V and thus, reaction (1) provides a negative terminal for the IFB system. On the redox side of the IFB, the redox electrolyte provides Fe2+ during charge which loses an electron to the redox electrode and oxidizes to Fe3+. During discharge, the Fe3+ gains an electron from the redox electrode producing Fe2+. The equilibrium potential of the positive electrode reaction is +0.77V, and thus, reaction (2) provides a positive terminal for the IFB system.

Thus, the performance of the IFB system may rely on its plating electrode performance, redox electrode performance, and ohmic resistance loss. On the positive side of the IFB, the redox reaction between Fe2+ and Fe3+, illustrated by reaction (2), occurs during charge and discharge. Reaction (2) is kinetically fast with minimal side reactions and may not be the limiting factor for the performance of the IFB system.

On the negative side of the IFB, the plating reaction between Fe2+ and Fe0, illustrated by reaction (1), occurs during charge and discharge. The ferrous ion, Fe2+, gains electrons and plates as solid iron, Fe0, on substrates. This plating reaction may compete with two side reactions: the reduction of hydrogen protons H+(reaction (3)), wherein two hydrogen protons each accept a single electron to form hydrogen gas, H2, and the corrosion of deposited iron metal to produce ferrous ion Fe2+(reaction (4)), respectively:

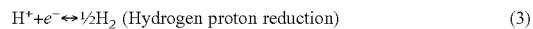

$$H^+ + e^- \leftrightarrow \tfrac{1}{2}H_2 \text{ (Hydrogen proton reduction)} \quad (3)$$

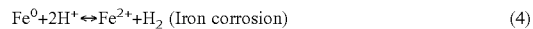

$$Fe^0 + 2H^+ \leftrightarrow Fe^{2+} + H_2 \text{ (Iron corrosion)} \quad (4)$$

Both side reactions may reduce the overall battery efficiency, because electrons transferred to the negative electrode may be consumed by hydrogen production first rather than by iron plating. Furthermore, these side reactions may result in imbalanced positive electrolytes, which may further result in battery capacity loss over time. In addition, the generated H2 may be trapped in the negative electrode which may in turn, reduce the electrochemical active area and may significantly increase electrode overpotentials.

Reaction (1) is kinetically slower than reaction (2) and may be the limiting factor for the performance of the IFB system. During charging and discharging cycles, the potential across the electrode may be low when compared to other redox battery systems. It should be noted that the plating kinetics of other battery systems may be the limiting factor for battery performance.

Turning to FIG. 2, the iron, Fe0, plating kinetics of an example IFB is illustrated for various electrode materials. The iron plating kinetics are slow when initially plating iron on non-iron based substrates, such as non-Fe electrode 1 (206) and non-Fe electrode 2 (204), due to the dissimilar materials. However, once a layer of iron is plated on the substrate, the iron plating kinetics increase to several orders of magnitude faster, as shown on Fe electrode (202), since the iron is now plating onto an iron coated substrate. The performance of an IFB may mostly be limited by the kinetics of the negative plating electrode, which is a result of the plating kinetics, resistance, and mass transport losses. Therefore a range of materials can be used as negative plating electrode substrate, because as soon as iron is plated on the substrate, plating kinetics improves significantly and is no longer the rate limiting side. Thus, an electrode for use in a redox flow battery must retain or improve the plating kinetics and conductivity of currently used electrodes, such as Ti and C, in IFB systems. The disclosed coated plastic mesh electrode maintains or improves the performance, as discussed below. Coated plastic mesh is able to survive in an IFB operating condition also because the IFB electrolyte is within a pH range of 1-4, not too acidic or alkaline and electrode potential is low so that the carbon coated plastic mesh electrode does not degrade during operation.

Figure 3A:
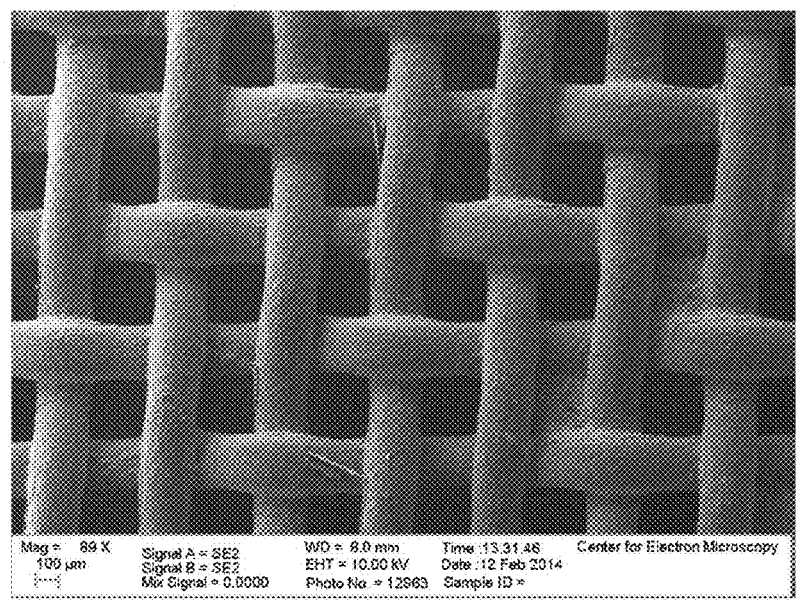
FIG. 3A shows an electron micrograph of a carbon coated plastic mesh electrode.
Figure 3B:
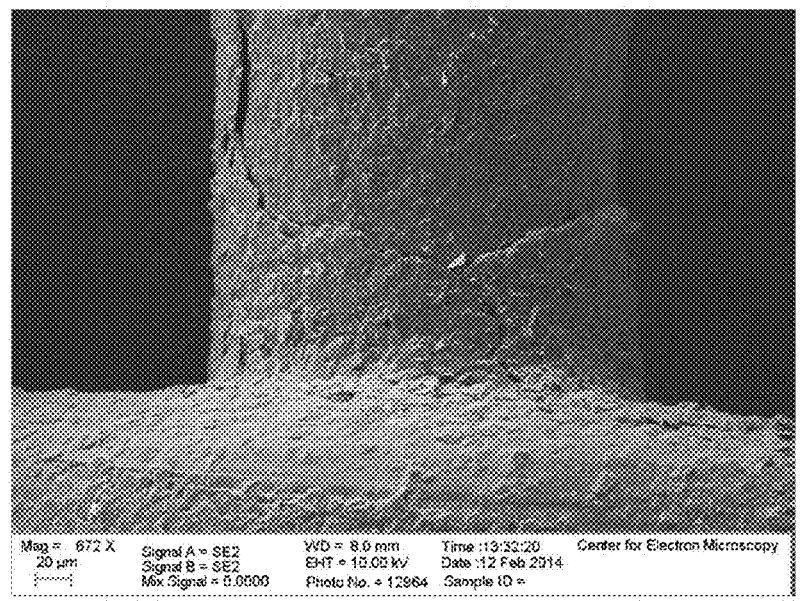
FIG. 3B shows an electron micrograph of a carbon coated plastic mesh electrode.
Figure 4:
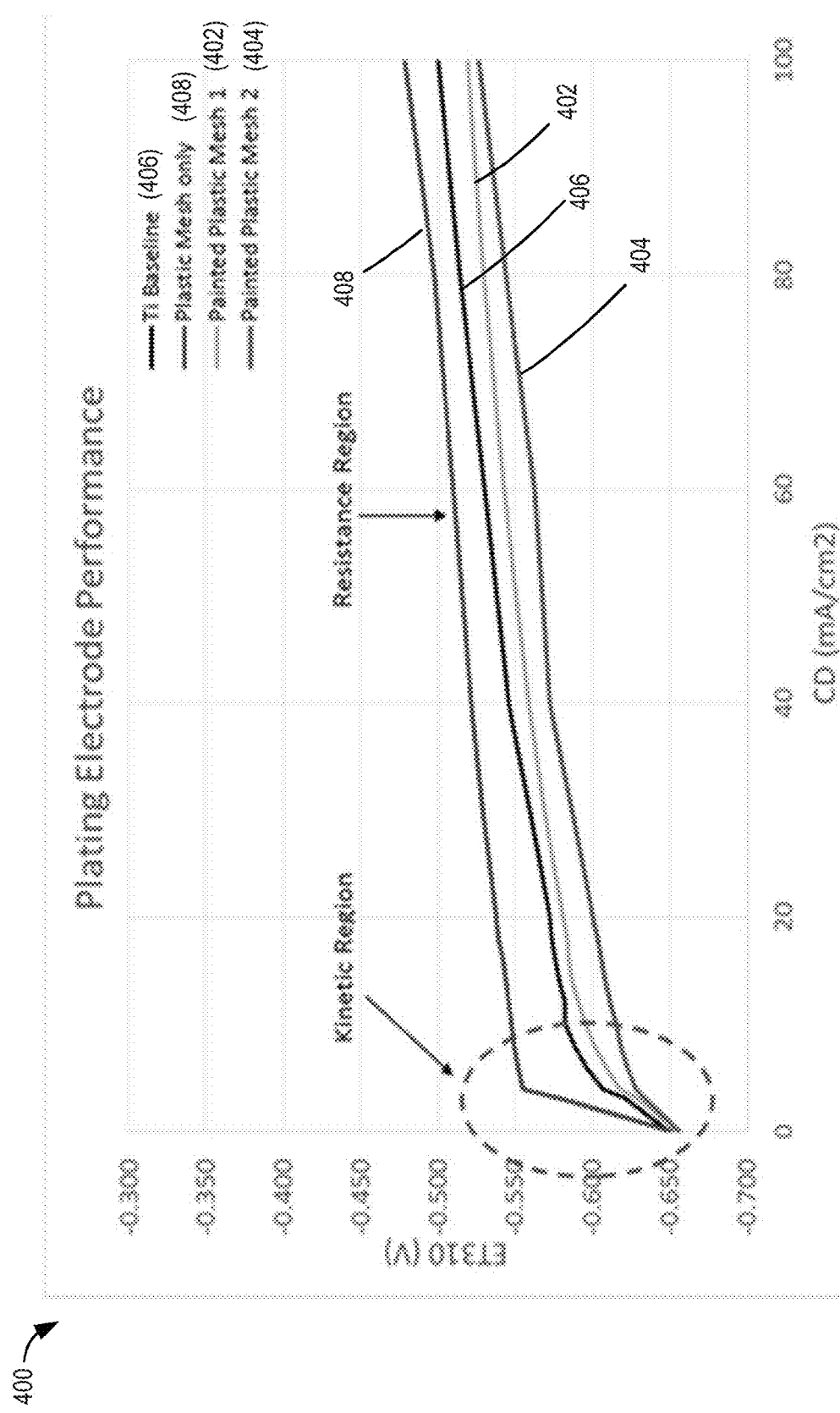
FIG. 4 shows the negative electrode performance comparison among a non-coated plastic mesh, two coated plastic meshes, and a Ti mesh as baseline.

Turning to FIGS. 3A and 3B, an electron micrograph of the disclosed electrode, which comprises a plastic mesh coated with a carbon material for use in redox flow batteries, is shown. Other example coating materials may be metal oxides (such as TiO2) and/or hydrophilic polymers (such as sulfonated PEEK or perfluorosulfonic acid (PFSA)).

The plastic mesh may be made from a variety of plastics. In one example, the plastic mesh material may be polypropylene (PP). In another example, the plastic mesh material may be polyolefin.

The coating material may be selected from any commercially available carbon ink. For example, the carbon material may be a carbon ink selected from Electrodag, C220, C120-24, and CM112-48. FIGS. 3A and 3B show an electron micrograph of the carbon coated plastic mesh electrode at different magnification levels. Other example coating materials include, but are not limited to, metal oxides (such as TiO2) and hydrophilic polymers (such as sulfonated PEEK or perfluorosulfonic acid (PFSA)). These coating materials may change the base plastic material from hydrophobic to hydrophilic. As such, a hydrophilic mesh may reduce the amount of hydrogen bubbles trapped in the plastic mesh.

In some embodiments, the plastic mesh may be a unipolar mesh. In other embodiments, the plastic mesh may be a bipolar mesh. In yet other embodiments, the plastic mesh may be a woven mesh. In still further embodiments, the plastic mesh may be a stretched mesh.

In some embodiments, treating the plastic mesh to improve the adhesion of the carbon material to the plastic mesh may be performed. In one example, treating the plastic mesh is done using a solvent treatment to improve adhesion of the carbon material to the plastic mesh. In another example, treating the plastic mesh is done using a plasma treatment to improve adhesion of the carbon material to the plastic mesh. In other examples, mechanical abrasion, UV radiation or electron-beam plasma may be used.

In other example embodiments, the coating material of the plastic mesh may be conductive and may comprise a material such as carbon. The carbon material may be applied to the plastic mesh to form a carbon coating. The carbon coating is conductive when used in a redox flow battery system. The carbon coating may be applied using a variety of techniques. In one example, the carbon material may be coated by air brushing. In another example, the carbon material may be coated by dip coating. In yet another example, the carbon material may be coated by roller coating.

In some examples, the coating material may further comprise a nonconductive material such as a metal oxide (TiO2, etc. for example) or hydrophilic plastic coatings (SPEEK, PFSA, etc. for example). The non-conductive coating may be applied to increase hydrophilicity of the plastic mesh in some embodiments. Furthermore, an increased hydrophilicity may allow hydrogen bubbles generated by side reactions 3 and 4 not to be trapped in the plastic mesh.

The carbon coated plastic mesh electrode show a uniform coverage of the carbon coating, as illustrated in FIGS. 3A and 3B. The use of the plastic mesh reduces the amount of expensive conductive materials, such as carbon fiber or titanium, which are currently used in IFB systems while retaining the kinetics of the redox and plating reactions due to the large surface area and conductivity of the carbon coating, which allows for high storage of metal during plating. The carbon coated plastic mesh electrode may be used as the plating electrode and/or the redox electrode.

With respect to FIG. 4, this figure shows a graph illustrating the negative electrode performance of plastic mesh electrodes compared with a Ti mesh baseline. A non-coated plastic mesh 408 and two types of carbon coatings applied to a plastic mesh (402, 404) are shown being compared against the Ti mesh baseline 406. The X axis of the plot (CD) represents current density and is measured in mA/cm2 while the Y axis of the plot (V) represents performance of the plating electrode with respect to the overpotential achieved. The plating electrode performance is measured with reference to an Ag/AgCl reference electrode inserted into the negative flow field. The initial voltage change at low current density may indicate plating kinetics overpotential.

As shown in FIG. 4, the highest plating overpotential results from the non-coated plastic mesh only configuration. This may be due to reduced electrode surface area since the non-coated plastic mesh is non-conductive.

Two plastic meshes (1 and 2 (indicated as 402 and 404 in FIG. 4)) which are coated with carbon ink in one embodiment, show similar or even less overpotential relative to the Ti mesh baseline 406. This may suggest that a similar or more conductive surface area may be available on those coated plastic meshes relative to the surface area of the Ti baseline. At a higher current density region, performance loss may be driven by ohmic resistance loss, which may be a combined result of mesh resistance and electrolyte resistance within the mesh. The ohmic resistance may therefore be a combined result of electrolyte conductivity, mesh open area, mesh thickness and mesh electrical resistance.

Figure 5:
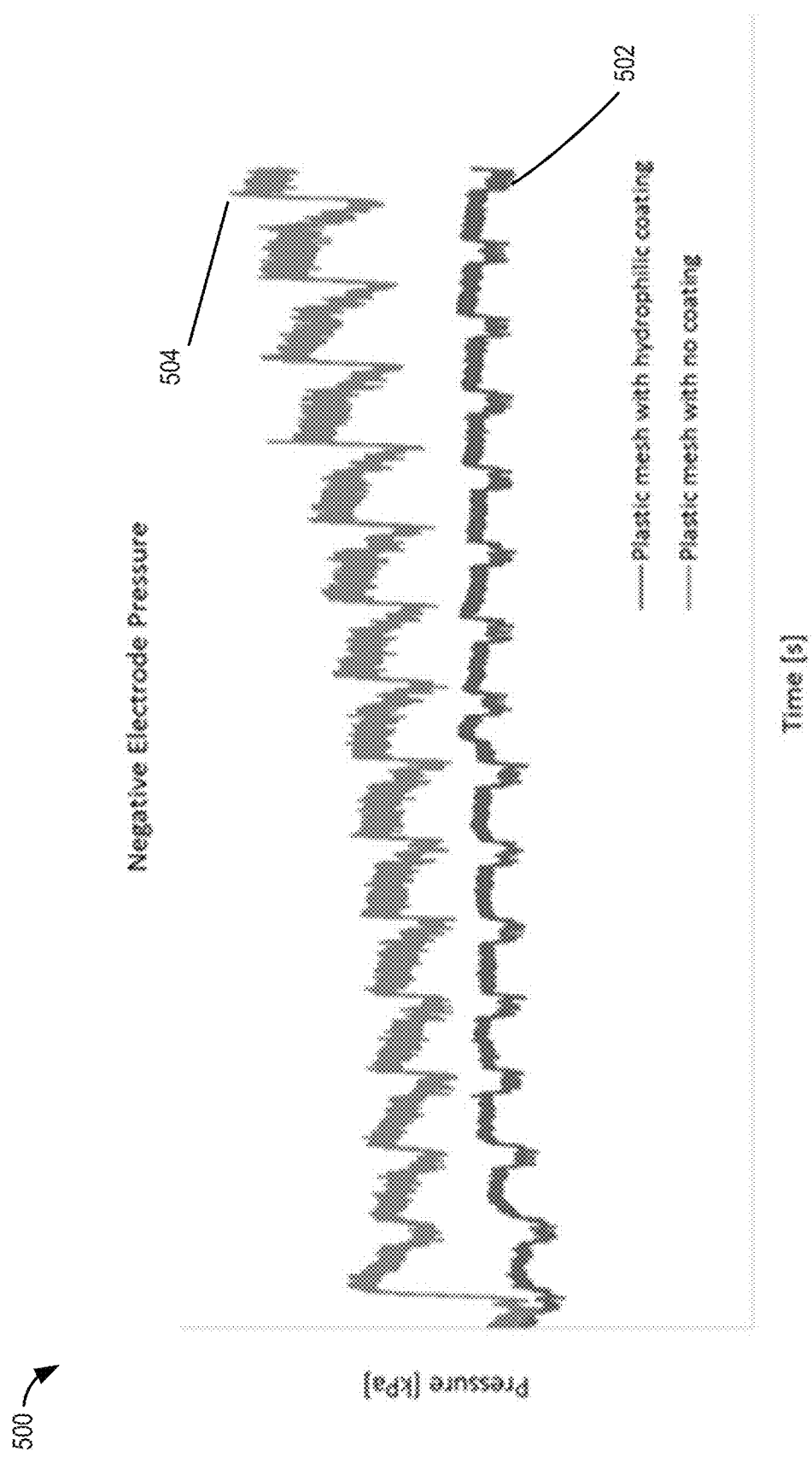
FIG. 5 shows the negative electrode pressure between a hydrophobic non-coated mesh and the same mesh with a hydrophilic coating.

Turning now to FIG. 5, in this figure, the pressures within the negative electrode compartment while operating with a non-coated hydrophobic plastic mesh and a coated, conductive, and hydrophilic plastic mesh are compared. Pressure transducers were installed on the IFB battery in one example to characterize IFB negative and positive electrolyte pressures during cycle operation. During the initial charge, negative pressure may increase as shown due to hydrogen generation. Under the same operation conditions, this pressure increase 504 was significantly higher with a non-coated hydrophobic plastic mesh than the same mesh with a hydrophilic coating 502, as shown in FIG. 5. In addition, from cycle to cycle, the internal pressure of the non-coated plastic mesh built up, suggesting that hydrogen bubbles may not have been effectively purged out from cycle to cycle. When this mesh was coated with a hydrophilic carbon coating however, the mesh contact angle with DI water was reduced from >90° to less than 45°. The same battery was therefore, able to operate at a much lower and more repeatable pressure range which may indicate that hydrogen being generated was effectively purged out of the battery during cycle performance. This purging of hydrogen gas may be important in the operation of the battery because when hydrogen gas is not purged out of the battery effectively, the battery active area may be reduced. Therefore, the battery performance may be reduced while exhibiting an effectively higher operating current density. Furthermore the battery plating volume may also be reduced, which may be further illustrated by the picture provided in FIG. 6.

Figure 6:
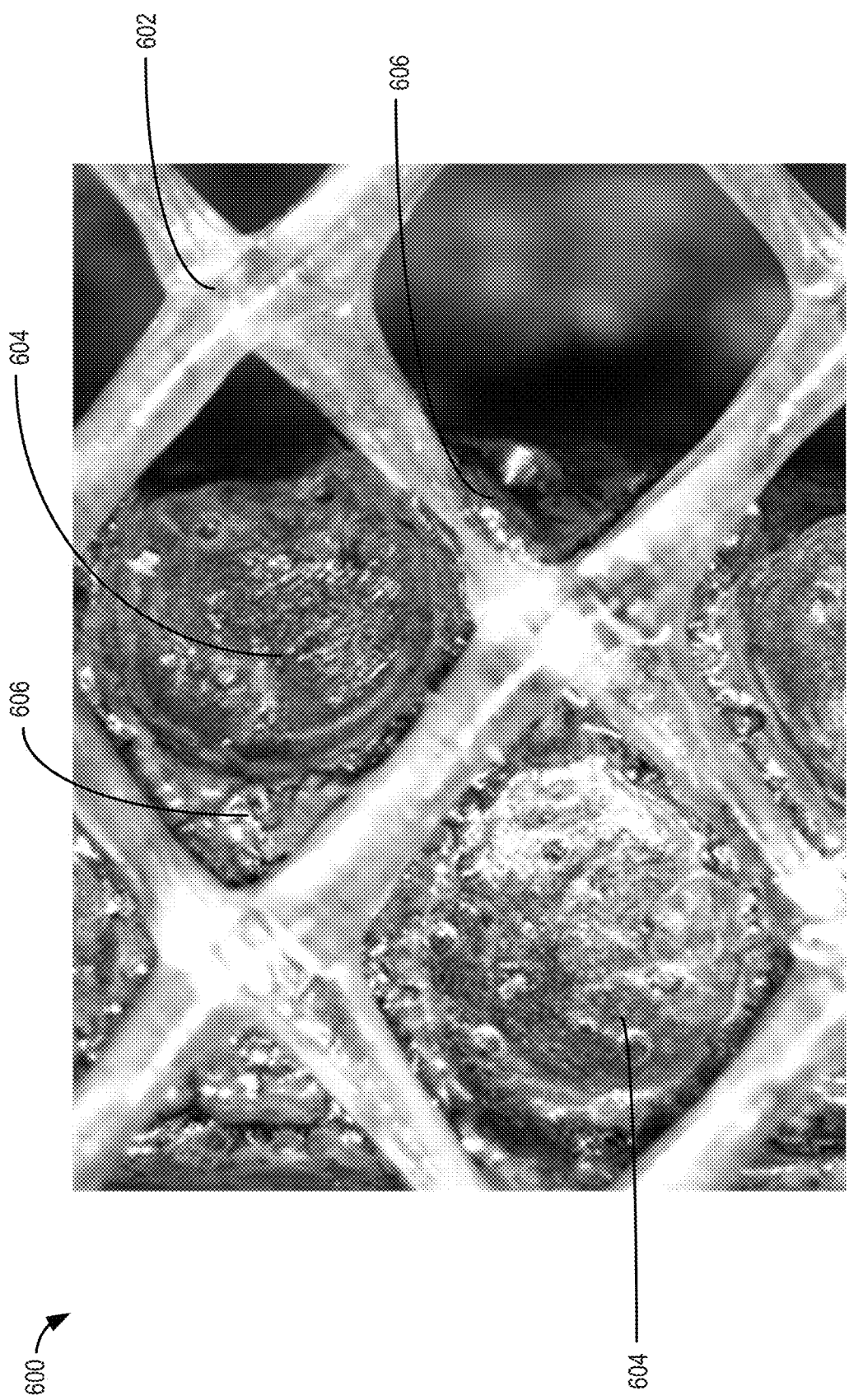
FIG. 6 shows an example of a trapped hydrogen bubble in a non-coated mesh and how it affects the location and morphology of the coated Fe.
Figure 7:
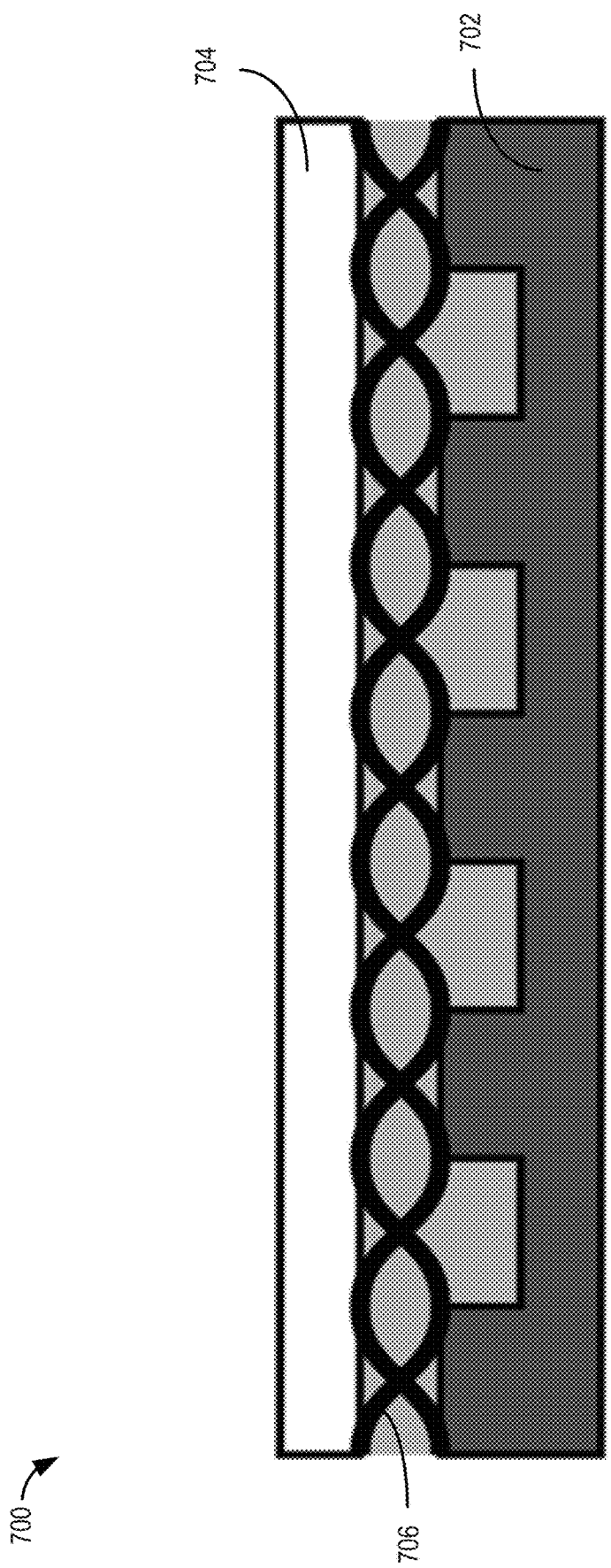
FIG. 7 shows a schematic of a coating on a plastic mesh.

FIG. 6 shows an image of the above non-coated plating electrode when the battery may be fully charged. The transparent mesh structure 602 of the figure illustrates the non-coated plastic mesh of one embodiment. The dark surface underneath the mesh is the plated iron 606 plated onto the plastic mesh. The uneven bubble-like structures 604 marked in the Figure shows a deformation in the plating iron 606 left behind by trapped hydrogen bubbles during charge of the battery. Furthermore, the picture not only shows that hydrogen bubbles were trapped within the mesh, it also indicates that iron plating 606 occurred around the hydrogen bubbles 604. This inconsistent plating may present an issue for the negative electrode because first of all, the trapped hydrogen bubbles may reduce the overall volume available for plating and the bubbles may effectively reduce the active area on the plating electrode, which may lead to uneven plating and even local shorting due to overplating locally.

Turning to FIG. 7, a schematic of applying a coated plastic mesh as the redox or the plating electrode in an IFB is illustrated. 702 refers to the flow plate channels where electrolytes are directed in and out of the IFB battery. 706 refers to the redox or plating electrode, which could be a carbon paper or Ti mesh or coated plastic mesh materials. 704 refers to the membrane separator that separates the positive and negative electrode compartments. The ohmic resistance of the electrode is the combined ionic resistance and electrical resistance of 706, where ionic resistance is determined by electrolyte resistivity, mesh open area and mesh thickness while the electrical resistance is determined by coating type, thickness and mesh wire size. When a non-conductive coating is used, the ohmic resistance of 706 is only the ionic resistance through the electrolyte. The coated plastic mesh electrode dimensions may be optimized for performance within a redox flow battery. For example, Table 1 below provides a list of surface area (mm2), open area, open volume and mesh thickness (mm) of carbon coated plastic mesh electrodes tested in an IFB system as compared to metal Ti mesh electrodes.

TABLE 1

| Mesh Type | Mesh ID | Additional Surface Area [mm2/cm2] | Open Area % | Open Volume % | Mesh Thickness [mm] |
|---|---|---|---|---|---|
| Metal | Ti | 124.55 | 64% | 84% | 0.56 |
| Plastic | 51PP Mesh | 264.80 | 34% | 67% | 0.43 |
| | 121PP Mesh | 385.74 | 15% | 52% | 0.33 |
| | 125PP Mesh | 314.38 | 25% | 61% | 0.20 |
| | WP0200 | 293.58 | 28% | 63% | 0.36 |
| | WP0300 | 221.02 | 42% | 72% | 0.33 |
| | WP0350 | 254.43 | 35% | 68% | 0.48 |
| | XN4800 | 125.89 | 64% | 84% | 0.50 |

The carbon coated plastic mesh electrodes may be fabricated to provide dimensions similar to the current metal electrodes. The carbon coated plastic mesh electrode allows for further refinements to the dimensions illustrated in Table 1 to optimize performance. For example, the carbon coated plastic mesh electrode for use as an electrode may have an open volume of 10% to 70%, a thickness of between about 0.20 mm to about 0.50 mm, and an open area of 15% to 65%. As used in the current disclosure, the term about includes additional ranges slightly above or below a value without changing the physical characteristics or resultant properties of the material. The carbon coated plastic mesh electrode may be optimized for conductivity, plating area, etc.

Figure 8:
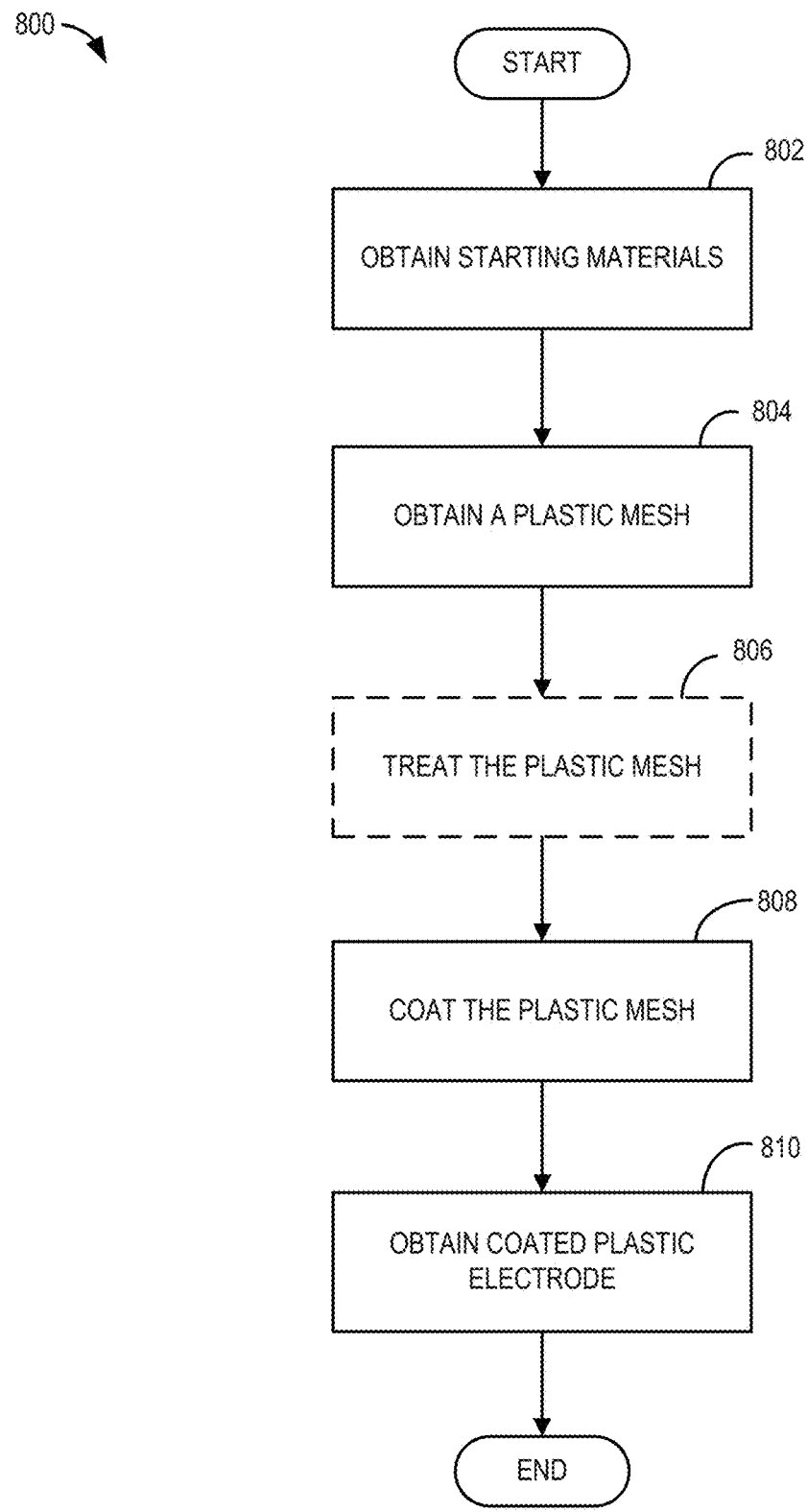
FIG. 8 shows an example method for fabricating a coated plastic mesh electrode.

Turning to FIG. 8, an example method for fabricating a coated plastic mesh electrode is provided. The method may provide an electrode for use in an IFB redox flow battery comprising fabricating a plastic mesh, treating the plastic mesh, and coating the plastic mesh. The fabricated electrode may be used as a positive electrode or negative electrode within the IFB redox flow battery.

At 802, the method may include obtaining starting materials. For example, the plastic mesh and carbon material may be obtained. In one example, the plastic mesh may be fabricated from polypropylene. In another example, the plastic mesh may be fabricated from polyolefin. The coating material may be conductive, such as a carbon ink. For example, the carbon ink may be one or more of Electrodag, C220, CM120-24, and CM112-48. The coating material may further comprise a non-conductive material, such as a metal oxide or a hydrophilic polymer. For example, a metal oxide may be $TiO_2$, and a hydrophilic polymer may be SPEEK or PFSA.

At 804, the method may include obtaining a plastic mesh. The plastic mesh may include a surface area, an open area, an open volume, and a thickness which is optimized for electrode performance. For example, the plastic mesh may be selected to include the dimensions listed in Table 1 above. The obtained plastic mesh may be made from polypropylene, polyolefin, etc. and be unipolar, bipolar, or woven.

At 806, the method may include treating the plastic mesh fabricated at 804. Treating the plastic mesh may be done to improve the adhesion of the subsequent coating step 808. In some embodiments, the method includes treating the fabricated plastic mesh to improve adhesion of the carbon coating. In other embodiments, the method may not include treating the fabricated plastic mesh to improve adhesion. In one example, treating the plastic mesh may be done using a solvent treatment. In another example, treating the plastic mesh may be done using a plasma treatment.

Various surface treatments may be used to improve the adhesion of coatings to plastics, including flame and corona, mechanical abrasion, solvent cleaning or swelling followed by wet chemical etching, or the application of specialized coatings in the form of chemical primers or any combination thereof. Additional treatments, such as high energy density treatments such as ultraviolet (UV) radiation, electron-beam and cold-gas-plasma methods and combinations thereof may also be used. The methods described above have gained greater acceptance on a larger scale for substrate surface modification. These methods may provide a medium rich in reactive species, such as energetic photons, electrons, free radicals, and ions, which, in turn, may interact with the polymer surface, changing its chemistry and/or morphology. These processes may be readily adopted to modify surface properties of plastic meshes.

At 808, the method includes coating the plastic mesh with a selected material. In one example, coating the plastic mesh with the carbon material may be done by air brushing. In another example, coating the plastic mesh with the carbon material may be done by dip coating. In yet another example, coating the plastic mesh with the carbon material may be done by roller coating. The coating thickness may be optimized for conductivity and/or plating. The coating may require a heat treatment for curing and eliminating any solvents.

At 810, the method may obtain the coated plastic electrode. The coated plastic electrode may be used as the plating electrode and/or the redox electrode in redox flow battery systems. The method may then end.

Thus, an electrode may be fabricated for use in a redox flow battery system. The example method above may be used to fabricate the electrode, wherein the electrode is a novel carbon coated plastic mesh electrode which improves battery performance and reduces cost. The use of low cost plastic materials, which is contrary to the current way of thinking due to plastics not being stable in current electrolyte systems employed, leads to the novel carbon coated plastic mesh based electrode for use in IFB systems. The carbon coated plastic mesh electrode may be used at the negative electrode position and/or the positive electrode position of a redox flow battery system.

Figure 9:
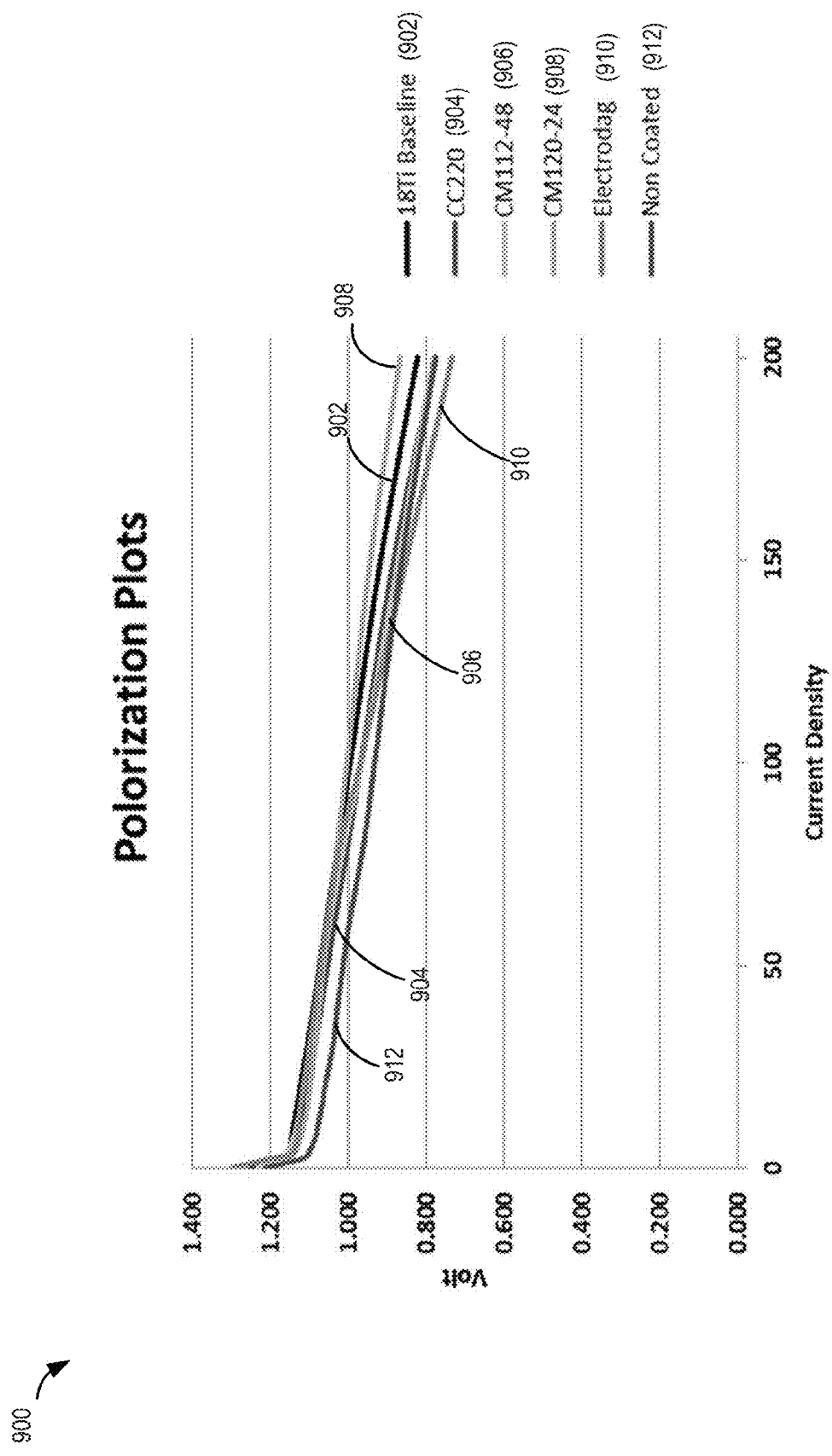
FIG. 9 illustrates carbon coated plastic mesh electrode performance.

Turning to FIG. 9, the performance of several carbon coated plastic mesh electrodes are illustrated versus a Ti mesh control electrode. In FIG. 9, the polarization plots of the carbon coated plastic mesh electrodes 904, 906, and 908 provide an improved or similar current density vs. voltage response in comparison to the Ti mesh control electrode 902. The uncoated plastic mesh electrode 912 shows a lower voltage response in comparison to the Ti mesh control electrode 902 and the carbon coated plastic mesh electrodes 904, 906, and 908. The Electrodag electrode 910 shows good voltage at low current densities and lower voltage at higher current densities as compared to the other carbon coated mesh electrodes. The results illustrate that the carbon coating enhances the conductivity of the carbon coated plastic mesh electrode in comparison to an uncoated plastic mesh electrode 912. Thus, the carbon coated plastic mesh electrode provides a low cost alternative for use in redox flow batteries which improves or maintains the current density in comparison to currently used electrode materials.

Figure 10:
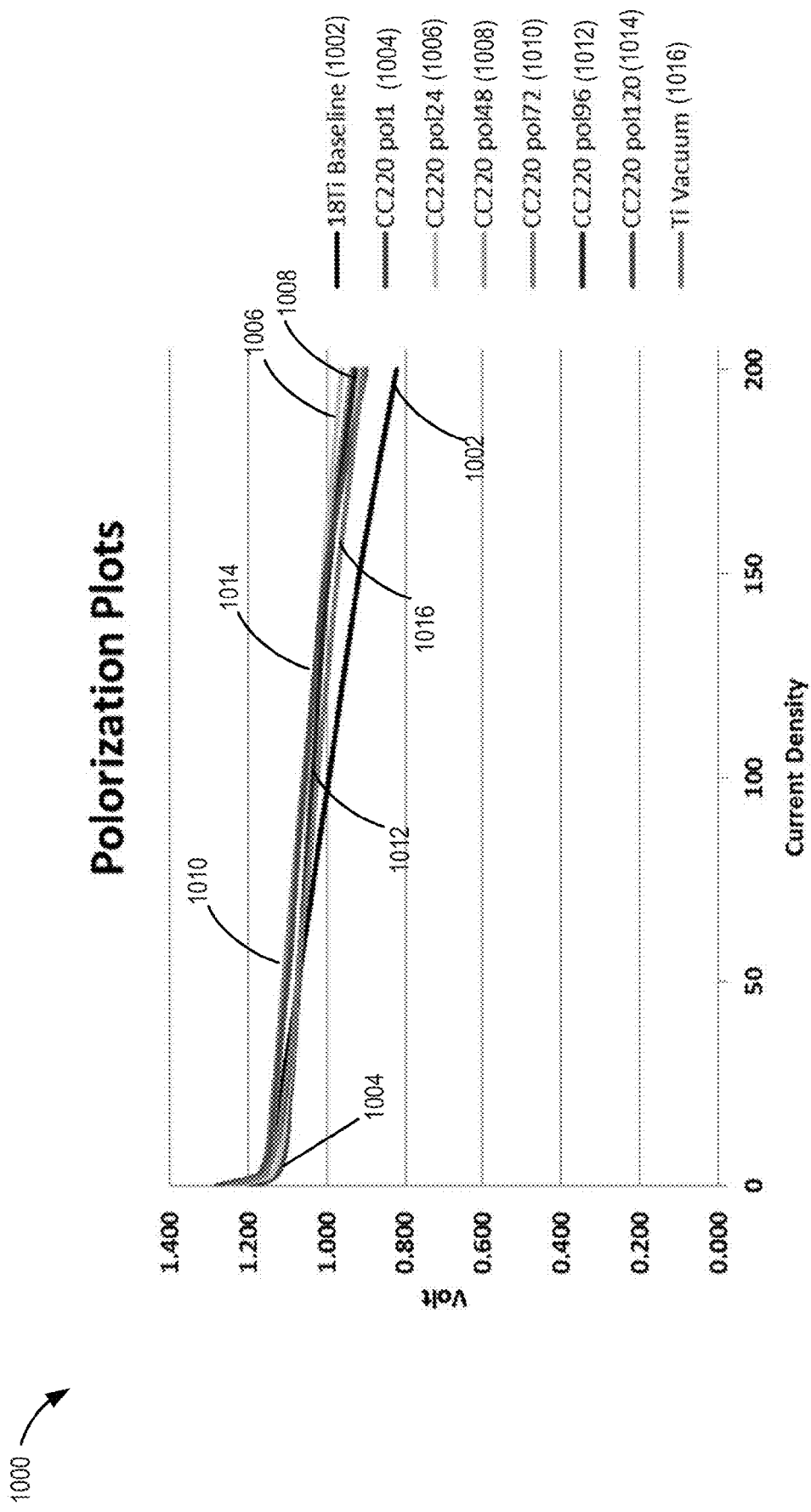
FIG. 10 illustrates a carbon-coated plastic mesh electrode performance throughout cycling.

Turning to FIG. 10, the cycle performance of one a carbon coated plastic mesh electrode is illustrated. The Ti mesh control electrode 1002 and Ti vacuum electrode 1016 are included as baselines. The carbon coated plastic mesh electrode was cycled for over 100 cycles and the performance monitored. The carbon coated plastic mesh electrodes polarizations were plotted at 1 cycle, 24 cycles, 48 cycles, 72 cycles, 96 cycles, and 120 cycles at 1004, 1006, 1008, 1010, 1012, and 1014 respectively. From FIG. 10, the carbon coated plastic mesh electrode is seen to retain the current density versus voltage response in comparison to the Ti vacuum electrode 1016 as well as show an improved response in comparison to the Ti mesh control electrode 1002.

Drawbacks of redox flow battery negative electrode (e.g., plating electrode) configurations with an IDFF flow configuration and a titanium mesh include high cost, inadequate plating density, and gas bubble entrapment. Inadequate plating density precludes the redox flow battery system from achieving a high enough battery charge capacity. For example, negative electrode configurations with IDFF flow configurations and Ti mesh are unable to provide over eight hours of charge capacity while maintaining cost metrics and battery performance metrics (reduced losses during charge/discharge cycling, and the like) is desirable for redox flow battery applications. Furthermore, gas bubble entrapment can reduce the accessible plating area of the electrode and can embrittle the plated electrode material, thereby reducing the battery charge capacity and degrading the electrode.

To reduce manufacturing costs, redox flow batteries may be designed to operate at higher current densities. For example, a redox flow battery system operating with a current density of 60 mA/cm2 may have one fourth the number of battery cells as a redox flow battery system operating at 15 mA/cm2. However, redox flow batteries operating at higher current densities can present additional redox flow battery system design challenges. For example, plating stresses can increase at higher plating current densities, resulting in higher-stressed and more brittle plating electrodes. Additionally, redox flow battery system with higher liquid electrolyte flow rates may be utilized in order to enable supplying the higher current density; furthermore, a larger electrode gap may be configured to accommodate the higher flow rates. The electrode gap for a redox flow battery cell comprises a representative length calculated from the ratio of the current density to the charge per metal ion plated at the electrode, as shown by equation (5).

$$\text{Electrode Gap [cm]} = \frac{T*M*J}{\rho*n*F} \quad (5)$$

where T=time (s); M=molar mass (g/mol); J=current density (A/cm2); $\rho$=density of plating metal (g/cm3); n=# electrons per mole of metal plated; F=Faradays constant (96485.3365 C/mol). The current density may be determined based on the active area of the electrode, A (cm2). For the case of an iron redox flow battery, the plating metal is iron, and the number of electrons per mole of iron plated is 2. The battery charge and the plating density are calculated as shown in equations (6) and (7), respectively.

$$\text{Charge}\left[\frac{C}{cm^2}\right] = J*T \quad (6)$$

$$\text{Plating Density}\left[\frac{mAh}{cm^2}\right] = \text{Charge}*\frac{1000}{3600} \quad (7)$$

In addition to accommodating the higher flow rates concomitant with providing higher current densities the redox flow battery electrode gap may further be increased to allow sufficient purging of any gas evolved within the negative electrolyte flow field and at the negative electrode surface. For example, hydrogen gas may be produced, as described above with reference to equations (3) and (4), during reduction of hydrogen protons H+(equation (3)), and the corrosion of deposited iron metal (equation (4)). Removal of hydrogen gas can aid in decreasing battery electrode degradation since the presence of hydrogen at the negative electrode can reduce the electrode active area accessible for plating and can embrittle the plated metal thereat. The performance metrics of redox flow battery systems can suffer due to increased ohmic losses that can scale linearly with current and electrode gap size; the electrode gap may not simply be increased without bound to accommodate higher current densities and to allow sufficient gas purging.

Turning now to FIGS. 16, 17A-D, 20A, and 20B they illustrate structural features of negative electrode configurations that can aid in reducing a current density distribution variance relative to conventional designs, while accommodating higher battery capacity, lowering manufacturing costs, maintaining redox flow battery performance, and lowering gas bubble entrapment in the electrolyte flow field proximal to the surface of the electrode. The configurations are depicted relative to a three-dimensional x-y-z coordinate axis, where the x-axis is aligned in a width-direction, the y-axis is aligned in a length direction, and the z-axis is aligned in a height or thickness direction of the electrode stack assembly. The z-axis refers to a transverse axis that is perpendicular to the x-y plane of each layer of the electrode stack assembly.

In a redox flow battery system, a negative electrode may be positioned within an electrode stack assembly 2000 as shown in FIG. 20A. The electrode stack assembly 2000 may include an electrically insulating ion conducting barrier 2020, such as an ion-exchange membrane. A positive (redox) flow field plate 2010 and a positive (redox) electrode may be placed at a positive (redox) side of the membrane. The positive electrode may be positioned adjacent to the membrane to facilitate migration of ions across the membrane to the negative (plating) side of the stack assembly. In this way, the positive electrode is interposed between the positive flow field plate and the membrane, and the positive electrolyte flow field is sandwiched between the positive flow field plate and the positive electrode. The positive flow field plate 2010 may include an interdigitated flow field plate, including interdigitated positive flow field plate ribs 2012. In other examples, the positive flow field plate 2010 may include other configurations of ribbed flow field plates such as a serpentine flow field plate with non-interdigitated positive flow field plate ribs 2012. An example of an interdigitated flow field (IDFF) plate 1800 is shown in FIG. 18 with interdigitated ribs 1812 and 1822 for directing flow of electrolyte at the positive side of the membrane. In particular, electrolyte may be directed from an inlet 1810 to an outlet 1820 of the positive flow field plate 2010. As shown in the cross-sectional view 1850 of the interdigitated positive flow field plate, electrolyte flow (indicated by the arrow 1830) from the interdigitated inlet channels of the interdigitated ribs 1812 to the outlet channels of the interdigitated ribs 1822 can occur by way of the porous positive electrode 1840, thus providing forced convection of the electrolyte. In other examples, the positive flow field plate may be a non-IDFF flow plate such as a serpentine flow plate, a spiral flow plate, a pin flow plate, or a parallel flow plate with non-interdigitated ribs. Owing to the dead-end channels, the IDFF flow field may be advantageous because electrolyte fluids may be distributed across the flow field more thoroughly, filling the interdigitated dead-end channels before diffusing through the porous positive electrode 1840 from the inlet channels to the outlet channels.

At the negative (plating) side of the electrode stack assembly (e.g., negative side of the membrane 2020), a negative electrolyte flow field is sandwiched between the membrane 2020 and a negative electrode configuration, including a flat negative flow field plate 2040, upon which metal is plated during charging of the battery, and a non-conductive negative electrode spacer 2026 (e.g., plating electrode spacer). Because the negative electrode spacer 2020 is non-conductive and without a conductive coating, plating of metal during battery charging does not occur thereon. However, the negative electrode spacer 2020 can facilitate plating on the negative flow field plate 2040 by aiding in a more uniform distribution of electrolyte ions from the membrane 2020 to the negative flow field plate 2040, and thereby reducing current density distribution variance thereat. The negative electrode spacer 2026 further aids in physically supporting the negative electrolyte flow field between the membrane 2020 and the negative flow field plate 2040, which can help to maintain higher electrolyte flow rates to sustain higher charging current densities and gas purging rates. Because the negative flow field plate 2040 is flat, there is no defined negative electrolyte flow field. In this way, an electrode gap between the negative electrode and the negative flow field plate can be increased relative to systems having non-flat negative flow field plate, and higher electrolyte flows concomitant with higher current densities can be accommodated. The flat negative flow field plate also facilitates increased purging of gas, such as hydrogen gas, evolved during the charging and discharging chemical reactions (c.f., equations (3) and (4)) relative to non-flat flow field plates, thereby maintaining the electrode active area for plating, reducing embrittling of the plated metal, and increasing battery performance.

As shown in FIG. 20A, the negative electrode configuration includes a negative electrode spacer 2026 positioned on the membrane-facing side of the negative flow field plate 2040. In other words, the negative electrode spacer 2026 of the negative electrode configuration may be interposed between the membrane 2020 and the negative flow field plate 2040. The negative electrode spacer 2026 may include an array of main ribs 2030 that are oriented more parallel to the positive flow field plate ribs 2012 of the positive flow field plate on the positive side of the membrane 2020, and an array of support ribs 2032 oriented more transversely to the main ribs 2030 and more transversely to the positive flow field plate ribs 2012 on the positive side of the membrane 2020. As described above with reference to FIG. 18, the positive flow field plate ribs 2012 of the positive flow field plate 2010 may include interdigitated ribs; however, in other examples, the positive flow field plate 2010 may include non-interdigitated ribs such as in the case of a parallel flow field plate or a serpentine flow field plate.

At the negative electrode spacer 2026 of the negative electrode configuration, each of the support ribs 2032 may be transversely joined to each of the main ribs 2030. In some examples, the main ribs 2030 may extend away or distally from the support ribs 2032 and the membrane 2020 so that the support ribs 2032 are positioned proximally to the membrane 2020 relative to the main ribs 2030. The main ribs 2030 may include a solid, monolithic structure having a uniform cross-section in a longitudinal direction (y-direction), the longitudinal direction parallel to the positive flow field plate ribs as shown in the cross-sectional views of the electrode stack assemblies of FIGS. 20A and 20B.

In addition to being oriented more parallel to the positive flow field plate ribs 2012 of the positive flow field plate 2010, the main ribs 2030 may further be aligned opposite the positive flow field plate ribs 2012 across the membrane 2020. As such, upon compression of the negative flow field plate 2040 and the positive flow field plate 2010 toward the membrane 2020, the main ribs 2030 are opposingly supported by the positive flow field plate ribs 2012 across the membrane without buckling and without altering the shape and dimensions the positive and negative electrolyte flow fields. In other words, the main ribs 2030 provide structural support to the positive flow field plate ribs 2012, and vice versa, such that upon compression of the electrode stack assembly 2000 during assembly and operation of the redox flow battery system, the flow and shape of the positive electrolyte flow field between the positive flow field plate 2010 and the positive electrode 2016, and the negative electrolyte flow field between the negative flow field plate 2040 and the negative electrode 2026 spacer are not substantially constricted or altered. Aligning the main ribs 2030 opposite the positive flow field plate ribs 2012 of the positive support plate may include positioning the main ribs 2030 within a negative supporting region opposite the positive flow field plate ribs 2012 positioned within a positive supporting region. The negative supporting region may correspond to the width-wise (e.g., in the x-direction) dimensions of the main rib 2030, as shown by the dashed lines 2038. The positive supporting region may correspond to the width-wise (e.g., in the x-direction) dimensions of the positive flow field plate ribs 2012, as shown by dashed lines 2018.

Positioning the main rib 2030 opposite to the positive flow field plate ribs 2012 may include having the bounds of the negative supporting region (e.g., dashed lines 2038) fall within the bounds of the positive supporting region (e.g., dashed lines 2018). For the case where the bounds of the negative supporting region (e.g., dashed lines 2038) are wider than the bounds of the positive supporting region (e.g., dashed lines 2018), positioning the main rib 2030 opposite to the positive flow field plate ribs 2012 may include having the bounds of the positive supporting region (e.g., dashed lines 2018) fall within the bounds of the negative supporting region (e.g., dashed lines 2038). As such, positioning the main ribs 2030 opposite to the positive flow field plate ribs 2012 may include centering the main rib 2030 across from the positive flow field plate rib 2012 such that the positive supporting region is centered within the negative supporting region, or such that the negative supporting region is centered within the positive supporting region. Furthermore, in the case where the main ribs are aligned parallel to the positive flow field ribs, positioning the main ribs 2030 opposite to the positive flow field plate ribs 2012 may include positioning each of the negative supporting regions parallel with one of the positive supporting regions. In this way, the electrode stack assembly can support enough physical compression so that positive and negative electrolyte flow distribution over the positive flow field plate and the negative flow field plate, respectively, can be maintained during redox flow battery system operation and assembly. Positioning the main rib 2080 such that the bounds (e.g., dashed lines 2088) of the negative supporting region fall outside of the bounds (e.g., dashed lines 2068) of the positive supporting region, as shown in FIG. 20B, can increase a risk of buckling or distortion of the positive and negative electrolyte flow fields, which can reduce plating capacity, plating quality, ion-exchange rates, and electrolyte flows, thereby degrading redox flow battery performance.

In another example, the main ribs 2030 may be positioned opposite to the positive flow field plate ribs 2012 such that the negative supporting region and the positive supporting region partially overlap. Partially overlapping the negative supporting region and the positive supporting region may include oppositely positioning the main ribs 2030 to the positive flow field plate ribs 2012 such that the portion of the negative supporting region within the bounds of the positive supporting region is greater than a threshold overlap. In on example, the threshold overlap may comprise oppositely positioning the main ribs 2030 to the positive flow field plate ribs 2012 such that more than half (e.g., more than 50%) of the negative supporting region falls within the bounds of the positive supporting region. Partially overlapping the negative supporting region and the positive supporting region less than the threshold overlap may increase a risk of buckling and constricting of the negative and positive electrolyte flow fields, and damaging of the positive electrode. As described above, the positive flow field plate ribs 2012 may be interdigitated, serpentine, parallel, as well as other configurations. Thus, a number, pitch (spacing), and width-wise dimension (e.g., in an x-direction) of the main ribs 2030 of the negative electrode spacer 2026 may be selected in order to facilitate oppositely aligning and positioning the main ribs 2030 with the positive flow field plate ribs 2012. In other words, the positioning, main rib pitch, and main rib dimensions may be correspondingly selected and adjusted based on the design and configuration of the positive flow field plate in order to sufficiently support the loading and compression of the positive and negative electrolyte flow fields.

Figure 16:
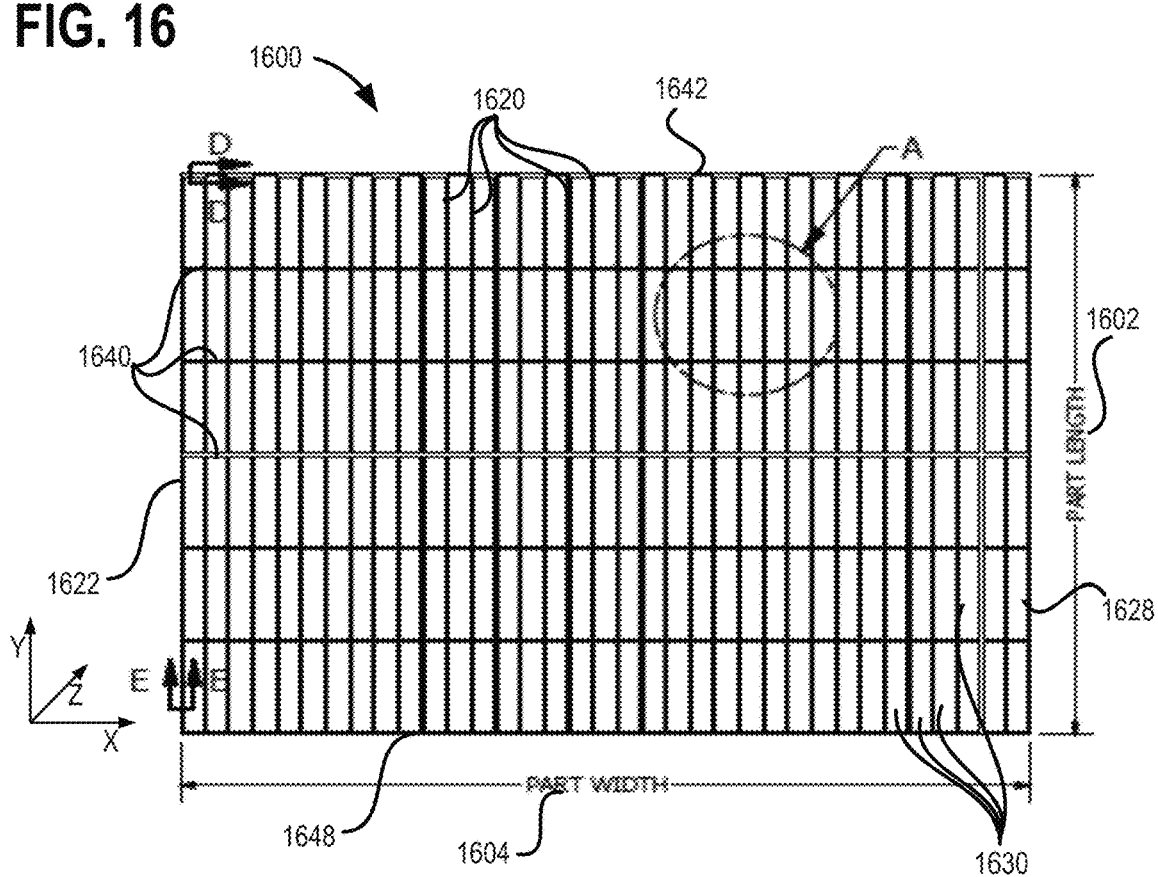
FIG. 16 illustrates a plan view of an example electrode configuration for a redox flow battery system.

Turning now to FIG. 16, an example configuration for a negative electrode spacer 1600 may include a plurality of main ribs 1620 oriented more parallel to an electrode length 1602 (e.g., y-direction) and a plurality of support ribs 1640 oriented more parallel to an electrode width 1604 (e.g., x-direction). In this way, the support ribs may be oriented transversely to the main ribs 1620, and the main ribs 1620 may be oriented more parallel to the positive flow field plate ribs 2012 across the membrane 2020. In the case of the example negative electrode spacer 1600 illustrated in FIG. 16, where the main ribs 1620 are perpendicular to the support ribs 1640, the main rib length is given by the electrode spacer length 1602 and the support rib length is given by the electrode spacer width 1604. As shown in the example negative electrode spacer 1600, a number of main ribs 1620 may be greater than a number of support ribs 1640. In other cases, the number of main ribs 1620 may be less than a number of support ribs 1640. Reducing a number of support ribs 1640 can aid in increasing a functional electrode active area thereby increasing plating capacity, and reducing a variance of a current density distribution across the electrode during redox flow battery charging and discharging thereby reducing a risk of shorting and electrode degradation. The main ribs 1620 and the support ribs 1640 may be rigid and joined at their intersecting points, forming a regular array of evenly-spaced and evenly-sized openings 1630 in the electrode. In particular, the main ribs 1620 and the support ribs 1640 may be non-wovenly joined or connected to form a non-woven framework, spacer, support, brace, scaffolding, underpinning or other type of support structure that maintains a spacing for accommodating a negative electrolyte flow field between the plating flow field plate and the membrane.

Figure 17A:
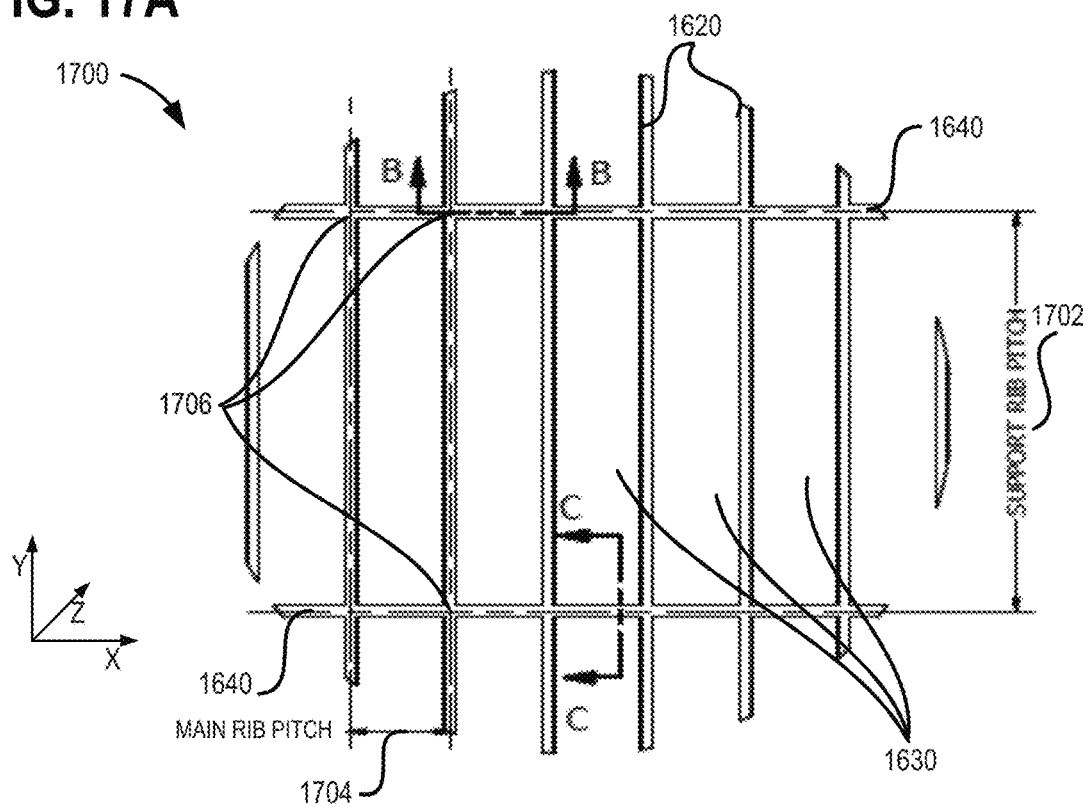
FIG. 17A illustrates a magnified partial detail view of the example electrode configuration of FIG. 16.
Figure 18A:
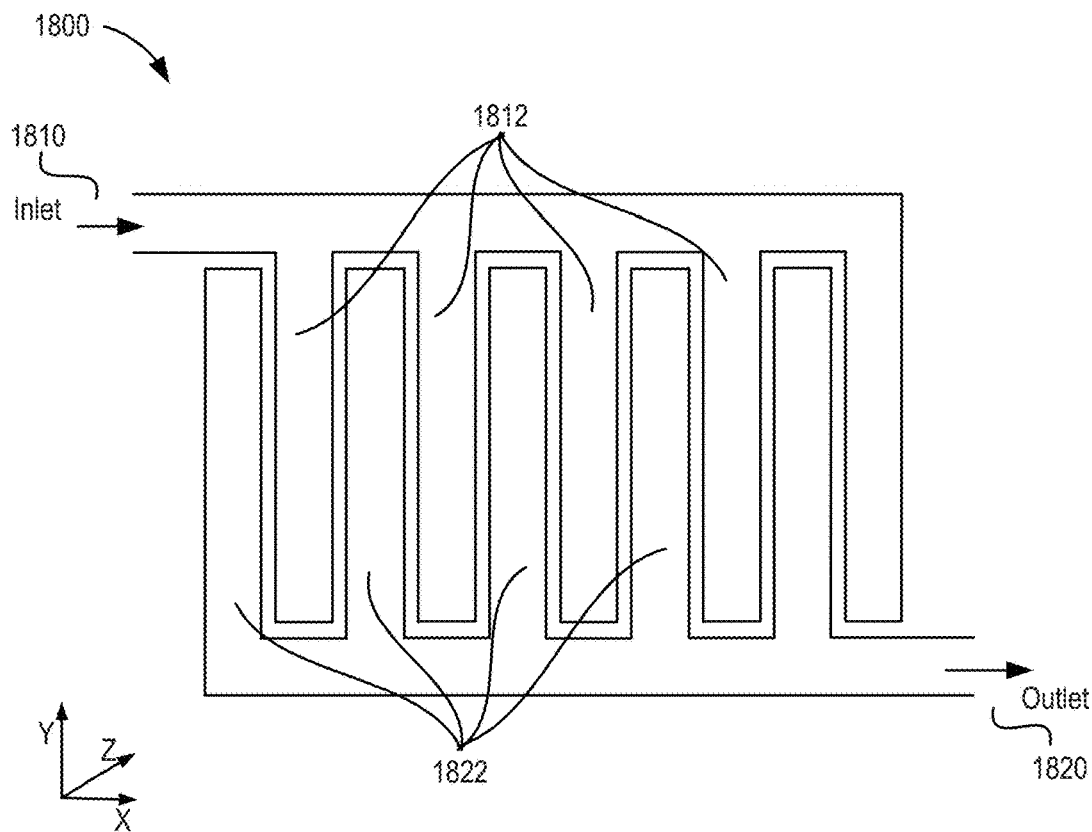
FIGS. 18A and 18B illustrate an example plan view and cross-sectional view schematic of an electrode configuration including an interdigitated flow field (IDFF).
Figure 18B:
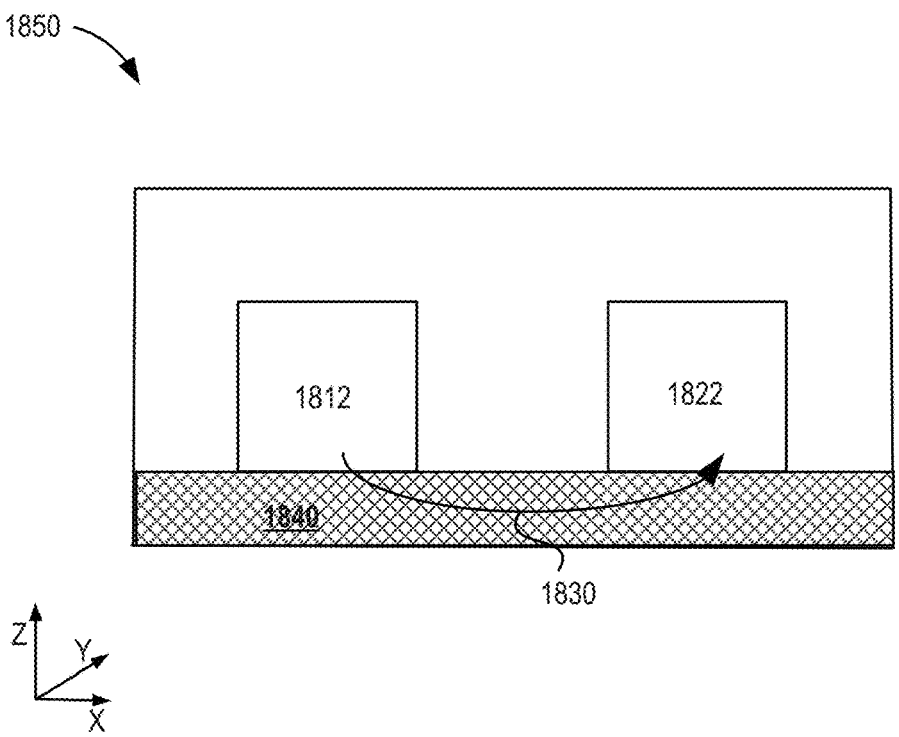

FIG. 17A illustrates a magnified plan view 1700 of detail A of the negative electrode spacer 1600 showing regular, evenly-spaced, and evenly-sized openings 1630 in the negative electrode spacer 1600. The spacing between consecutive adjacent main ribs, the main rib pitch 1704, and the spacing between consecutive adjacent support ribs, the support rib pitch 1702, define the number of joints 1706 between main ribs and support ribs. In the example negative electrode spacer 1600, the support rib pitch 1702 is greater than the main rib pitch 1704, so as to increase an active area available for plating, and giving rise to openings 1630 that are elongated in the electrode length 1602 direction. In other examples, the support rib pitch 1702 and the main rib pitch 1704 may be equivalent, giving rise to square openings 1630 or the support rib pitch 1702 may be less than the main rib pitch 1704, giving rise to openings 1630 elongated in the electrode width 1604 direction. The support rib pitch 1702 and the main rib pitch 1704 also define an opening density (area of openings: area of support ribs and main ribs) of the negative electrode spacer 1600. The support rib pitch 1702 and the main rib pitch 1704 may be selected to provide an opening density greater than a threshold opening density; the threshold opening density may correspond an opening density at which sufficient electrode plating may be supported to accommodate the desired redox flow battery cell capacity.

Reducing the opening density (e.g., increasing the support rib pitch 1702 and increasing the main rib pitch 1704) below the threshold opening density may decrease a plating capacity of the negative electrode spacer 1600, thereby reducing the charge/discharge capacity of the redox flow battery cell.

The desired charge/discharge capacity of the redox flow battery cell may be determined by the desired energy capacity of the redox flow battery system. For example, if a desired battery charge capacity is increased from 4 h to 8 h, then an opening density may be increased to increase a plating capacity of the negative electrode spacer 1600. Increasing an opening density may reduce a rigidity of the negative electrode spacer 1600; thus, the structural rigidity of one or more of the main ribs 1620 and/or one or more of the support ribs 1640 may be increased in response to increasing the opening density. In one example, structural rigidity of the negative electrode spacer 1600 may be increased by increasing a main rib thickness 1718 and/or support rib thickness 1712. In this way, the redox flow battery cell capacity can be increased while maintaining a structural rigidity of the negative electrode spacer 1600. The main rib thickness 1718 may be greater than the support rib thickness 1712 or the main rib thickness 1718 may be less than thee support rib thickness 1712. A main rib thickness 1718 greater than a support rib thickness 1712 may aid in increasing a spacing between the plating electrode and the plating flow field plate for accommodating a higher flow rate of plating electrolyte. Additionally, a main rib thickness 1718 greater than a support rib thickness 1712 may aid in increasing a structural rigidity of the plating electrode.

Turning now to FIG. 17B, it illustrates a cross sectional view 1710 of the section B-B in FIG. 17A. As described above, the main ribs 1620 may be positioned more toward a substrate side (e.g., a negative flow field plate side) 1719 of the negative electrode spacer 1600, whereas the support ribs 1640 may be positioned more toward a membrane side 1711 of the negative electrode spacer 1600. The main ribs 1620 can extend away (in a z-direction) and protrude away from the membrane side 1711 of the support ribs 1640 toward the substrate side 1719. As shown in the example of FIG. 17B, the main ribs 1620 can extend from the support ribs 1640 by a distance defined by a difference in the main rib thickness 1718 and the support rib thickness 1712. By extending away from the support ribs 1640 toward a substrate side 1719 of the negative electrode spacer 1600, the main ribs 1620 can increase a plating active area on the negative electrode, and provide structural support to the electrode stack assembly. Furthermore, upon sandwiching the negative electrode between the membrane and the negative flow field plate, the main ribs 1620 aid in reducing buckling of the negative electrolyte flow field and maintain negative electrolyte flow in the negative electrolyte flow field. As described above with reference to FIG. 17A, increasing a support rib thickness 1712 and/or a main rib thickness 1718 can aid in increasing a structural rigidity of the negative electrode spacer 1600.

Furthermore, the main ribs 1620 may extend away from the support ribs 1640 at a main rib draft angle 1716 (e.g. in the x-z plane). In some examples the main ribs 1620 may extend perpendicularly from the support ribs 1640; in other examples, the main rib draft angle 1716 may be ±3° from perpendicular to the support ribs 1640; in further examples, the main rib draft angle 1716 may be ±10° from perpendicular to the support ribs 1640. When the main rib forms an acute angle with the negative flow field plate 2040 (e.g., plating surface), the main rib can shadow flow of electrolyte current between the membrane and the plating surface, as described below with reference to FIGS. 21A-C. Shadowing can cause gradients in electrolyte current density reaching the plating surface and can thus give rise to higher variances in current distribution and plating densities at the negative flow field plate. Depending on manufacturing capabilities, the main rib draft angle 1716 of the negative electrode spacer 1600 may form a non-perpendicular angle with the support ribs 1640, resulting in some shadowing and current density gradients. Thus, reducing a deviation in the main rib draft angle 1716 from 90° can aid in reducing current density gradients during charging of the redox flow battery.

Turning now to FIG. 17C, it illustrates a cross sectional view of section C-C (e.g., a support rib 1640) of FIG. 17A, including a support rib radius 1724 and a support rib draft angle 1722. As shown in FIG. 17C, the support rib 1640 may be positioned more proximally to a membrane side of the negative electrode spacer 1600, and may be semi-circular in cross-section with a support rib radius 1724 less than the main rib thickness 1718. The support rib draft angle 1722 may refer to an angle (in the x-y plane) between the main ribs 1620 and the supporting ribs 1640. For example, if the support ribs 1640 are oriented vertically, the support rib draft angle may be 0°. As shown in Table 2, the support rib length 1724 may be from 0.25 mm to 25 mm and the support rib draft angle may be from −10° to +10°. Turning now to FIG. 17D, it illustrates a cross sectional view 1730 of section D-D of FIG. 16. Cross-sectional view 1730 applies to the edge most support ribs 1642 and 1648 of the negative electrode spacer 1600. The edge most support ribs 1642 and 1648 may be formed at a transverse draft angle 1732 relative to vertical. In the case where the transverse draft angle 1732 is 90°, the edge most support ribs 1642 and 1648 are oriented vertically. When the transverse draft angle 1732 is greater than 90°, the edge most support ribs 1642 and 1648 are angled inwards, whereas when the transverse draft angle 1732 is less than 90°, the edge most support ribs 1642 and 1648 are angled outwards. Forming an acute transverse draft angle 1732 may aid in the passage of electrolyte fluid (e.g., liquid and gas) in the flow direction of the plating electrolyte flow field. However, forming the transverse draft angle smaller than a threshold transverse draft angle can increase manufacturing complexity and costs and may increase a risk of mechanical failure of the plating electrode due to the presence of sharper edges. Turning now to FIG. 17E, it illustrates a cross sectional view 1740 of section E-E of FIG. 16. Cross-sectional view 1740 applies to the edge most main ribs 1622 and 1628 of the negative electrode spacer 1600. The edge most main ribs 1622 and 1628 may be formed at a main rib draft angle 1742 relative to vertical. In the case where the main rib draft angle 1742 is 90°, the edge most main ribs 1622 and 1628 are oriented vertically. When the main rib draft angle 1742 is greater than 90°, the edge most main ribs 1622 and 1628 are angled inwards, whereas when the main rib draft angle 1742 is less than 90°, the edge most main ribs 1622 and 1628 are angled outwards. When the main rib draft angle 1742 deviates from 90°, a risk of larger gradients in current densities and plating may be increased during battery charging.

Table 2 lists example values for various electrode configuration features such as main rib length, main rib pitch, main rib height, main rib draft angle, support rib width, support rib thickness, support rib pitch, support rib draft angle, support rib length, and electrode width to length ratio. The main rib draft angle and/or the support rib draft angle may be selected to accommodate the electrode forming process, including injection molding and roll-to-roll processing. The main ribs and support ribs are not necessarily all equivalent in dimension, shape, and/or cross-section. For example, one or more of the main or support ribs may differ in length, thickness, position and the like. In particular, in some electrode configuration examples, the main ribs may include alternating values of draft angles for adjacent main ribs. In other examples, the main rib thickness may extend both beyond the support ribs toward the membrane and toward the flow field plate. In other examples, some of the main rib thicknesses may extend beyond the support ribs on the membrane side of the electrode, while other main rib thicknesses may extend beyond the support ribs on the substrate side of the electrode. When the main rib thickness extends beyond the support ribs 1640 on the substrate side of the electrode, the electrolyte-accessible surface area of the membrane may be increased, which can increase charging and discharging rates for the redox flow battery. Furthermore, positioning the support ribs 1640 more proximal to the membrane than the plating surface (e.g., negative flow field plate) can aid in reducing current density distribution variances at the plating surface, as further described below with reference to FIGS. 12-13.

TABLE 2

Electrode features and range of values

| Feature name | Range of values |
| --- | --- |
| Main rib length (in y-direction) | 0.25 mm to 10 mm |
| Main rib width (thickness in x-direction) | 0.25 mm to 10 mm |
| Main rib pitch | 0.5 mm to width of electrode |
| Main rib thickness (thickness in z-direction) | 0.25 mm to 12 mm |
| Main rib draft angle | 80° to +100° (−10° to +10° from perpendicular) |
| Support rib width (thickness in x-direction) | 0.25 mm to 10 mm |
| Support rib thickness (thickness in z-direction) | 0.25 mm to 11.5 mm |
| Support rib pitch | 0.25 mm to length of electrode |
| Support rib draft angle | 80° to +100° (−10° to +10° from perpendicular) |
| Support rib length (in x-direction) | 0.25 mm to 25 mm |
| Electrode width to length ratio | 0.03 to 33 |

Figure 21A:
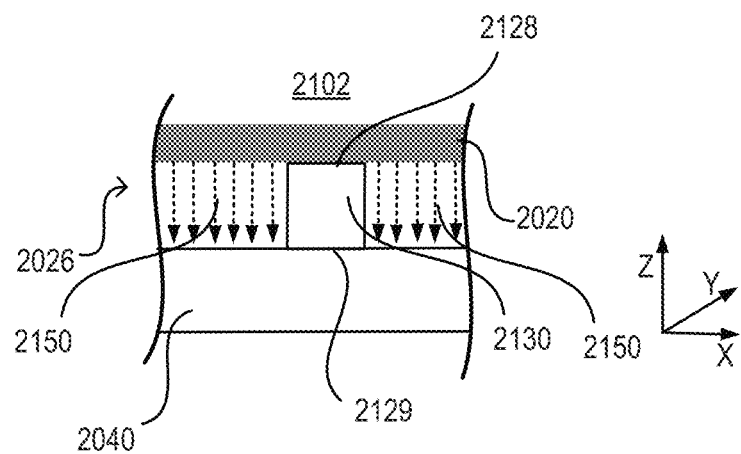
FIGS. 21A-C illustrate partial cross sectional views of an electrode stack assembly including various main rib configurations.
Figure 21B:
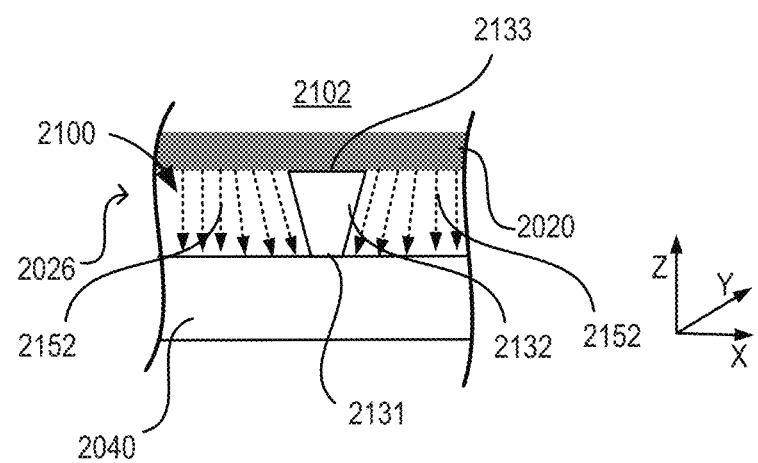
Figure 21C:
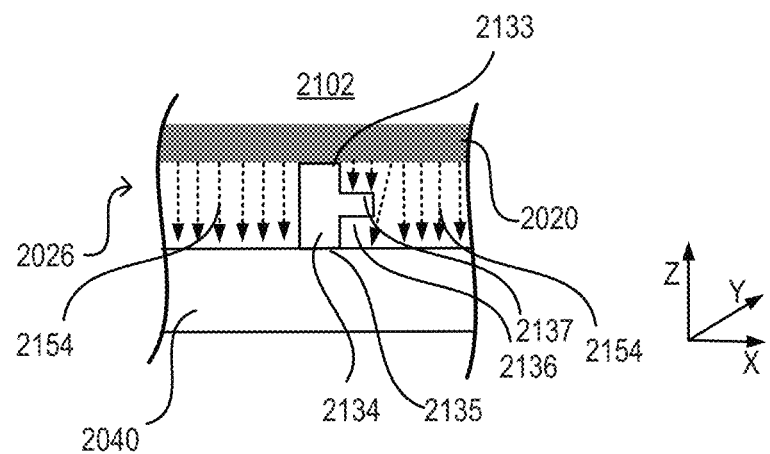
Figure 22A:
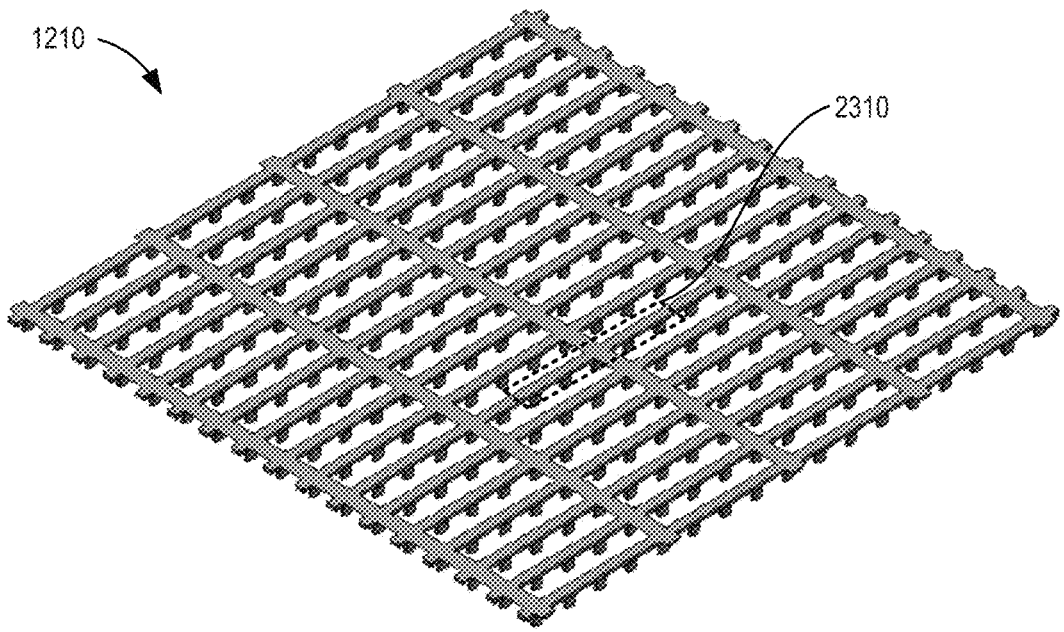
FIGS. 22A-D and FIG. 22F-K illustrate magnified plan views of the various electrode configurations of FIGS. 12-13.
Figure 22B:
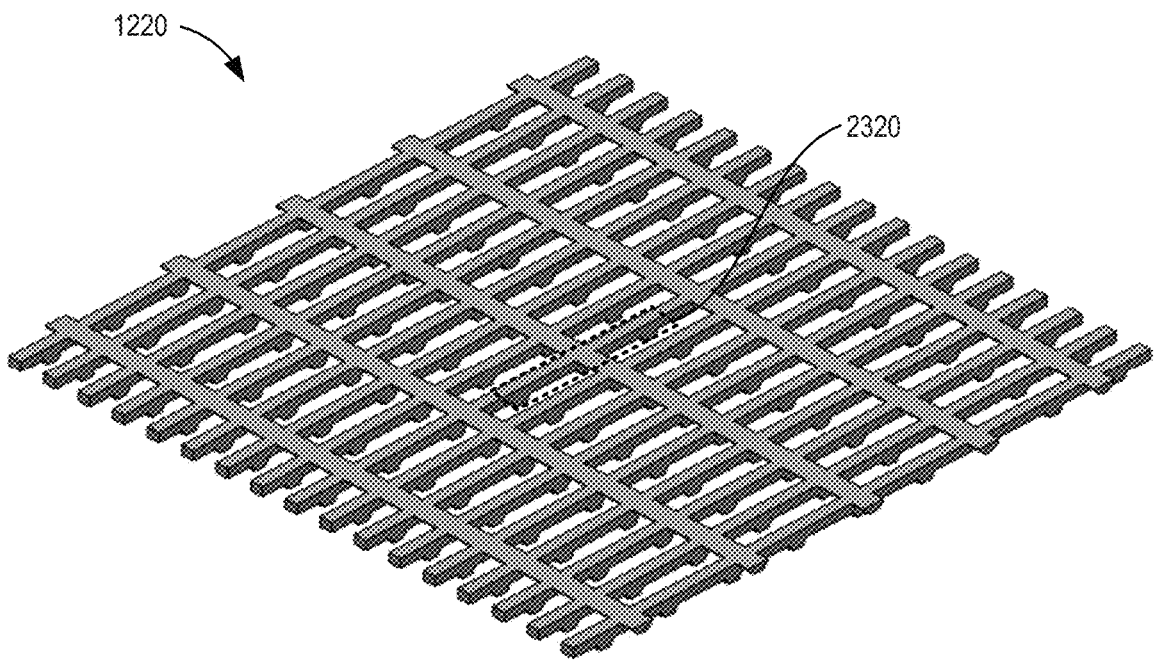
Figure 22C:
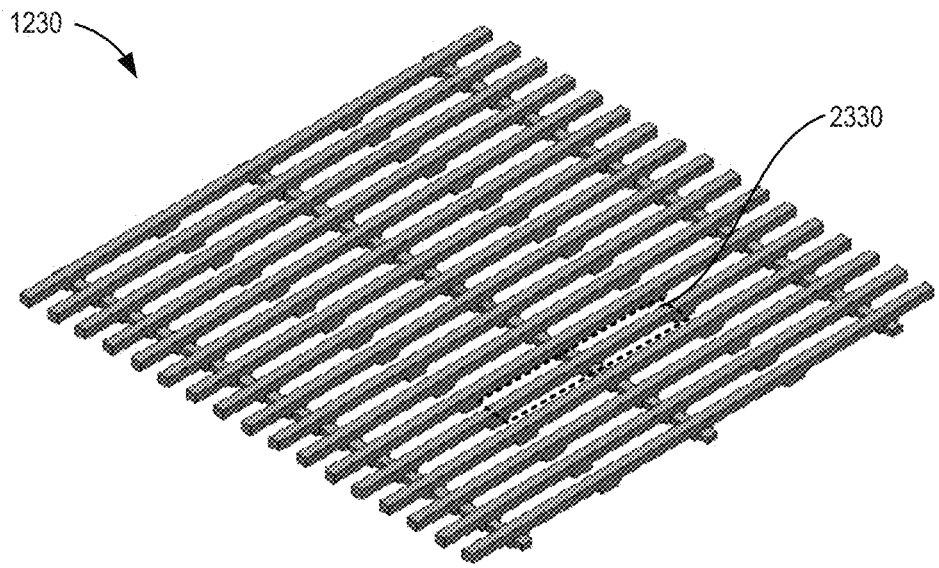
Figure 22D:
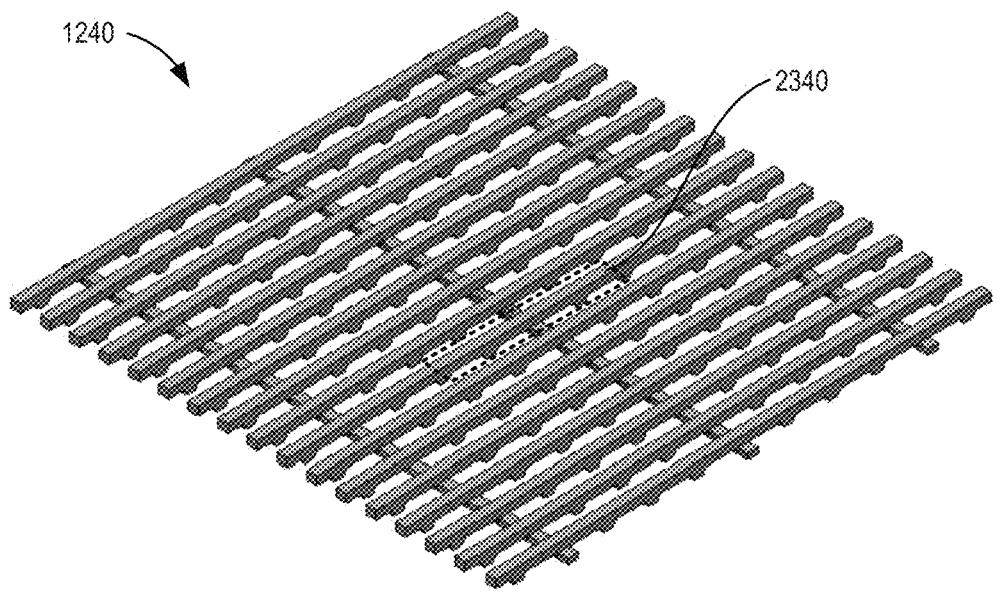
Figure 22F:
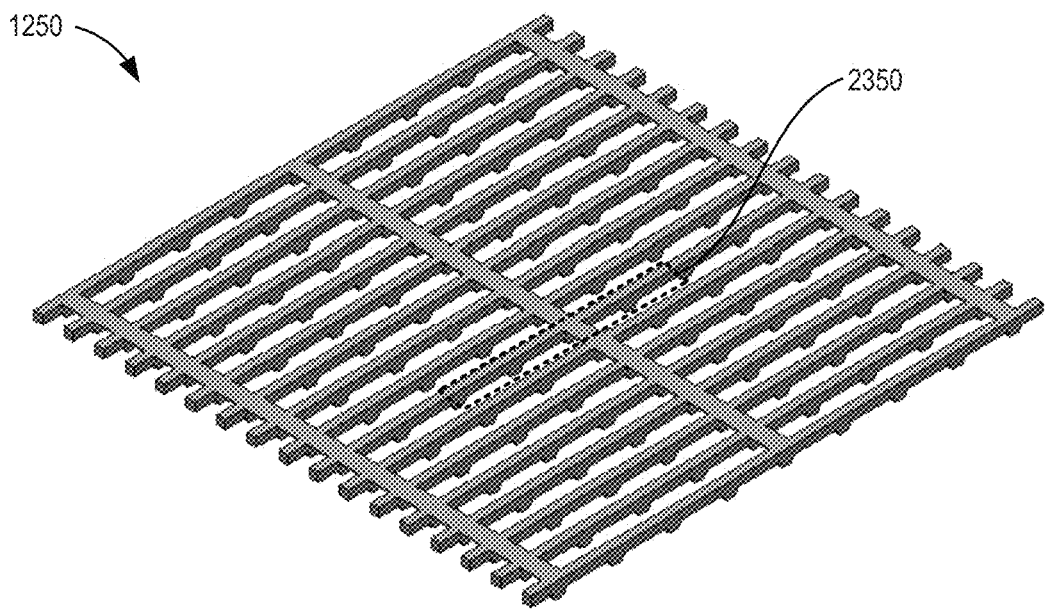
Figure 22G:
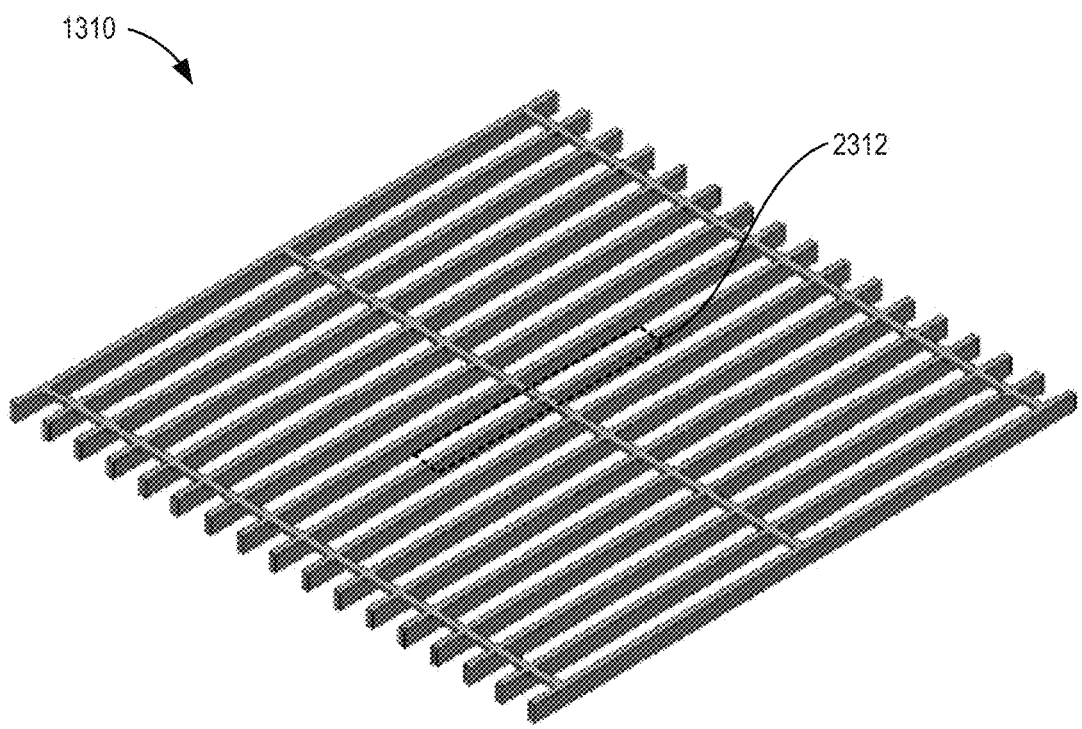
Figure 22H:
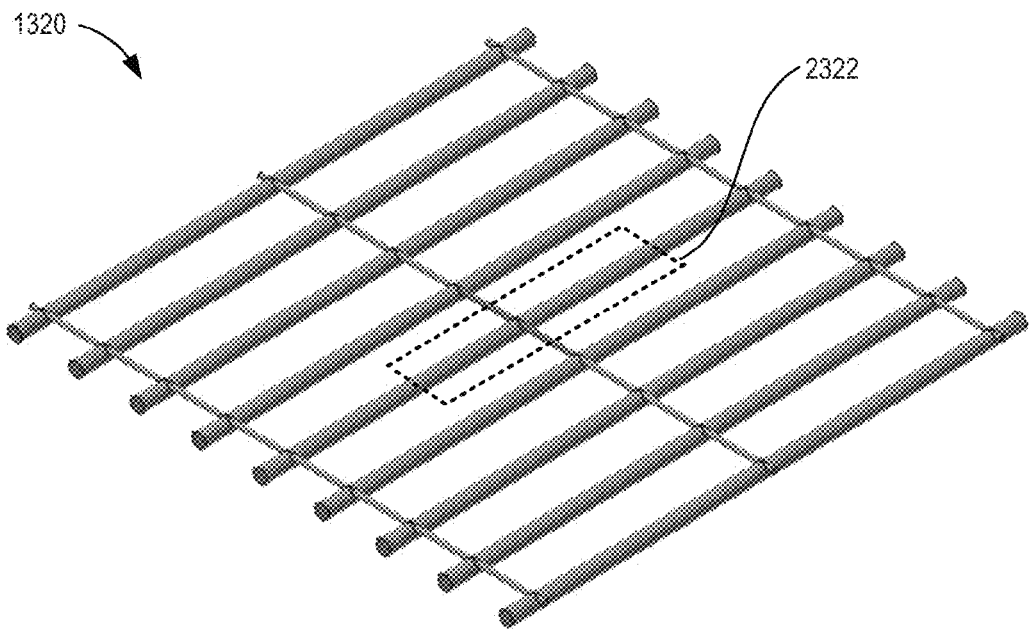
Figure 22I:
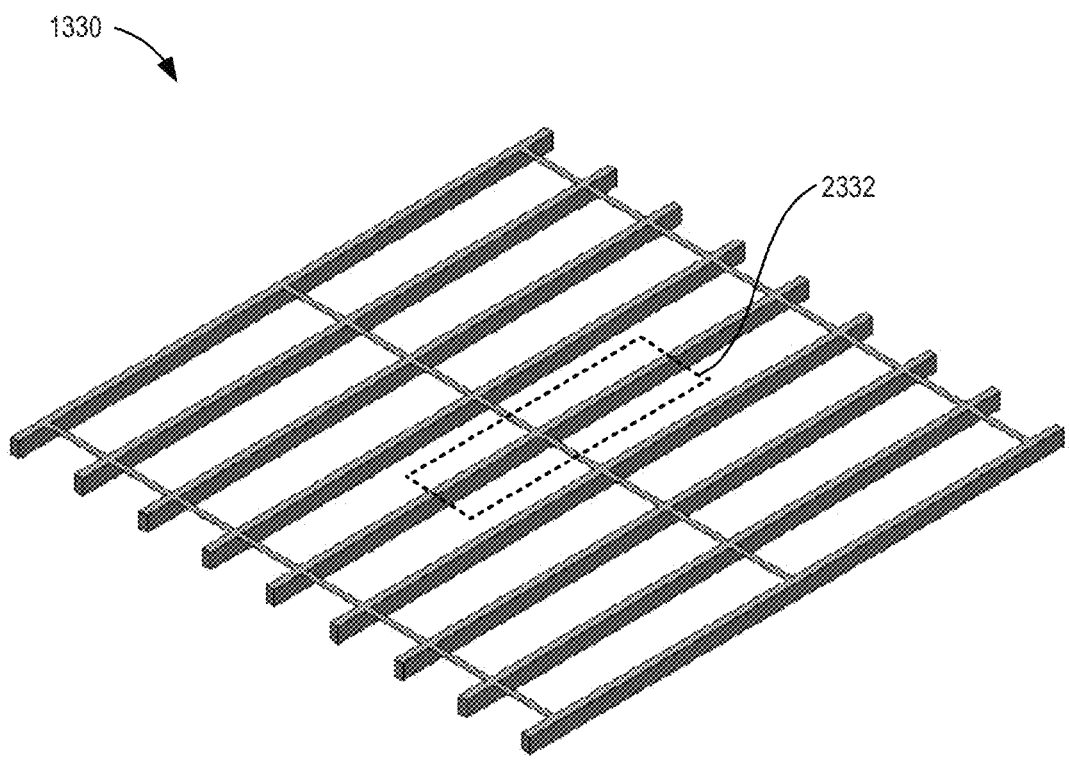
Figure 22J:
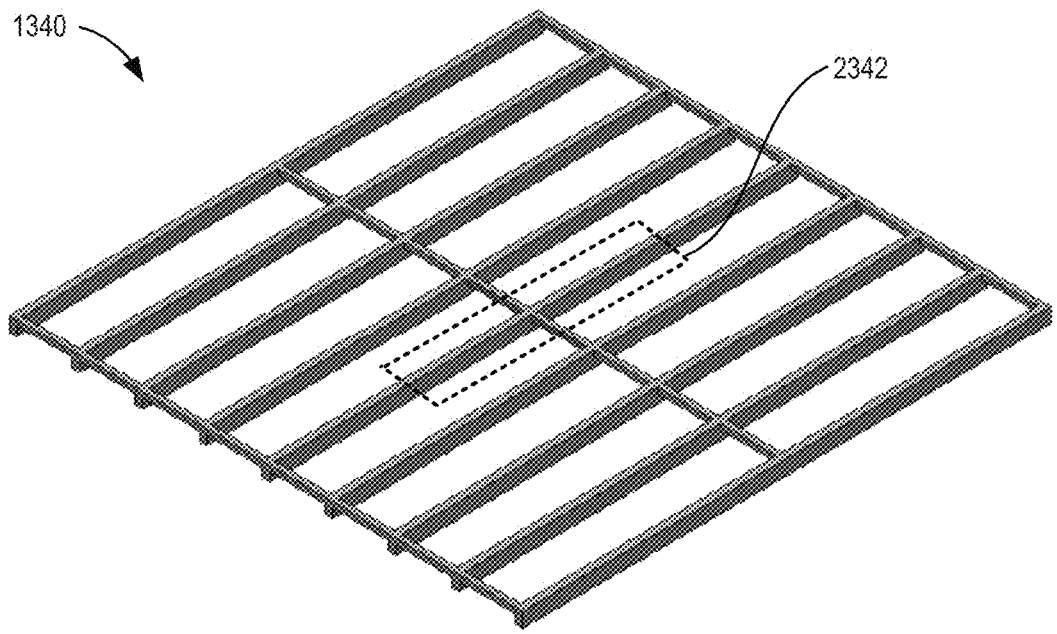
Figure 22K:
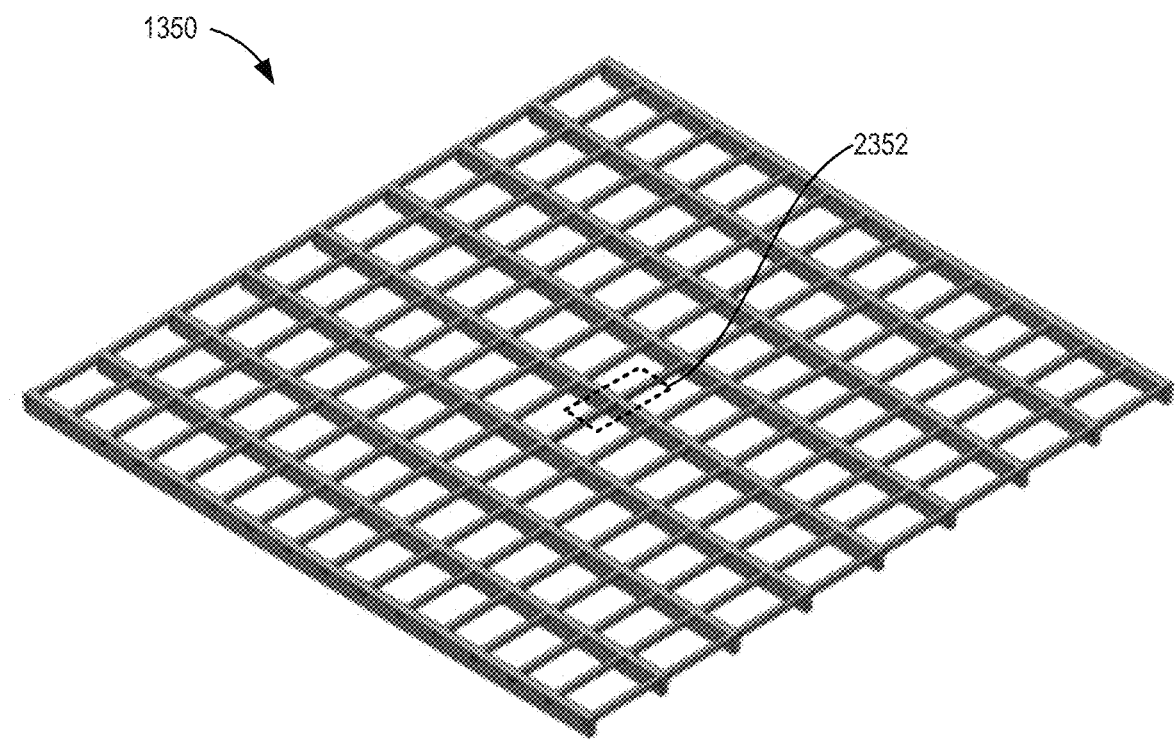

Turning now to FIGS. 21A-C, they illustrate partial cross-sectional views of electrode stack assemblies including a negative electrode spacer 2026, main rib, and negative flow field plate 2040 at a negative side of a membrane 2020 (opposite from the positive redox side 2102). Main rib 2130 includes a transverse cross-section (in the x-y plane) that is constant along a z-direction. Stated in another way, the main rib transverse cross-section may be constant along an axis perpendicular to the planes of the electrode assembly stack layers. In other words, the main rib transverse cross-section 2128 at the membrane is equivalent to the main rib transverse cross-section 2129 at the plating surface and the main rib is without undercuts (as described with reference to FIG. 21C). As such, electrolyte fluid and ionic current flow indicated by the dashed arrows 2150 from the membrane 2020 to the plating surface (negative flow field plate 2040) may be conveyed across the surface of the main rib 2130 unimpeded and may be more evenly dispersed and distributed across the plane (e.g., x-y plane) of the plating surface. In other words, negative electrode spacers 2026 with main ribs 2130 having a constant transverse cross-section from the membrane 2020 to the plating surface can aid in reducing ionic concentration gradients and current intensity gradients in the negative electrolyte flow field.

In contrast, main rib 2132 includes a transverse cross-section (in the x-y plane) that is continuously changing along a z-direction. Stated in another way, the main rib cross transverse section monotonically decreases from the membrane 2020 to the plating surface. In other words, the main rib transverse cross-section 2131 at the membrane may be larger (or smaller in other r examples) than the main rib transverse cross-section 2133 at the plating. As such, the larger main rib transverse cross-section 2131 partially shadows the plating surface, and electrolyte fluid and ionic current flow indicated by the dashed arrows 2152 spread and disperse from the membrane 2020 to the plating surface (negative flow field plate 2040), thereby introducing electrolyte concentration and current gradients. As such, electrolyte fluid and ionic current flow indicated by the dashed arrows 2152 from the membrane 2020 to the plating surface (negative flow field plate 2040) may be more less evenly dispersed and distributed across the plane (e.g., x-y plane) of the plating surface. Turning now to FIG. 21C, the main rib 2134 includes a main rib having a non-constant transverse cross-section 2133 between the membrane 2020 and the plating surface (e.g., negative flow field plate 2040). In particular, although the main rib 2134 transverse cross-section 2133 at the membrane that is equivalent to the main rib transverse cross-section 2133 at the plating surface, the cross-section of the main rib 2134 further includes an undercut 2136. Undercut 2136 may be formed by a protrusion (e.g. a pillar) 2137 extending from the main rib at least partially in a widthwise x-direction (e.g., having an x-component). Protrusion 2137 may include various geometries and shapes extending from the main rib, included rounded to square (as shown in FIG. 21C), finger-like, mound-like, and the like. Owing to the presence of protrusion 2137, a portion of the plating surface may be shadowed; in other words, the protrusion 2137 may obstruct a direct flow path from the membrane 2020 to the shadowed portion of the plating surface. As such electrolyte fluid and ionic current must flow around the protrusion 2137 in order to reach the undercut 2136 volume and the plating surface adjacent thereto (as illustrated by dashed arrows 2154). Furthermore, a portion of the flow may be blocked by the protrusion 2137, further increasing gradients in the electrolyte ion concentration and current between the membrane and the plating surface.

Current distribution can also have a large impact on battery performance because kinetic losses can scale exponentially with available electrode surface area. Furthermore, poor (more uneven, more imbalanced, and more non-uniform) current distribution across an electrode active area (e.g., a plating surface) can increase a risk of shorting of the redox flow battery cell. In the case of redox flow battery cells operating at higher plating densities, reducing current density variance (e.g., spread), can help slow and reduce a risk of shorting of the battery cell, as illustrated in the chart 1100 of FIG. 11. The current density variance can be evaluated by examining the current density Interquartile (IQR) and the current density Mean Absolute Deviation (MAD). Maintaining IQR<2.0 on the plating substrate (e.g., plating electrode substrate) while maintaining MAD<0.2 on the plating substrate can aid in substantially reducing a risk of battery shorting. As illustrated in the second and third rows of chart 1100, when MAD=4 and IQR=10 and when MAD=8 and IQR=20, the current distribution variance is higher and can begin to span the electrode gap at earlier times (e.g., T1, T2, Tn) leading to premature battery shorting, as compared to when MAD=0 and IQR=0 (top row of chart 1100).

Ten different negative electrode spacer configurations shown in charts 1200 and 1300 of FIGS. 12 and 13, respectively were evaluated, subject to the following criteria: the negative electrode spacer configuration is manufacturable by injection molding and/or roll-to-roll processing; the negative electrode spacer material is compatible with electrolyte and redox flow battery cell operating conditions; the manufacturing cost is less than $30/kW; current density IQR<2.0 for the plated electrode on the plating substrate; current density MAD<0.2 for the plated electrode on the plating substrate; the Area Specific Resistance (ASR) of the plated electrode on the plating substrate≤0.9 ohm-cm2; the negative electrode spacer support provides adequate structural support to the positive electrode (see details below); and any gas bubble evolved during the battery cell operation can be purged without additional treatment (electrode must exhibit some degree of hydrophobicity). Revs. A-d and F-J (e.g., corresponding to negative electrode spacer configurations 1210, 1220, 1230, 1240, 1250, 1310, 1320, 1330, and 1340, respectively) may be manufactured by injection molding, whereas Rev. K (negative electrode spacer configuration 1350) may be manufactured by roll-to-roll processing.

As shown in charts 1200 and 1300, the negative electrode spacer configurations Revs. G, I, J, and K exhibited current density distribution variances satisfying the criteria IQR<2.0, MAD<0.2, and ASR≤0.9 ohm-cm2. The rightmost column of charts 1200 and 1300 illustrate 2D plots of current density distributions at 45 mA/cm2 at the plating surface (in an x-y plane) adjacent to repeat elements in each negative electrode spacer configuration. The repeat elements 1212, 1222, 1232, 1242, 1252, 1312, 1322, 1332, 1342, and 1352 refer to a repeating structure within the Rev. A, B, C, D, F, G, H, I, J, K negative electrode spacer configurations, respectively, centered on the intersection of a support rib and a main rib, and extending half a support rib pitch in both lengthwise directions (y-direction), and extending half a main rib pitch in both widthwise directions (x-direction). Enlarged plan views of the negative electrode spacer configurations and their corresponding repeat units are illustrated in FIGS. 22A-D and FIGS. 22F-K, respectively. The current intensities at each point in the current density distributions are indicated by color, with red regions indicating higher current intensities and blue regions indicating lower current intensities. Grey areas indicate the inactive regions where the main ribs and support ribs of the negative electrode spacer contact the plating surface.

As shown from the current density distributions of the repeat elements 1210, 1220, 1230, 1240, and 1250, negative electrode spacer configurations A-D and F, including undercuts in the main ribs and shadowed regions therebelow, exhibit higher current density distribution variances, including non-uniform, uneven regions where areas of high current density may be adjacent to areas of low current density. For example, in configuration A, current density gradients are observed surrounding the undercut regions along the main rib between the inactive regions 1214 where the main rib is not undercut and contacts the plating surface. Similar gradients in current density arise for configurations B, C, D, and F, all of which include undercut structural features in the main ribs of the corresponding repeat unit. These current density gradients are even more noticeable for negative electrode spacer configurations C and D, where the support ribs are positioned at a substrate side of the main ribs. In effect, positioning the support ribs at a substrate side of the main ribs undercuts the main rib along its entire length, leading to higher current density gradients. Furthermore, placing the support ribs on a substrate side of the negative electrode spacer renders the portions of the plating surface in contact with the support ribs inactive, as indicated by inactive regions 1236 and 1246. In other words, positioning the support ribs at the membrane side of the negative electrode spacer can aid in reducing current density gradients at the plating surface during battery charging and discharging.

As discussed above with reference to FIGS. 21A-C, structural features in the main ribs such as undercuts and protrusions extending at least partially in the x-direction may increase a risk of higher current density distribution variance due to shadowing, which can give rise to gradients in electrolyte ion flow rates, concentrations, and current. In contrast, negative electrode spacer configurations G, I, and J include solid, monolithic main ribs without undercuts or protrusions and main rib draft angles that are 0 degrees from perpendicular to the support ribs. As such, shadowing in the vicinity of the regions where the main ribs contact the plating surface is reduced and current gradients thereat may be virtually eliminated. Rev. K includes monolithic main ribs without undercuts or protrusions, however due to manufacturing capabilities, the main rib draft angles are less than perpendicular with the support ribs, which results in shadowing and current density gradients 1354 in the vicinity of the shadowed portions of the plating surface. Rev. H (negative electrode spacer configuration 1320) includes cylindrical main ribs having a circular cross-section. Accordingly, electrolyte current converges and diverges as it flows from the membrane around the main ribs to reach the plating surface, thereby creating electrolyte concentration gradients and increasing variances in the current density distribution at the plating surface in the regions 1324 along the length of the main ribs.

Current gradient regions 1216, 1226, 1236, 1246, 1256, 1316, 1326, 1336, 1346, and 1356 are also observed to be associated with each of the support ribs. Thus, reducing the number of transverse support ribs (e.g., increasing the support rib pitch) can also aid in reducing current densities and reducing current density distribution variance. Reducing the number of main ribs (e.g. increasing the main rib pitch) may further aid in reducing current densities and reducing current density distribution variance, as is apparent from comparison of negative electrode spacer configurations 1310 (main ribs corresponding to every positive flow field plate rib and 1330 (main ribs corresponding to every other positive flow field plate rib). Reducing a number of main ribs can aid in reducing current density distribution variances as long as sufficient structural support can be conferred to the electrode stack assembly during compression after assembly of the battery cell, and during battery cycling (charging/discharging). In particular the electrode spacer configuration may be maintained rigid enough such that it does not buckle from the compression when the redox flow battery system is assembled. In one example, main ribs may be positioned on the negative side of a redox flow battery cell membrane opposite every other (e.g., alternate) rib of an interdigitated flow plate on the positive side of the membrane.

The current density distributions for the ten different negative electrode configurations (Rev. A-D and F-K) are also plotted in a box-whisker plot 1400 in FIG. 14. The box-whisker plot 1400 plots the current density distribution as quartiles. The shaded boxes illustrate the current density distribution median value (indicated by dashed lines) inside a box (shaded boxes) bounded by the largest first quartile and smallest third quartile values. The whiskers lying beyond the borders of the box represent the upper and lower quartile distribution endpoints. Outliers beyond the whiskers are shown as unshaded rectangles. The Revs. G, I, J, and K are represented by small boxes and short whiskers with few outliers, indicating narrower (smaller variance) current density distributions. The current density distribution of Rev. I may be preferred because it is narrower with fewer (and less extreme) outliers.

Figure 15:
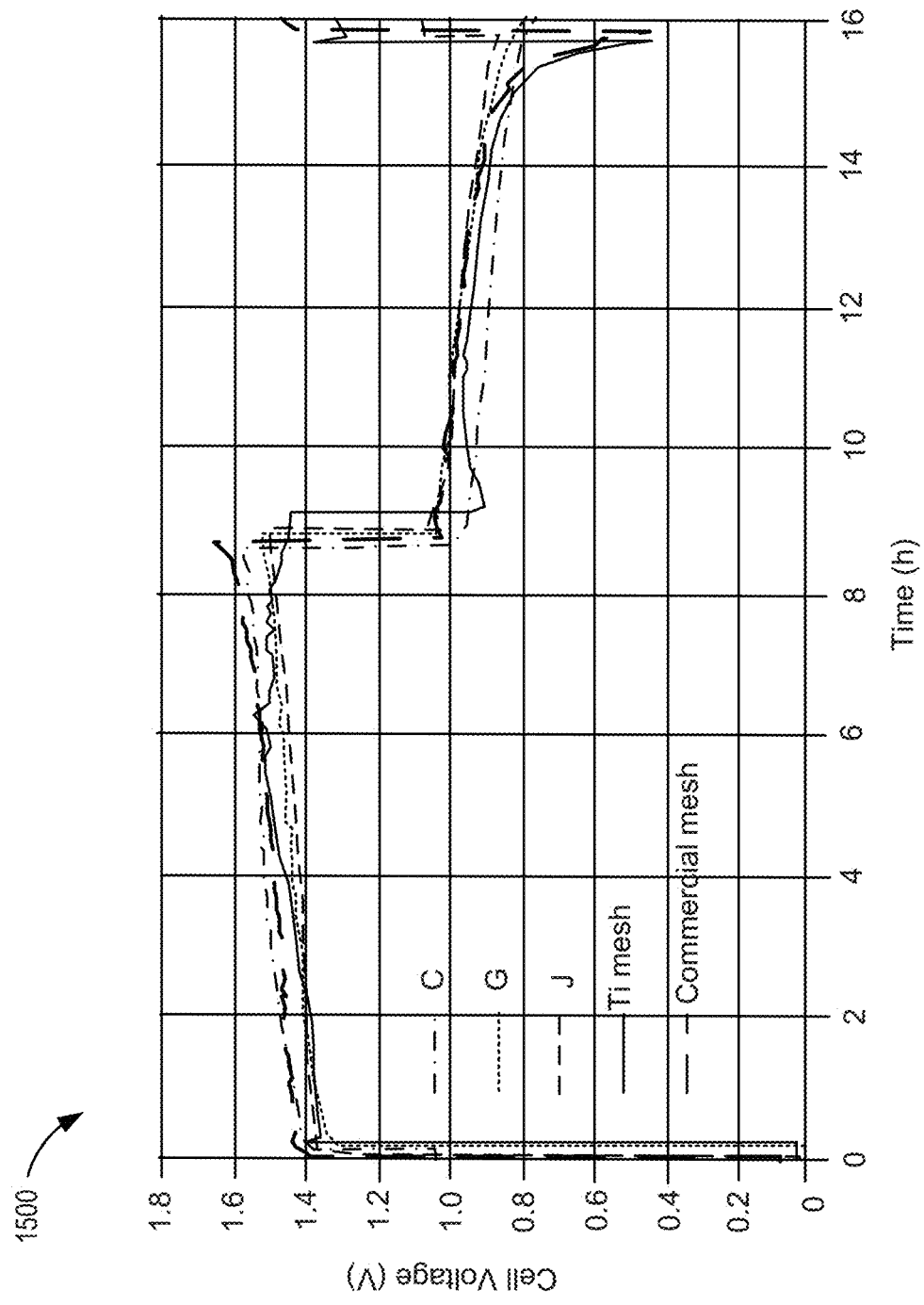

Turning now to FIG. 15, it illustrates a plot 1500 showing battery validation tests for various electrode configurations: Revs. C, G, and J; an electrode configuration with a Ti mesh; and a commercially available electrode. Although the Ti mesh initially has a low charging voltage, shorting behavior is indicated at approximately 6 h of charging, where the cell voltage begins to decrease as the charging current is increased over time, thereby exhibiting worse performance as compared to Revs. C, G, and J.

Figure 23A:
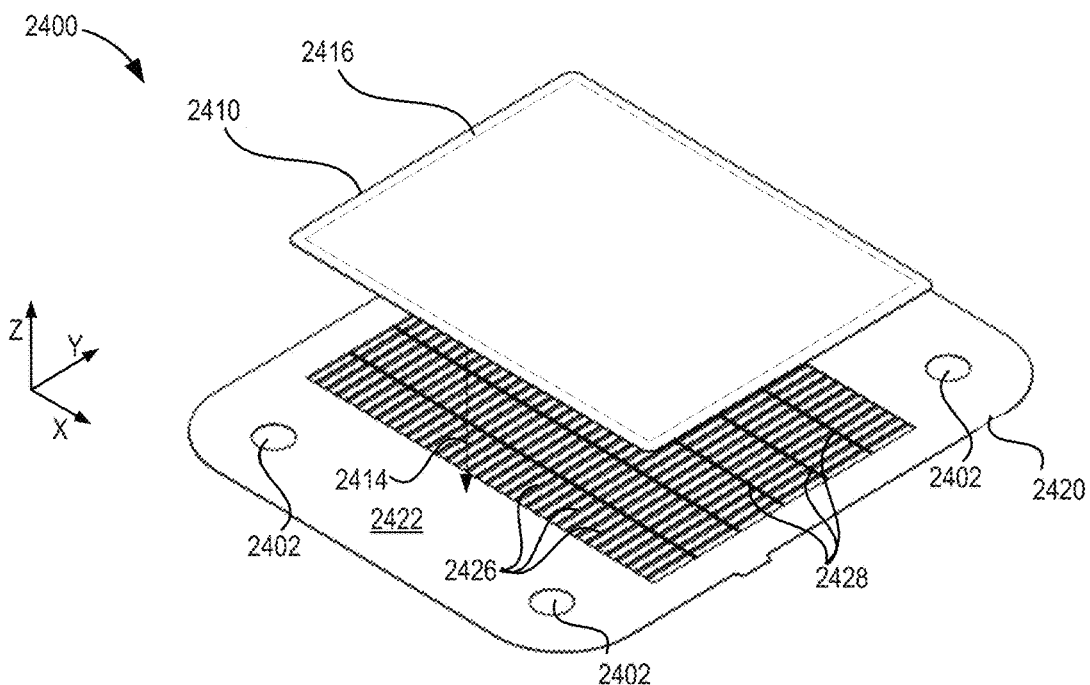
FIG. 23A illustrates an exploded plan view of an alternate representation of an electrode configuration.

Turning now to FIG. 23A, it illustrates an exploded plan view of an alternate representation of negative electrode spacer assembly 2400 for a redox flow battery. Negative electrode spacer assembly 2400 may be positioned within a redox flow battery stack assembly such that the negative electrode spacer assembly 2400 is sandwiched and interposed between the membrane and the negative flow field plate. The negative electrode spacer assembly 2400 includes a negative electrode spacer 2420 integrated with the membrane 2410 by attaching the negative electrode spacer 2420 to the negative side of the membrane 2410 (as indicated by arrow 2414). Integrating the negative electrode spacer 2420 with the membrane 2410 may aid in facilitating assembly of the redox flow cell stack by reducing the number of separate components (e.g., layers) to be aligned, and by maintaining an alignment of the membrane 2410 with the active area of the negative electrode spacer 2420. The active area of the negative electrode spacer 2420 may refer to the area of the negative electrode spacer 2420 delineated by the main ribs 2426 and the support ribs 2428, where negative electrolyte contacts and flows between the membrane and the negative flow field plate and where the electrolyte species participate in redox reactions. The negative electrode spacer may further include an inactive perimeter region 2422 surrounding the active region that may contact the electrolyte but where no redox reactions take place. The membrane 2410 may be attached to the negative electrode spacer 2420 by affixing an edge region 2416 at a perimeter of the membrane 2410 to the inactive perimeter region 2422 of the negative electrode spacer 2420. The dimensions of the edge region 2416 may be slightly larger than the dimensions of the active region of the membrane 2410 (or slightly larger than the interior perimeter of the inactive region 2422). Furthermore, attaching the edge region 2416 to the inactive perimeter region 2422 may include aligning the edge region 2416 of the membrane 2410 outside of the active region of the negative electrode spacer 2420. In this way, when the membrane 2410 is integrated with the negative electrode spacer 2420 the membrane covers the entire active region of the negative electrode spacer 2420. In one example, the edge region 2416 of the membrane 2410 may be heat sealed to the negative electrode spacer 2420.

Figure 23B:
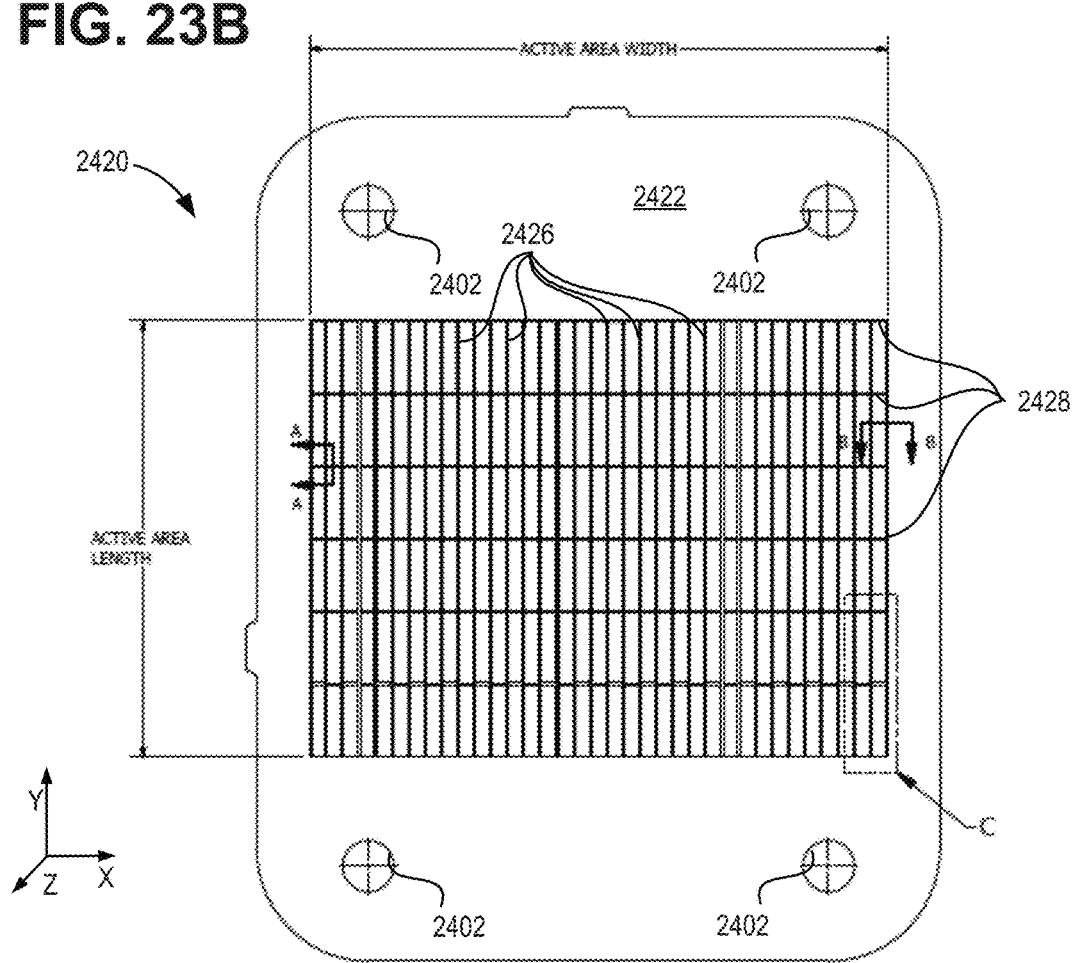
FIG. 23B illustrates a top view of the electrode spacer included in the electrode configuration of FIG. 23A.
Figure 23F:
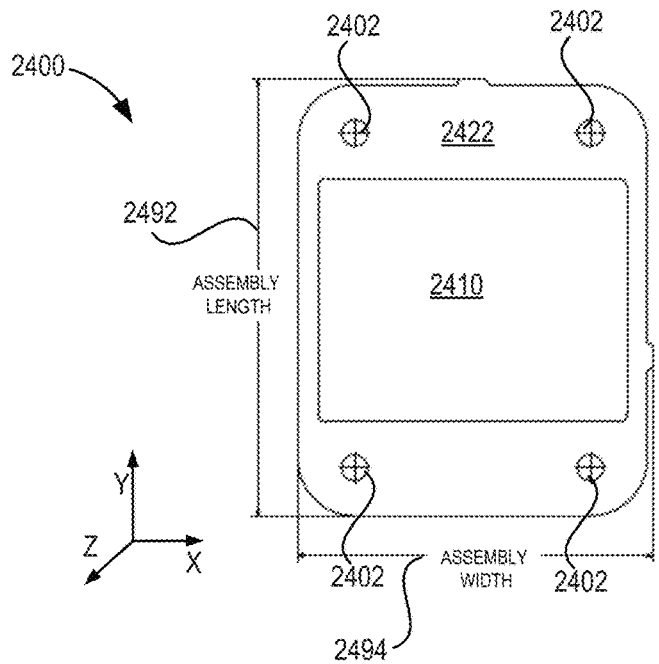
FIG. 23F illustrates a top view of the electrode configuration of FIG. 23A

Turning now to FIG. 23B, it illustrates a plan view of the negative electrode spacer 2420. The negative electrode spacer 2420 may include a plurality of inlet and outlet openings 2402 positioned in the inactive perimeter region 2422. Electrolyte fluid may be conveyed to the negative flow field from the inlets and from the negative flow field to the outlets by way of various channels or flow conduits integrated into the layers of the electrode stack assembly, including the negative electrode spacer. The dimensions of the active region may be indicated by an active area length and an active area width. For the case where the main ribs 2426 are oriented parallel to the length of the negative electrode spacer (y-axis) the main rib length is equivalent to the active area length; for the case where the support ribs 2428 are oriented parallel to the width of the negative electrode spacer (x-axis) the support rib length is equivalent to the active area width.

Turning now to FIG. 23C, it illustrates a cross-sectional view of the negative electrode separator 2420 taken at section B-B. As described above with reference to FIG. 23A, the edge region 2416 may be attached to the negative electrode separator 2420 at an interior perimeter of the inactive perimeter region 2422. A thickness of the negative electrode separator 2422 may be equivalent to the main rib thickness (including edge main ribs 2425). The main ribs may extend from the support ribs distally away from the membrane (y-direction) at a main rib draft angle relative to the support ribs (and the x-y-plane). Due to manufacturing capabilities, the main rib draft angle may be an acute angle within ±10° or ±3° of 90°. When the main rib draft angle is closer 90°, a current density distribution variance at the plating surface may be reduced relative to when the main rib draft angle is much less than 90°. Within the active region of the negative electrode configuration, a center thickness includes a membrane thickness 2412 in addition to the main rib thickness. The inactive perimeter region 2422 may be constructed of a non-conductive rigid material. Each of the main ribs 2426 and support ribs 2428 may be attached to the interior perimeter edge of the inactive perimeter region 2422. For example, lengthwise ends of the plurality of main ribs and widthwise ends of the plurality of support ribs may be mounted to the rigid frame structure of the inactive perimeter region 2422. In this way, the inactive perimeter region 2422 may provide structural integrity to the main ribs 2426 and the support ribs 2428 and membrane 2410, thereby helping to maintain the planarity, and relative alignments of the main ribs 2426 and the support ribs 2428 and membrane 2410. In some examples, the added structural support gained through mounting the main ribs 2426 and the support ribs 2428 to the inactive perimeter region 2422 may aid in increasing a performance of the redox flow battery system by allowing for reducing a thickness of one or more of the main ribs 2426 and the support ribs 2428, or by increasing a pitch of one or more of the main ribs 2426 and the support ribs 2428. As described above, reducing the thickness of the main ribs 2426 and the support ribs 2428 may help in reducing current density gradients at the plating surface and may allow for reduced electrode stack assembly thicknesses which can lower resistive losses.

Figure 24A:
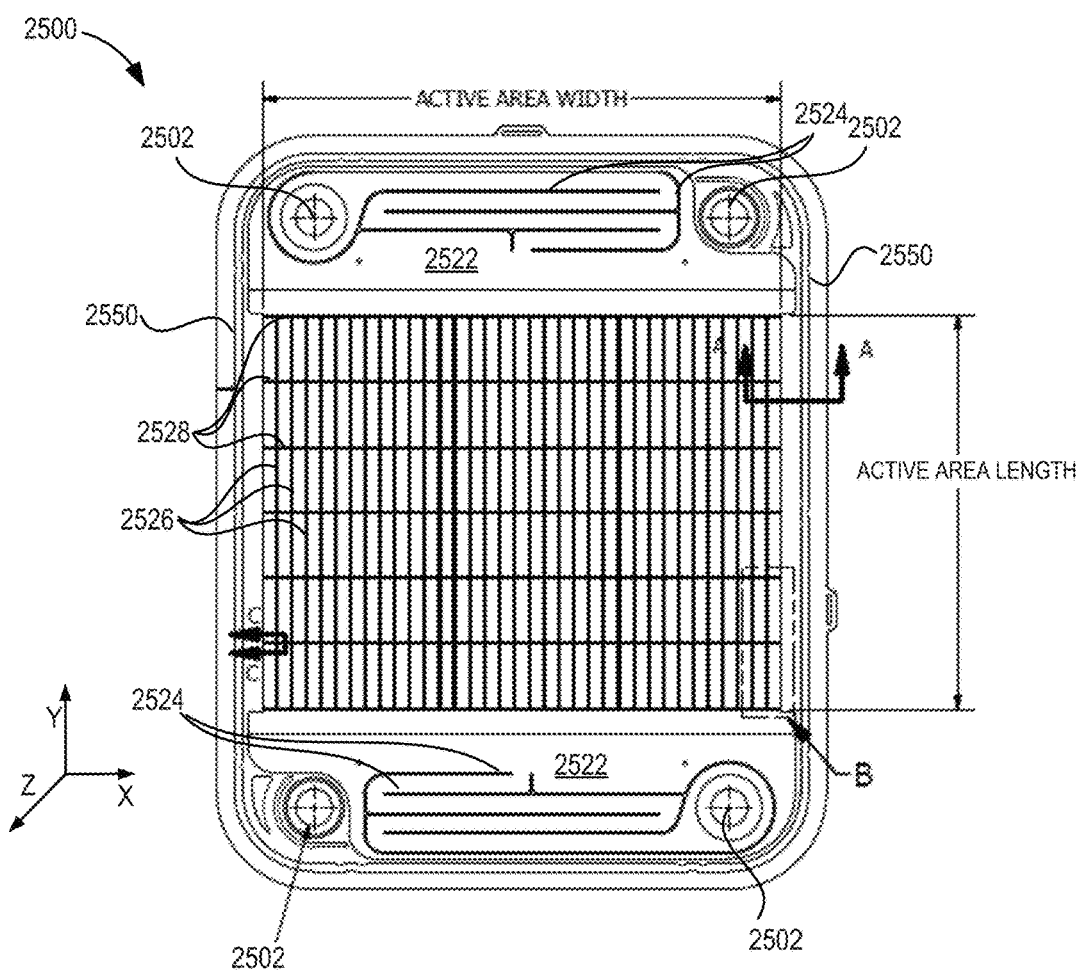
FIG. 24A illustrates a top view of another alternate representation of an electrode configuration.

Turning now to FIG. 24A, it illustrates a top view of another alternative representation of an electrode configuration, including a negative electrode spacer 2500. Negative electrode spacer 2500 may be positioned within a redox flow battery stack assembly between membrane and the negative flow field plate. Negative electrode spacer 2500 includes an active area having a plurality of main ribs 2526 oriented more parallel to an active area length, and a plurality of support ribs 2528 oriented more parallel to an active area width. The active area of the negative electrode spacer 2500 may refer to the area of the negative electrode spacer 2500 delineated by the main ribs 2526 and the support ribs 2528, where negative electrolyte contacts and flows between the membrane and the negative flow field plate in the redox flow battery stack assembly and where the electrolyte species participate in redox reactions. The negative electrode spacer 2500 may further include an inactive perimeter region 2522 surrounding the active region that may contact the electrolyte but where no redox reactions take place. The negative electrode spacer 2500 may include a plurality of inlet and outlet openings 2502 positioned in the inactive perimeter region 2522. Electrolyte fluid may be conveyed to the negative flow field from the inlets and from the negative flow field to the outlets by way of various channels 2524 or flow conduits integrated into the layers of the electrode stack assembly, including the negative electrode spacer. For the case where the main ribs 2526 are oriented parallel to the length of the negative electrode spacer (y-axis) the main rib length is equivalent to the active area length; for the case where the support ribs 2528 are oriented parallel to the width of the negative electrode spacer (x-axis) the support rib length is equivalent to the active area width.

Figure 24B:
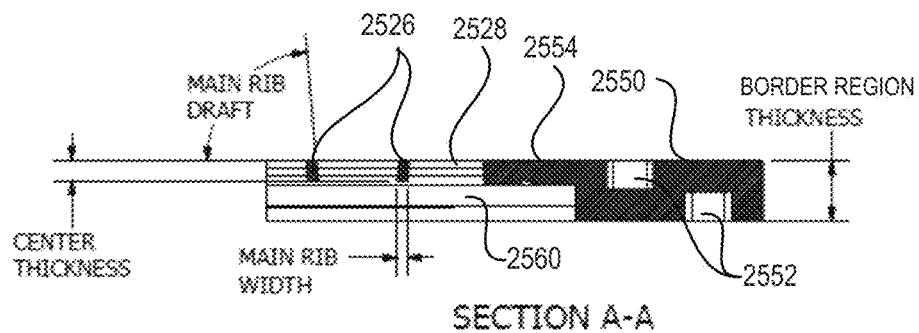
FIGS. 24B and 24D illustrate cross-sectional views of the electrode configuration of FIG. 24A taken at sections A-A and C-C, respectively.
Figure 24C:
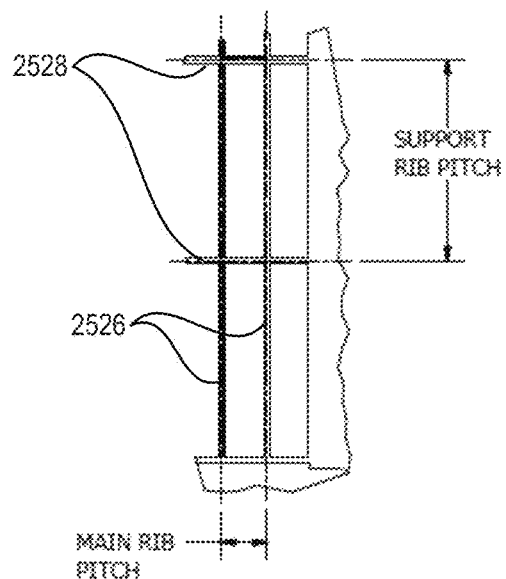
FIG. 24C illustrates a detail view of the electrode configuration of FIG. 24A taken at region B.
Figure 24D:
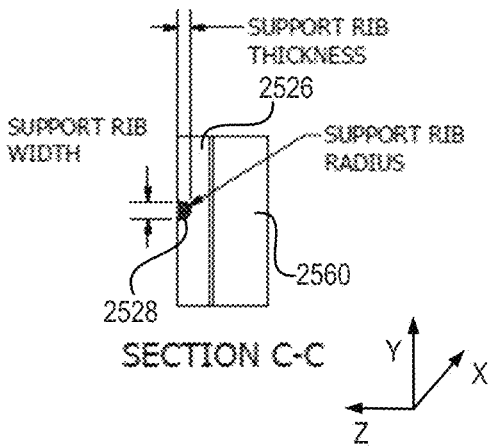

Turning now to FIG. 24B, it illustrates a cross-sectional view of the negative electrode separator 2500 taken at section A-A. A center thickness of the negative electrode separator 2500 may be equivalent to the main rib thickness. The main ribs 2526 may extend from the support ribs 2528 distally away from the membrane in the redox stack assembly (y-direction) at a main rib draft angle relative to the support ribs (and the x-y-plane). Due to manufacturing capabilities, the main rib draft angle may be an acute angle within ±10° or ±3° of 90°. When the main rib draft angle is closer 90°, a current density distribution variance at the plating surface may be reduced relative to when the main rib draft angle is much less than 90°. The inactive perimeter region 2522 may be constructed of a non-conductive rigid material, and includes a border region 2550 wrapping and extending around the perimeter of the negative electrode spacer 2500 like a picture frame. The border region 2550 may include an outer corrugated frame, the corrugations including longitudinal channels 2552 in a top and bottom surface of the corrugated frame. The corrugations and channels 2552 may reduce a weight and material cost of the negative electrode spacer 2500 while maintaining a structural rigidity. The corrugated frame 2550 may be positioned more externally than the active region of the negative electrode spacer. Border region may further include a lip 2554 extending internally from the perimeter of the negative electrode spacer 2500. Each of the main ribs 2526 and support ribs 2528 may be attached to the lip. For example, lengthwise ends of the plurality of main ribs and widthwise ends of the plurality of support ribs may be mounted to the lip 2554 (e.g., a rigid frame lipped structure) of the inactive perimeter region 2422. The thickness of the lip 2554 may correspond to the center thickness of the active region. As such, the negative flow field plate 2560 may also be mounted to the picture frame wherein an external edge of the negative flow field plate 2560 may be affixed underneath the lip 2554. When mounted to the picture frame, a membrane-facing surface of the negative flow field plate may just contact the membrane-distal ends of the main ribs 2526 such that under compression of the negative flow field plate 2560 toward the membrane during assembly of the redox flow battery stack, the main ribs 2526 support and maintain a thickness dimension of the negative electrolyte flow field. In this way, the inactive perimeter region 2522 and the border region 2550 may provide structural integrity to the main ribs 2526 and the support ribs 2528 and the negative flow field plate 2560, thereby helping to maintain the planarity, and relative alignments of the main ribs 2526 and the support ribs 2528 and negative flow field plate 2560. In some examples, the added structural support gained through mounting the main ribs 2526 and the support ribs 2528 to the inactive perimeter region 2522 and the border region 2550 may aid in increasing a performance of the redox flow battery system by allowing for reducing a thickness of one or more of the main ribs 2526 and the support ribs 2528, or by allowing for increasing a pitch of one or more of the main ribs 2526 and the support ribs 2528. As described above, reducing the thickness of the main ribs 2526 and the support ribs 2528 may help in reducing current density gradients at the plating surface and may allow for reduced electrode stack assembly thicknesses which can lower resistive losses.

Figure 19:
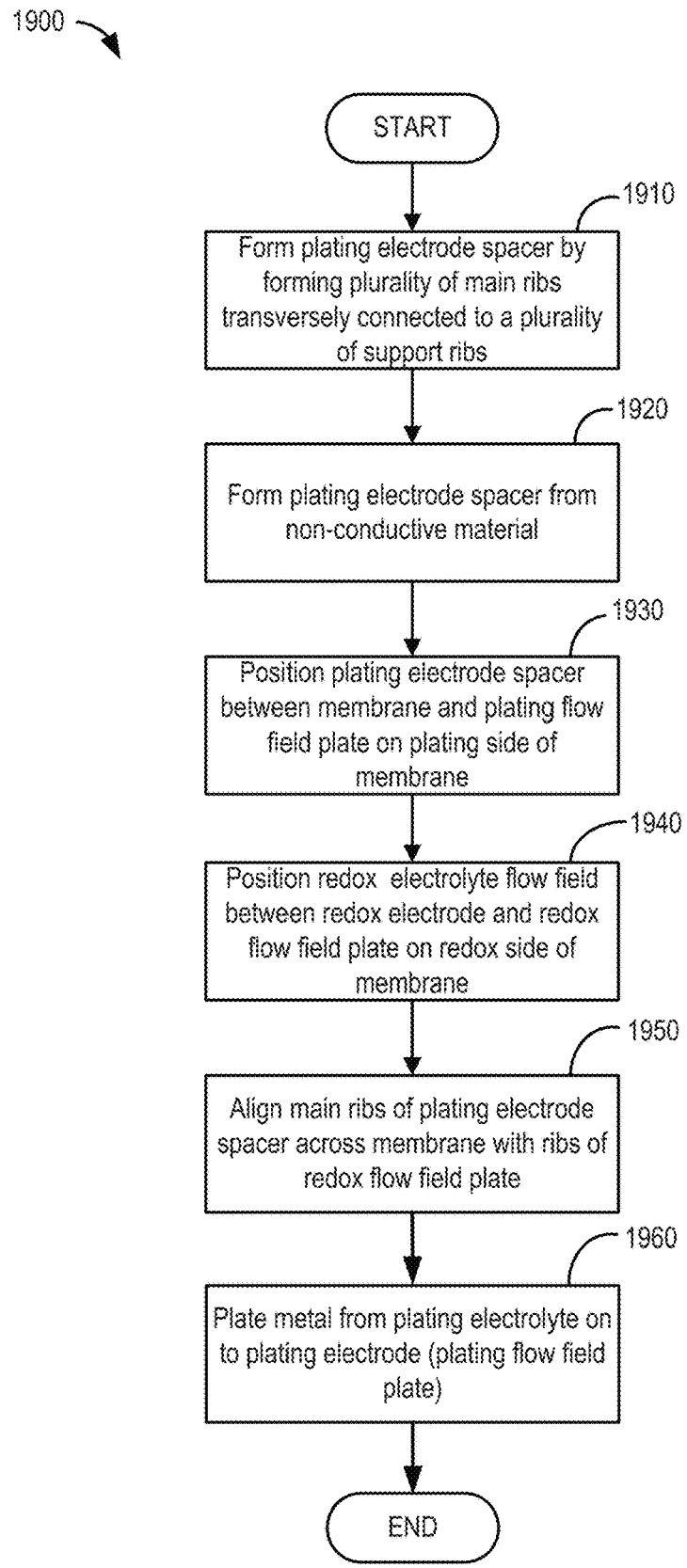
FIG. 19 illustrates a flow chart for an example method of assembling a redox flow battery.
Figure 20A:
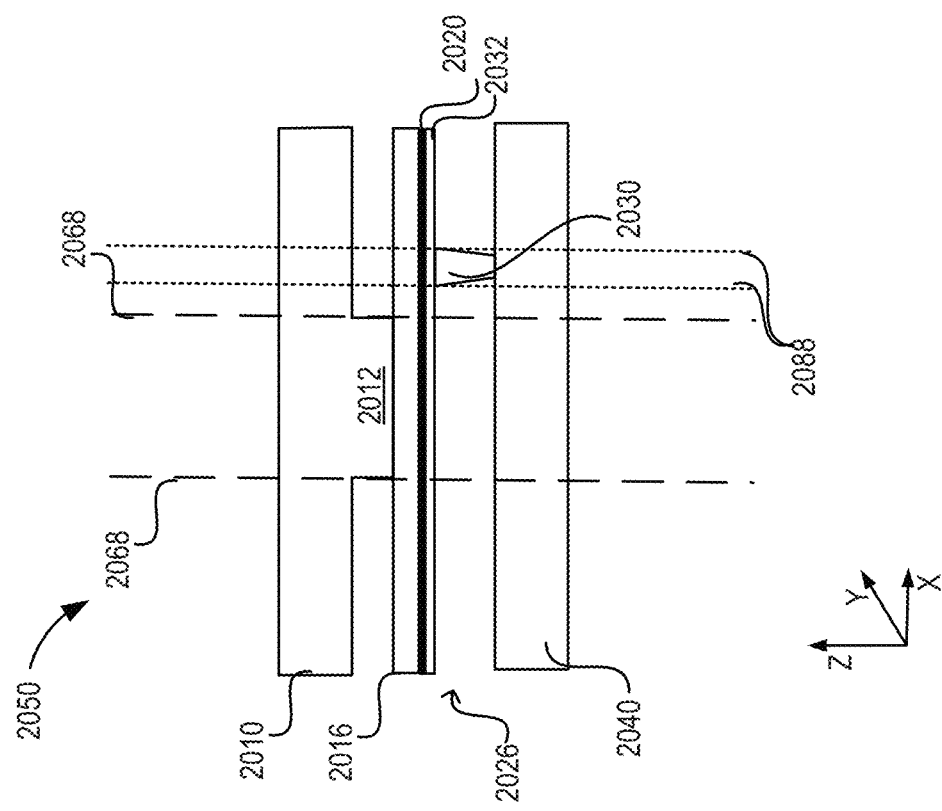
FIGS. 20A-B illustrate partial cross-sectional views of example redox flow battery configurations having a supported and unsupported electrode stack assembly, respectively.
Figure 20B:
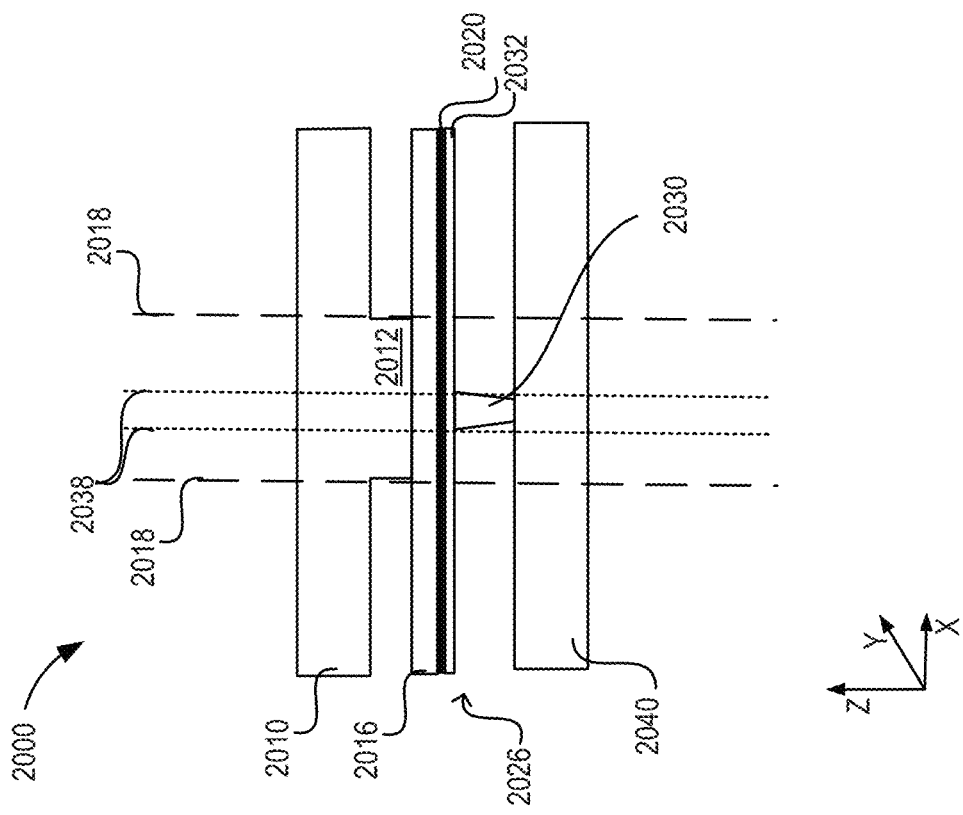

Turning now to FIG. 19, it illustrates a flow chart for a method 1900 of assembling a redox flow battery. The method 1900 begins at 1910 where a plating electrode spacer may be formed by forming a plurality of main ribs transversely connected to a plurality of support ribs. Forming the plating electrode spacer may include injection molding the main ribs and/or support ribs, or forming the main ribs and/or support ribs by roll-to-roll processing. Other manufacturing methods for forming the main ribs and/or support ribs include thermoforming, selective laser sintering (SLS), die cutting, extrusion, machining, or other polymer manufacturing processes. As described above, the plurality of main ribs may be oriented more parallel to a length of the plating electrode, and the plurality of support ribs may be oriented more transversely to a length of the plating electrode (e.g., more parallel to a width of the plating electrode). The plating electrode configuration may include the plating electrode spacer and the plating flow field plate. Each of the main ribs may be connected to each of the support ribs at joints therebetween forming an array of regular evenly-spaced and evenly-sized openings. The main rib pitch may range from 0.5 mm to as large as a width of the plating electrode. When the main rib pitch includes the width of the plating electrode, the number of main ribs is 2, and each of the main ribs comprise edge most main ribs. The support rib pitch may range from 0.25 to as large as a length of the plating electrode. When the support rib pitch includes the length of the plating electrode, the number of support ribs is 2, and each of the support ribs comprise edge most support ribs.

As described above with reference to FIGS. 16 and 17A-E the main ribs and support ribs of the plating electrode spacer may be formed having features according to the ranges of values shown in Table 2. The values for the features of the main ribs and the support ribs may be selected to provide a desired structural rigidity, current density distribution variance, plating electrode spacer opening density, electrode plating capacity, and other electrode properties, as described above. As a further example, the main rib geometry can be configured to provide desirable flow properties (e.g., reduce fluid hold-up in the plating flow field) of the electrolyte fluid, which can include liquid and/or gas. Forming the main ribs and support ribs in this way may thus increase a performance of the redox flow battery system while maintaining a durability and useful life of the plating electrode. For example, the main rib and supporting rib features may be selected to withstand the contact pressure applied thereto. The contact pressure for each main or supporting rib may be defined as the applied active area loading (Newtons, N) divided by the contact area (mm2) of the main and support ribs. In other words, each main and supporting rib may provide enough structural rigidity to support normal functioning of the redox flow battery cell and to reduce a risk of deflection of the main ribs and support ribs due to fluidic pressure fluctuations. In one example, the features of the main ribs and the support ribs may be selected to withstand a contact pressure of 1.5 MPa, or from 0.1 to 10 MPa. In particular, the support width thickness may be selected to support the main ribs during battery handling, assembly, and installation, to accommodate the desired flow rate of electrolyte through the plating electrolyte flow field, and to accommodate the desired plating capacity of the negative electrode. Increasing the main rib thickness may increase a volume for accommodating the desired flow rate of plating electrolyte; however, increasing the main rib thickness may also increase the battery cell resistance, which can reduce the battery charging and discharging performance. Reducing the main rib thickness may decrease a volume for accommodating the desired flow rate of plating electrolyte; however, reducing the main rib thickness may also reduce the battery cell resistance, which can raise the battery charging and discharging performance.

Next, method 1900 continues at 1920 where the plating electrode spacer may be formed from a non-conductive material. Non-limiting examples of non-conductive materials include: thermoplastics such as high-impact polystyrene, polypropylene, polytetrafluoroethylene, high density polyethylene, ultrahigh molecular weight polyethylene, polycarbonate, and the like; thermosets such as polyesters, vinylesters, epoxies, and the like; fiber-reinforced plastics such as FR4 and G10 fiberglass or fiber-reinforced sheets, and the like; and rubbers such as ethylene-propylene diene monomer rubber, Santoprene, silicone, styrene-butadiene rubber, buna-N, thermoplastic olefin rubbers, and the like. Furthermore, the plating electrode may be formed from the non-conductive material without a conductive paint or coating. Further still, the material for the plating electrode may be selected to maintain enough structural rigidity so as not to substantially deform under a contact pressure of 1.5 MPa, or from 0.1 MPa to as high as 10 MPa over the useful product life (e.g., >25 years). Forming the plating electrode spacer from a non-conductive material includes forming the plating electrode spacer without coating the plating electrode spacer with a conductive coating.

Method 1900 continues at 1930 where the plating (negative) electrode spacer is interposed between the membrane and the plating (negative) flow field plate on the plating (negative) side of the membrane. As such, the plating (negative) electrolyte flow field is sandwiched between the membrane and the plating flow field plate, and is supported by the plating electrode spacer, as shown in FIG. 20A. In the case where the negative flow field plate includes a flat negative flow field plate, the membrane-facing side of the negative flow field plate may be a continuously smooth surface without protrusions or openings or other discontinuities. Furthermore, the flat plating flow field plate forms a plating electrolyte flow field without IDFF channels. Said another way, the plating flow field plate and the membrane are spaced apart by the main ribs, and sandwich the non-interdigitated plating electrolyte flow field therebetween. In some representations, positioning the plating electrode spacer between the membrane and the plating flow field plate on the plating side of the membrane may include attaching the membrane to the plating electrode spacer, opposite to the plating flow field plate, as described above with reference to FIGS. 23A-F. In other representations, the main ribs and the support ribs of the plating electrode spacer may be mounted to a picture frame structure; furthermore, the negative flow field plate may be mounted to the picture frame structure at a side opposite the membrane-facing side of the main ribs and the support ribs. Method 1900 continues at 1940 where the redox (positive) electrode is interposed between the membrane and the redox (positive) flow field plate on the redox (positive) side of the membrane. As such, the redox (positive) electrolyte flow field is sandwiched between the redox electrode and the redox flow field plate, as shown in FIG. 20A.

At 1950, the main ribs of the plating electrode spacer are aligned in the electrode stack assembly across the membrane from the ribs of the redox flow field plate, and are oriented more parallel to the ribs of the redox flow field plate, as shown in FIG. 20B. In the case where the redox electrode configuration includes an interdigitated flow field plate, the main ribs are oriented to be more parallel to and across the membrane from the ribs of the IDFF plate. As such, during assembly and operation of the redox flow battery, the main ribs of the plating electrode spacer are opposingly supported by the ribs of the redox flow field plate across the membrane. Thus, upon compression of the plating flow field plate and the redox flow field plate toward the membrane, the shape and flow of the plating electrolyte flow field are maintained. Method 1900 continues at 1960 where metal is plated from the plating electrolyte on to the plating flow field plate. In particular, plating of the plating electrode may include electrochemically depositing metal, from reduced metal ions in the plating electrolyte, on to the surface of the plating flow field plate. After 1960, method 1900 ends.

In this manner, a redox flow battery may comprise a membrane interposed between a first electrode positioned at a first side of the membrane and a second electrode positioned at a second side of the membrane opposite to the first side. The redox flow battery may include a first flow field plate comprising a plurality of positive flow field ribs, each of the plurality of positive flow field ribs contacting the first electrode at first supporting regions on the first side, and the second electrode, including an electrode spacer positioned between the membrane and a second flow field plate, the electrode spacer comprising a plurality of main ribs, each of the plurality of main ribs contacting the second flow field plate at second supporting regions on the second side, each of the second supporting regions aligned opposite to one of the plurality of first supporting regions. In one example, the second electrode may comprise the second flow field plate positioned at the second side, wherein the second side and the second flow field plate form a non-interdigitated flow field therebetween. In another example, the second flow field plate may comprise a continuously smooth surface without protrusions, wherein the continuously smooth surface faces toward the electrode spacer and contacts each of the plurality of main ribs at the second supporting regions. Furthermore, the electrode spacer may include a plurality of support ribs, and each of the support ribs may be oriented transversely to each of the main ribs and may non-wovenly contact one or more of the main ribs. Further still, the plurality of main ribs can protrude from the plurality of support ribs, extending away from the second side, and the number of the plurality of main ribs may be greater than the number of the plurality of support ribs. In a further example, the electrode spacer may include a rigid frame surrounding the plurality of main ribs and the plurality of supporting ribs, and lengthwise ends of the plurality of main ribs and widthwise ends of the plurality of support ribs may be mounted to the rigid frame. Furthermore, the second flow field plate may be mounted to the rigid frame, and upon mounting the second flow field plate to the rigid frame, the continuously smooth surface may contact the plurality of main ribs at the second supporting regions.

In another embodiment, a method of assembling a redox flow battery may comprise, on a plating side of a membrane, sandwiching a plating electrolyte flow field and a plating electrode spacer between the membrane and a plating flow field plate, the plating electrode spacer comprising a plurality of main ribs. Furthermore, the method may include, on a redox side of the membrane, sandwiching a redox electrolyte flow field between a redox electrode and a redox flow field plate, the redox electrode comprising a plurality of positive flow field ribs. Further still, the method may include aligning each of the plurality of main ribs with the plurality of positive flow field ribs, wherein upon compressing the plating flow field plate and the redox flow field plate towards the membrane, the main ribs are opposingly supported by the positive flow field ribs across the membrane without substantially changing a dimension of the plating electrolyte flow field. In one example, the method may include forming the plurality of main ribs and forming a plurality of support ribs transversely connected in a non-woven manner to the plurality of main ribs. Furthermore, forming the plurality of main ribs and forming the plurality of support ribs can include forming the plurality of main ribs and the plurality of support ribs from a non-conductive material without a conductive coating. In another example, the method may include plating metal from a plating electrolyte on to the plating flow field plate during charging of the redox flow cell battery without plating the metal on to the plating electrode spacer. In a further example, the method may comprise integrating the plating electrode spacer with the membrane by attaching the plating electrode spacer to the membrane. Moreover, integrating the plating electrode spacer with the membrane can include heat sealing the membrane to the plating electrode spacer.

In another embodiment, a redox flow battery may comprise a negative electrode spacer interposed between a negative side of a membrane and a negative flow field plate, and a positive electrode interposed between a positive side of a membrane and a positive flow field plate. Furthermore, the negative electrode spacer may include a plurality of main ribs, the positive electrode may include a plurality of positive flow field ribs opposingly aligned across the membrane from the plurality of main ribs, and the negative flow field plate may include a continuously smooth plating surface facing the membrane, the plating surface and the membrane sandwiching a non-interdigitated negative electrolyte flow field therebetween. In one example, the negative electrode spacer may comprise a plurality of support ribs, and an array of evenly-sized openings formed from transversely and non-wovenly joining the plurality of main ribs to the plurality of support ribs. In another example, the main ribs may comprise solid monolithic structures having constant cross-sections in a longitudinal direction of the main ribs. Furthermore, the main ribs may include solid monolithic structures having constant cross-sections along an axis perpendicular to the plane of the negative flow field plate. Further still, pitch of the support ribs may be less than a pitch of the main ribs, and the plurality of main ribs may be oriented more parallel to a width of the negative electrode, and the plurality of support ribs are oriented more parallel to a length of the negative electrode.

In this way, a novel redox flow battery system including a larger electrode gap can be provided, thereby affording higher plating current densities and battery charging capacities, and accommodating higher electrolyte flow and gas bubble evolution rates. Furthermore, current density distribution variance, ohmic losses, battery shorting, and manufacturing costs, and operating costs can be reduced. In the case where the electrode spacer is rigidly mounted to a framed perimeter region, the electrode spacer may be imparted with increased structural integrity, thereby helping to maintain the planarity, and relative alignments of the electrode spacer main and support ribs, and membrane 2410. In some examples, the added structural support gained through mounting the main ribs and the support ribs to the inactive perimeter region may aid in increasing a plating capacity, reducing current density distribution variance at the plating surface, and reducing resistive losses of the redox flow battery system.

It will also be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the description. For example, hybrid redox flow battery systems, all-iron hybrid redox flow battery systems, and other redox flow battery systems may all take advantage of the present description.

The invention claimed is:

1. A method of assembling a redox flow battery, comprising: on a plating side of a membrane, sandwiching a plating electrolyte flow field and a plating electrode spacer between the membrane and a plating flow field plate, the plating electrode spacer comprising a plurality of main ribs; on a redox side of the membrane, sandwiching a redox electrolyte flow field between a redox electrode and a redox flow field plate, the redox electrode comprising a plurality of positive flow field ribs; and aligning each of the plurality of main ribs with the plurality of positive flow field ribs, wherein upon compressing the plating flow field plate and the redox flow field plate towards the membrane, the main ribs are opposingly supported by the positive flow field ribs across the membrane without substantially changing a dimension of the plating electrolyte flow field, further comprising forming the plurality of main ribs and forming a plurality of support ribs transversely connected in a non-woven manner to the plurality of main ribs.

2. The method of claim 1, wherein forming the plurality of main ribs and forming the plurality of support ribs includes forming the plurality of main ribs and the plurality of support ribs from a non-conductive material without a conductive coating.

3. The method of claim 2, further comprising plating metal from a plating electrolyte on to the plating flow field plate during charging of the redox flow battery without plating the metal on to the plating electrode spacer.

4. The method of claim 3, further comprising integrating the plating electrode spacer with the membrane by attaching the plating electrode spacer to the membrane.

5. The method of claim 4, wherein integrating the plating electrode spacer with the membrane includes heat sealing the membrane to the plating electrode spacer.

* * * * *